US012384153B2

(12) United States Patent
Sato et al.

(10) Patent No.: US 12,384,153 B2
(45) Date of Patent: Aug. 12, 2025

(54) LIQUID DISCHARGE APPARATUS AND HEAD MODULE

(71) Applicant: SEIKO EPSON CORPORATION, Tokyo (JP)

(72) Inventors: Masahiko Sato, Azumino (JP); Shunsuke Watanabe, Matsumoto (JP); Shun Katsuie, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 284 days.

(21) Appl. No.: 17/810,685

(22) Filed: Jul. 5, 2022

(65) Prior Publication Data

US 2023/0010747 A1 Jan. 12, 2023

(30) Foreign Application Priority Data

Jul. 7, 2021 (JP) ................................. 2021-112612

(51) Int. Cl.

*B41J 2/145* (2006.01)
*B41J 2/15* (2006.01)
*B41J 2/21* (2006.01)

(52) U.S. Cl.

CPC .................. *B41J 2/145* (2013.01); *B41J 2/15* (2013.01); *B41J 2/21* (2013.01)

(58) Field of Classification Search

CPC ....... B41J 2/15; B41J 2/21; B41J 2/205; B41J 2/14; B41J 2/505; B41J 11/42; B41J 2/145; B41J 2/155; B41J 2/42; G06K 15/02; G06K 15/10

See application file for complete search history.

(56) References Cited

U.S. PATENT DOCUMENTS 5,844,585 A * 12/1998 Kurashima .......... G06K 15/105 347/41
6,334,665 B1 6/2002 Yoshida
6,530,646 B2 * 3/2003 Otsuki ................... B41J 2/2132 347/41
6,595,614 B2 * 7/2003 Morikawa .............. B41J 11/425 347/41
7,517,052 B2 * 4/2009 Wada ........................ B41J 2/155 347/49
7,552,996 B2 * 6/2009 Ochiai ...................... B41J 2/155 347/42
7,726,763 B2 * 6/2010 Ochiai ................... B41J 2/2132 347/15
9,469,123 B2 * 10/2016 Tsuboi ................... B41J 2/2107

(Continued)

FOREIGN PATENT DOCUMENTS

JP H11-028827 A 2/1999
JP 2019-147248 A 9/2019
WO 2006/016508 5/2008

*Primary Examiner* — John Zimmermann
(74) *Attorney, Agent, or Firm* — WORKMAN NYDEGGER

(57) ABSTRACT

There is provided a head module in which a first direction is a main scanning direction, including: a first nozzle row including a first nozzle; a second nozzle row including a second nozzle; and a third nozzle row including a third nozzle, in which a distance P1 between the first nozzle row and the second nozzle row in the first direction and a distance P2 between the first nozzle row and the third nozzle row in the first direction are expressed as P1:P2=E1:O1 where a value E1 is a positive even number and a value O1 is a positive odd number satisfying O1>E1.

19 Claims, 23 Drawing Sheets

(56) References Cited

U.S. PATENT DOCUMENTS

| | | | | |
|---|---|---|---|---|
| 2002/0109752 | A1* | 8/2002 | Sato | B41J 2/2132 347/41 |
| 2006/0033765 | A1 | 2/2006 | Niekawa | |
| 2006/0119632 | A1* | 6/2006 | Ochiai | B41J 2/04543 347/15 |
| 2006/0274099 | A1* | 12/2006 | Jahana | B41J 2/155 347/15 |
| 2009/0015611 | A1* | 1/2009 | Ochiai | B41J 2/2146 347/12 |

* cited by examiner

LIQUID DISCHARGE APPARATUS AND HEAD MODULE

The present application is based on, and claims priority from JP Application Serial Number 2021-112612, filed Jul. 7, 2021, the disclosure of which is hereby incorporated by reference herein in its entirety.

BACKGROUND

1. Technical Field

The present disclosure relates to a liquid discharge apparatus and a head module.

2. Related Art

A liquid discharge apparatus, such as an ink jet printer, including a head module for forming dots on a medium by discharging a liquid is widely known. For example, JP-A-2019-147248 describes a liquid discharge apparatus including a head module provided with nozzle rows composed of a plurality of nozzles for discharging a liquid, and a carriage for reciprocating the head module with respect to a medium in a main scanning direction.

In recent years, with the demand for higher speed in the process of forming dots in a liquid discharge apparatus, there is a demand for higher speed in the relative movement of the head module with respect to the medium in the main scanning direction. However, when the speed of relative movement of the head module with respect to the medium in the main scanning direction is increased, there is a problem that the distance between the dots in the main scanning direction increases.

SUMMARY

According to an aspect of the present disclosure, there is provided a head module in which a first direction is a main scanning direction, including: a first nozzle row including a first nozzle for discharging a liquid; a second nozzle row including a second nozzle for discharging a liquid; and a third nozzle row including a third nozzle for discharging a liquid, in which a distance P1 between the first nozzle row and the second nozzle row in the first direction and a distance P2 between the first nozzle row and the third nozzle row in the first direction are expressed as P1:P2=E1:O1 where a value E1 is a positive even number and a value O1 is a positive odd number satisfying O1>E1.

According to another aspect of the present disclosure, there is provided a head module in which a first direction is a main scanning direction, including: a first nozzle row including a first nozzle for discharging a liquid; a second nozzle row including a second nozzle for discharging a liquid; and a third nozzle row including a third nozzle for discharging a liquid, in which a distance P1 between the first nozzle row and the second nozzle row in the first direction and a distance P2 between the first nozzle row and the third nozzle row in the first direction are expressed as P1:P2=$M\times\alpha:M\times\beta+1$ where a value M is a natural number of 3 or more, a value $\alpha$ is a natural number of 1 or more, and a value $\beta$ is a natural number satisfying $\beta>\alpha$.

According to a still another aspect of the present disclosure, there is provided a head module in which a first direction is a main scanning direction, including: a first nozzle row including a nozzle for discharging a liquid; a second nozzle row including a nozzle for discharging a liquid; and (M−1) specific nozzle rows including a nozzle for discharging a liquid, in which, when a value m is a natural number satisfying $1\leq m\leq M-1$, a distance P1 between the first nozzle row and the second nozzle row in the first direction and a distance PT[m] between the first nozzle row and an m-th specific nozzle row among the (M−1) specific nozzle rows in the first direction are expressed as P1:PT[m] $=M\times\alpha:M\times\beta T[m]+\gamma T[m]$ where a value M is a natural number of 3 or more, a value $\alpha$ is a natural number of 1 or more, a value $\beta T[m]$ is a natural number satisfying $\beta T[m]>\alpha$, and a value $\gamma T[m]$ is a natural number satisfying $0<\gamma T[m]\leq M-1$ and satisfying $\gamma T[m1]\neq\gamma T[m2]$ when a value m1 is a natural number satisfying $1\leq m1\leq M-1$ and a value m2 is a natural number satisfying $1\leq m2\leq M-1$ and satisfying $m1\neq m2$.

According to still another aspect of the present disclosure, there is provided a head module in which a first direction is a main scanning direction, including: first nozzles for discharging a liquid; second nozzles for discharging a liquid; and third nozzles for discharging a liquid, in which, when a distance between a first dot formed by the liquid discharged by the first nozzle at a first timing and a second dot formed by the liquid discharged by the first nozzle at a second timing at which the liquid is discharged first after the first timing in the first direction is a distance D1, and a distance between a third dot formed by the liquid discharged by the second nozzle at the first timing and the first dot in the first direction is a distance D2, and a distance between a fourth dot formed by the liquid discharged by the third nozzle at the first timing and the first dot in the first direction is a distance D3, the first nozzle, the second nozzle, and the third nozzle are provided such that the distance D2 is a distance which is an integer multiple of the distance D1 and the distance D3 is a distance different from the integer multiple of the distance D1.

DESCRIPTION OF EXEMPLARY EMBODIMENTS

Figure 1:
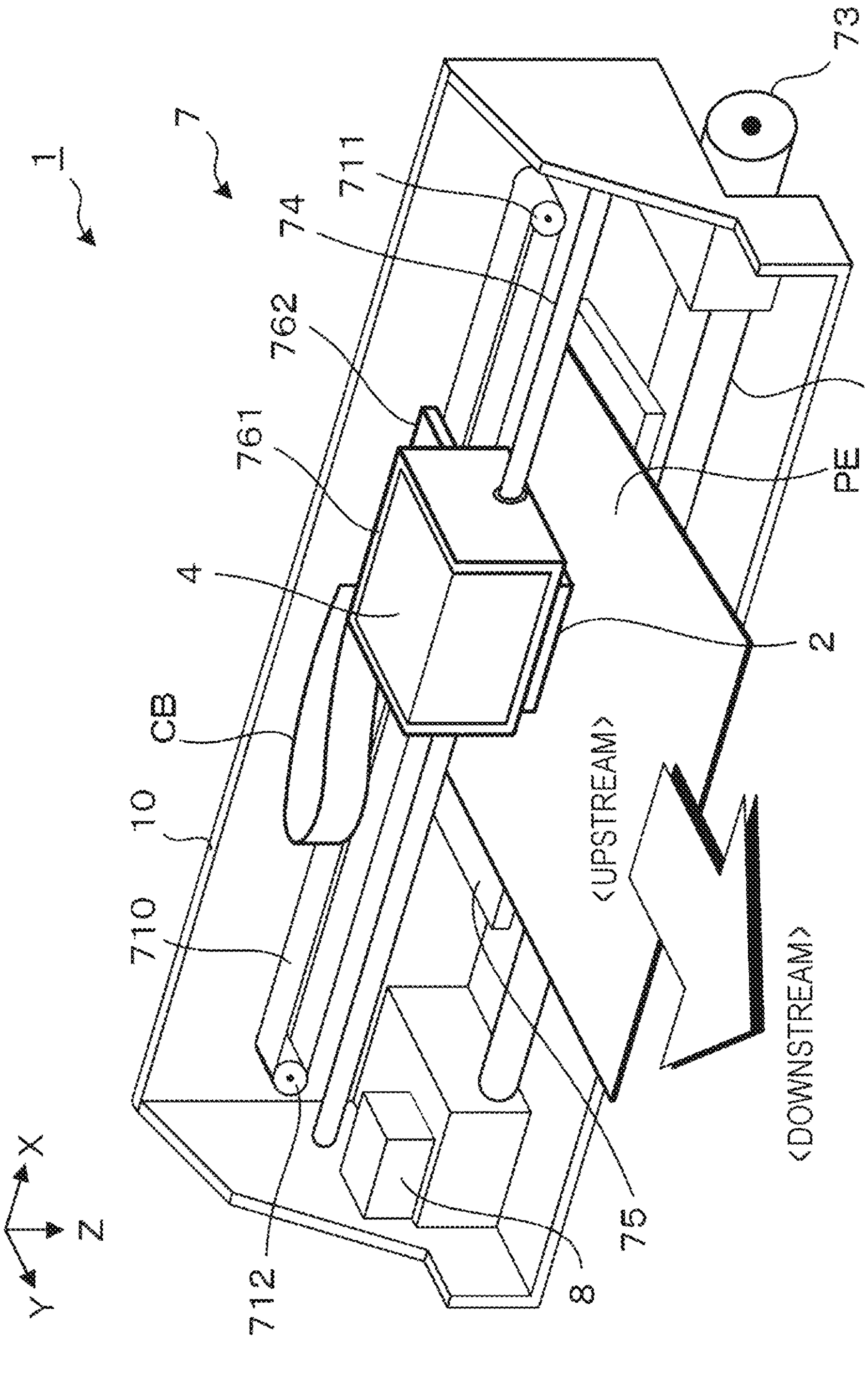
FIG. 1 is a perspective view illustrating an example of a schematic internal structure of an ink jet printer according to a first embodiment.

Hereinafter, preferred embodiments according to the present disclosure will be described with reference to the attached drawings. In the drawings, the dimensions and scale of each part may differ from actual ones, and some parts are schematically illustrated for ease of understanding. Further, the scope of the present disclosure is not limited to these aspects unless otherwise stated to limit the disclosure in the following description.

1. First Embodiment

In the first embodiment, a liquid discharge apparatus will be described using an ink jet printer as an example that forms an image on a recording paper sheet PE by discharging ink. In the present embodiment, the ink is an example of the "liquid", and the recording paper sheet PE is an example of the "medium".

1.1. Overview of Ink Jet Printer

Hereinafter, an overview of an ink jet printer 1 according to the first embodiment will be described with reference to FIG. 1. FIG. 1 is a perspective view illustrating an example of a schematic internal structure of the ink jet printer 1 according to the first embodiment.

Print data Img indicating an image to be formed by the ink jet printer 1 is supplied to the ink jet printer 1 from a host computer such as a personal computer or a digital camera. The ink jet printer 1 executes a printing process of forming an image indicated by the print data Img supplied from the host computer on the recording paper sheet PE.

As illustrated in FIG. 1, in the first embodiment, it is assumed that the ink jet printer 1 is a serial printer. Specifically, the ink jet printer 1 executes the printing process by moving a head module 2 in a main scanning direction and discharging ink from a nozzle N provided in a head chip 3 (not illustrated) included in the head module 2. Further, the ink jet printer 1 transports the recording paper sheet PE in a sub-scanning direction.

Hereinafter, as illustrated in FIG. 1, the +X direction and the −X direction opposite to the +X direction are collectively referred to as "X-axis direction". The X-axis direction is an example of the "main scanning direction" in the first embodiment. Further, the +Y direction orthogonal to the X-axis direction and the −Y direction opposite to the +Y direction are collectively referred to as "Y-axis direction". The Y-axis direction is an example of the "sub-scanning direction" in the first embodiment. Further, the +Z direction orthogonal to the +X direction and the +Y direction and the −Z direction opposite to the +Z direction are collectively referred to as "Z-axis direction". The head chip 3 and the nozzle N will be described later.

As illustrated in FIG. 1, the ink jet printer 1 according to the first embodiment includes: a housing 10; the head module 2 including the head chip 3 provided with a plurality of nozzles N for discharging ink; and a transport mechanism 7 for changing the relative position of the recording paper sheet PE with respect to the head module 2.

When the printing process is executed, the transport mechanism 7 drives a carriage 761 which can reciprocate in the housing 10 in the X-axis direction and on which the head module 2 is mounted, and transports the recording paper sheet PE in the sub-scanning direction (specifically, at least one of the +Y direction and the −Y direction). Accordingly, the relative position of the recording paper sheet PE with respect to the head module 2 can be changed, and the ink can land on the entire recording paper sheet PE.

Specifically, the transport mechanism 7 includes: the above-described carriage 761; a transport motor (not illustrated) as a driving source for reciprocating the carriage 761 in the X-axis direction; a paper feed motor 73 that serves as a driving source for transporting the recording paper sheet PE in the +Y direction; a carriage guide shaft 74 that extends in the X-axis direction; a pulley 711 that is rotationally driven by the transport motor; a rotatable pulley 712; and a timing belt 710 that is stretched between the pulley 711 and the pulley 712 and extends in the X-axis direction. The carriage 761 is reciprocally supported by the carriage guide shaft 74 in the X-axis direction and is fixed to a predetermined location of the timing belt 710 via a fixing tool 762. Therefore, by rotationally driving the pulley 711 by using the transport motor, the transport mechanism 7 can move the carriage 761 and the head module 2 mounted on the carriage 761 in the X-axis direction along the carriage guide shaft 74.

Further, the transport mechanism 7 includes: a platen 75 provided on the lower side of the carriage 761, that is, in the +Z direction of the carriage 761; a paper feed roller (not illustrated) that rotates according to the drive of the paper feed motor 73 for supplying the recording paper sheets PE onto the platen 75 one by one; and a paper discharge roller 730 that rotates according to the drive of the paper feed motor 73 and transports the recording paper sheet PE on the platen 75 to a paper discharge port. Therefore, as illustrated in FIG. 1, the transport mechanism 7 can transport the recording paper sheet PE on the platen 75 from the −Y direction side, which is upstream, to the +Y direction side, which is downstream.

In the first embodiment, as illustrated in FIG. 1, one ink cartridge 4 is stored in the carriage 761 of the ink jet printer 1. The ink cartridge 4 is filled with a single color ink and is an example of a liquid storage section. In addition, FIG. 1 is merely an example, and the ink cartridge 4 may be provided outside the carriage 761. Further, the carriage 761 may store a plurality of ink cartridges 4, each filled with inks of different colors. For example, the carriage 761 may store four ink cartridges 4 corresponding to the inks of four colors: cyan, magenta, yellow, and black. Further, instead of the ink cartridge 4, an ink pack composed of a flexible bag or an ink tank provided with a pouring port for replenishing ink from an ink bottle may be adopted as the liquid storage section.

As illustrated in FIG. 1, the ink jet printer 1 includes a control section 8. The control section 8 includes: a storage section that stores various types of information such as a control program of the ink jet printer 1 and the print data Img supplied from a host computer; a central processing unit (CPU); and various other circuits. The control section 8 may include a programmable logic device such as a field-programmable gate array (FPGA) instead of the CPU.

As illustrated in FIG. 1, the control section 8 is provided outside the carriage 761. Then, the control section 8 and the head module 2 are electrically coupled to each other by a cable CB illustrated in FIG. 1. In the first embodiment, a flexible flat cable is adopted as the cable CB.

The control section 8 controls the operation of each section of the ink jet printer 1 by the CPU operating according to the control program stored in the storage section. For example, the control section 8 controls the operations of the head module 2 and the transport mechanism 7 such that the printing process of forming an image corresponding to the print data Img on the recording paper sheet PE is executed.

Specifically, the control section 8 supplies a driving signal Com and a print signal SI to the head module 2. Here, the driving signal Com is a signal for discharging ink from the nozzle N by driving a piezoelectric element provided corresponding to the nozzle N. In the present embodiment, the control section 8 can supply the common driving signal Com to a plurality of piezoelectric elements provided in the head module 2 and corresponding to the plurality of nozzles N. The print signal SI is a signal that designates whether or not to supply the driving signal Com to each piezoelectric element. In other words, in the present embodiment, when the print signal SI designates the supply of the driving signal Com to all of the plurality of piezoelectric elements provided in the head module 2 and corresponding to the plurality of nozzles N, the control section 8 supplies a common driving signal Com to all of the piezoelectric elements provided in the head module 2. In other words, in the present embodiment, when the print signal SI designates the supply of the driving signal Com to all of the plurality of piezoelectric elements provided in the head module 2 and corresponding to the plurality of nozzles N, the control section 8 supplies the driving signals Com having waveforms of the same shape at the same timing to all of the piezoelectric elements provided in the head module 2. In the present embodiment, the plurality of piezoelectric elements provided in the head module 2 include a plurality of piezoelectric elements 331 and a plurality of piezoelectric elements 332. The piezoelectric element 331 and the piezoelectric element 332 will be described later.

1.2. Overview of Head Module

Figure 2:
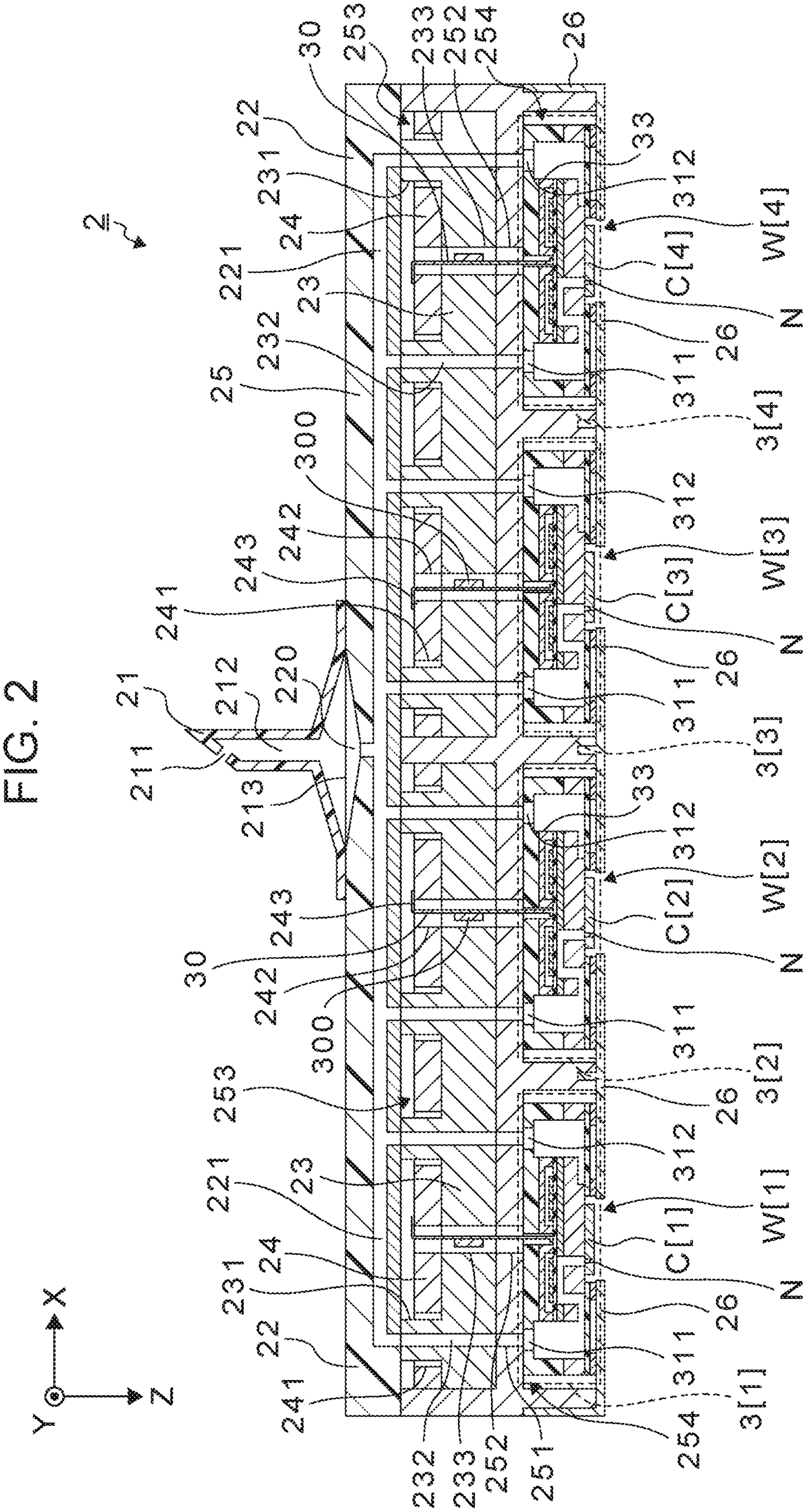
FIG. 2 is a sectional view of a head module according to the first embodiment.

FIG. 2 is a sectional view of the head module 2 in the present embodiment. The head module 2 in the present embodiment includes an ink introduction member 22, a circuit substrate 24, an intermediate flow path member 23, the head chip 3, a holder 25, a fixing plate 26, and the like. In the following, among the surfaces perpendicular to the Z-axis direction in each member, the surface on the −Z direction side may be referred to as an upper surface, and the surface on the +Z direction side may be referred to as a lower surface.

An ink introduction needle 21 is provided on the upper surface of the ink introduction member 22. Both the ink introduction member 22 and the ink introduction needle 21 are made of synthetic resin. Further, a filter 213 is provided between the ink introduction needle 21 and the ink introduction member 22. The filter 213 is a member that filters the ink introduced from the ink introduction needle 21, and for example, a metal woven in a mesh shape, a thin metal plate having a large number of holes, or the like is used. Foreign matter and air bubbles in the ink are captured by the filter 213. Then, in the present embodiment, the ink cartridge 4 is mounted on the upper surface of the ink introduction member 22, and the ink introduction needle 21 is inserted into the ink cartridge 4. The ink in the ink cartridge 4 is introduced into a needle flow path 212 from a needle hole 211 provided in the tip end portion of the ink introduction needle 21. The ink introduced from the ink introduction needle 21 passes through the filter 213 and is supplied from an inlet 220 to the inside of the head module 2. After that, the ink passes through a distribution flow path 221 and is supplied to the intermediate flow path member 23 arranged on the +Z direction side of the ink introduction member 22.

The intermediate flow path member 23 is formed with an intermediate flow path 232 to which ink is supplied from the distribution flow path 221. Further, a cylindrical flow path coupling section 231 is provided on the upper surface of the intermediate flow path member 23. The height of the flow path coupling section 231 in the Z-axis direction is equal to or larger than the thickness of the circuit substrate 24 arranged between the ink introduction member 22 and the intermediate flow path member 23. The flow path coupling section 231 introduces the ink supplied from the distribution flow path 221 of the ink introduction member 22 into the intermediate flow path 232. The intermediate flow path 232 communicates with a supply flow path 251 provided in the holder 25. Further, the intermediate flow path member 23 is provided with an opening 233 at a position different from the intermediate flow path 232 when the intermediate flow path member 23 is viewed in the +Z direction. The opening 233 communicates with an opening 242 provided in the circuit substrate 24 and also communicates with an opening 252 provided in the holder 25. A wiring substrate 30 provided with a driving circuit 300 is inserted through the opening 233.

The circuit substrate 24 is arranged between the ink introduction member 22 and the intermediate flow path member 23. The circuit substrate 24 is a printed circuit substrate on which a wiring pattern for supplying the driving signal Com and the print signal SI supplied from the control section 8 of the ink jet printer 1 to the wiring substrate 30 is formed. A substrate terminal 243 coupled to the wiring substrate 30 is formed on the upper surface of the circuit substrate 24. Further, the cable CB for supplying the driving signal Com and the print signal SI from the control section 8 is coupled to a connector 249 (not illustrated) which is mounted on at least one of the upper surface and the lower surface of the circuit substrate 24.

The circuit substrate 24 is provided with an opening 241 through which the flow path coupling section 231 is inserted. The opening 241 is a through-hole larger than the outer diameter of the flow path coupling section 231. Further, the circuit substrate 24 is provided with the opening 242 through which the wiring substrate 30 is inserted.

The holder 25 is provided with a plurality of lower recess portions 254. The lower recess portion 254 is a recessed space that opens to the +Z direction side. The lower recess portion 254 accommodates and holds the head chip 3 fixed to the fixing plate 26. The fixing plate 26 is made of a metal plate material such as stainless steel.

Further, the holder 25 is provided with an upper recess portion 253. The upper recess portion 253 is a recessed space that opens to the −Z direction side. The intermediate flow path member 23 and the circuit substrate 24 are accommodated in the upper recess portion 253.

Further, as described above, the holder 25 is provided with the supply flow path 251. The supply flow path 251 communicates with a supply port 311 and a supply port 312 provided in the head chip 3 accommodated in the lower recess portion 254. Accordingly, the ink introduced from the ink cartridge 4 through the ink introduction needle 21 is filtered by the filter 213, and then the ink is supplied from the supply port 311 and the supply port 312 to the head chip 3 through the distribution flow path 221, the intermediate flow path 232, and the supply flow path 251. In the first embodiment, since the head module 2 includes one ink introduction needle 21, the ink supplied to each of the plurality of head chips 3 is of the same type, and the ink supplied to each of the nozzles N provided in each of the head chips 3 is of the same type. In other words, all of the nozzles provided in the head module 2 discharges the same type of ink.

Further, as illustrated in FIG. 2, the plurality of head chips 3 are arranged so as to be arranged in the X-axis direction. Specifically, from the −X direction to the +X direction, a head chip 3[1], a head chip 3[2], a head chip 3[3], and a head chip 3[4] are fixed in this order to the plurality of lower recess portions 254 provided in the holder 25. The head chips 3[1] to 3[4] are simply referred to as the head chip 3 when the head chips are not distinguished. Further, the head chip 3[1] includes a nozzle plate C[1], the head chip 3[2] includes a nozzle plate C[2], the head chip 3[3] includes a nozzle plate C[3], and the head chip 3[4] includes a nozzle plate C[4], respectively. Further, in the +Z direction, the nozzle plate C[1] is exposed from a plate opening W[1] provided in the fixing plate 26, the nozzle plate C[2] is exposed from a plate opening W[2] provided in the fixing plate 26, the nozzle plate C[3] is exposed from a plate opening W[3] provided in the fixing plate 26, and the nozzle plate C[4] is exposed from a plate opening W[4] provided in the fixing plate 26. The plurality of plate openings W are provided in the fixing plate 26 in the order of the plate opening W[1], the plate opening W[2], the plate opening W[3], and the plate opening W[4] from the −X direction to the +X direction.

Figure 3:
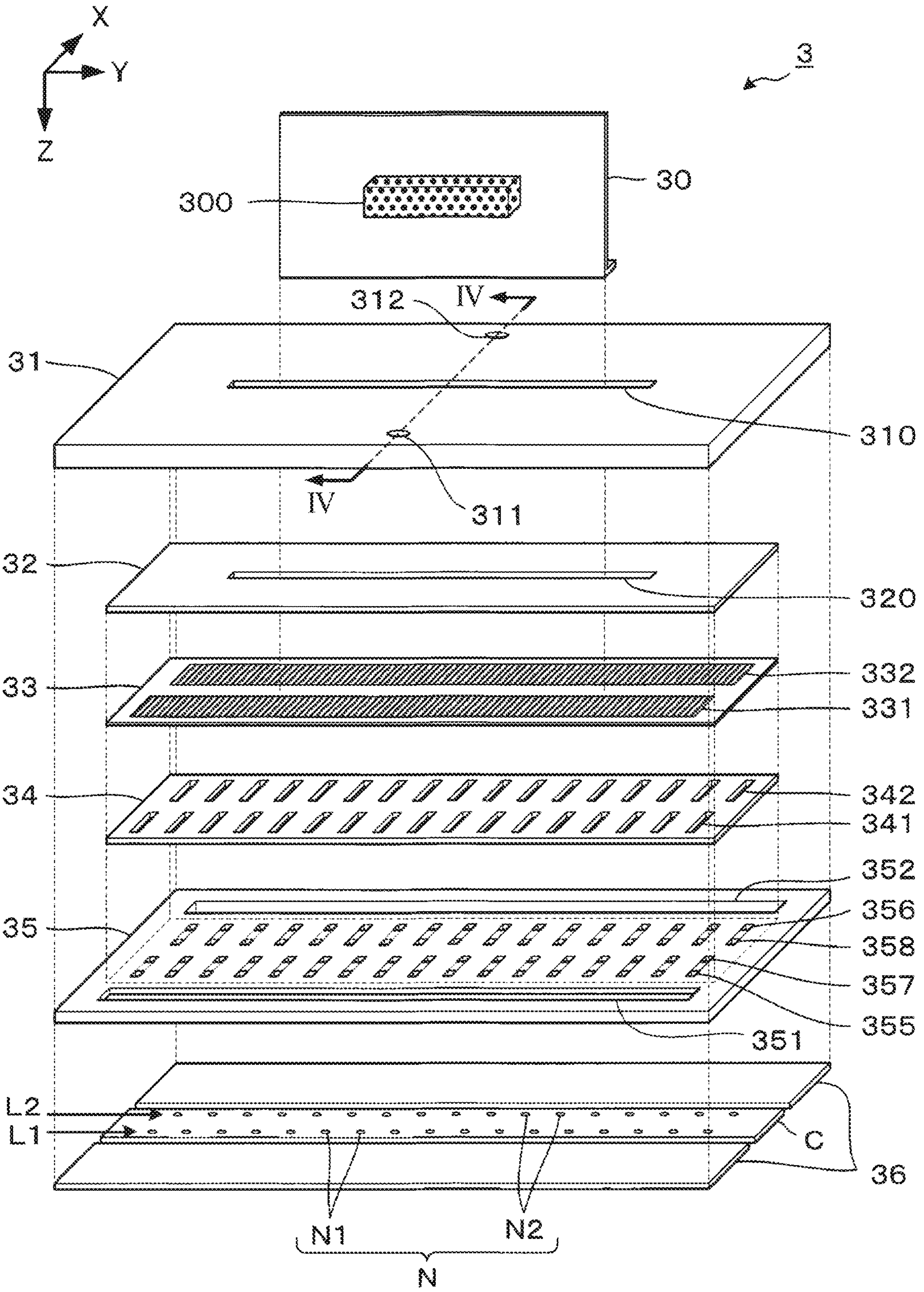
FIG. 3 is an exploded perspective view of a head chip according to the first embodiment.
Figure 4:
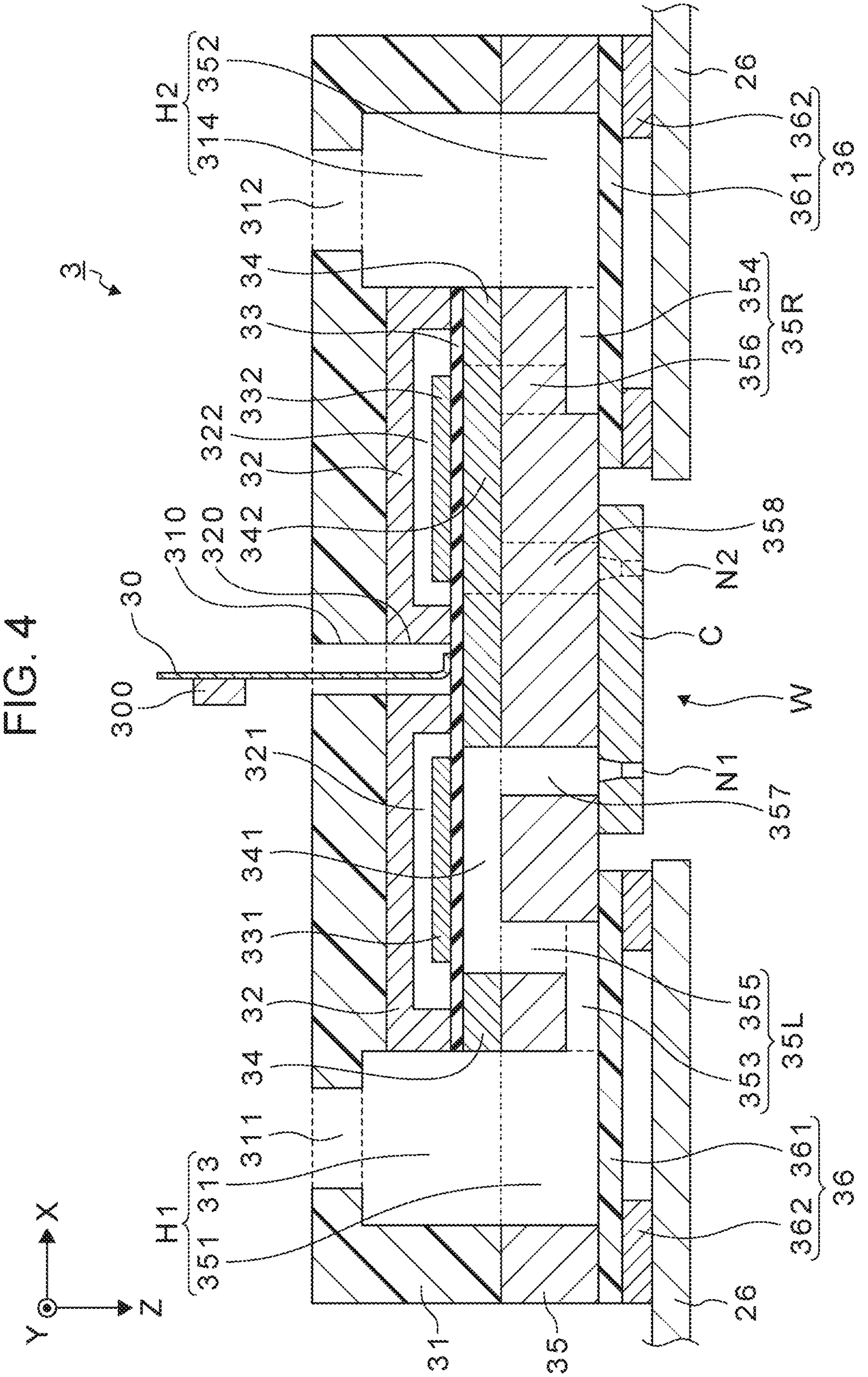
FIG. 4 is a sectional view of the head chip in FIG. 3.

FIG. 3 is an exploded perspective view of the head chip 3. FIG. 4 is a sectional view taken along line IV-IV of the head chip 3 in FIG. 3. However, in FIG. 4, in addition to the head chip 3, the fixing plate 26 is illustrated.

As illustrated in FIGS. 3 and 4, the head chip 3 includes: a flow path substrate 35; a pressure chamber forming substrate 34 provided on the upper surface of the flow path substrate 35; a vibrating plate 33 provided on the upper surface of the pressure chamber forming substrate 34; a protective plate 32 provided on the upper surface of the vibrating plate 33; a case 31 provided on the upper surface of the flow path substrate 35 and the protective plate 32; and the nozzle plate C and a compliance section 36 which are provided on the lower surface of the flow path substrate 35. The plurality of nozzles N are formed in the nozzle plate C. Specifically, the nozzle plate C is formed with a nozzle row L1 composed of a plurality of nozzles N1 and a nozzle row L2 composed of a plurality of nozzles N2.

The pressure chamber forming substrate 34 is, for example, a flat plate-shaped member formed of a silicon single crystal substrate. A plurality of pressure chambers 341 corresponding to the plurality of nozzles N1 and a plurality of pressure chambers 342 corresponding to the plurality of nozzles N2 are formed in the pressure chamber forming substrate 34.

The flow path substrate 35 is a flat plate-shaped member that forms an ink flow path and is formed of, for example, a silicon single crystal substrate. The pressure chamber forming substrate 34 is provided on the upper surface of the flow path substrate 35.

Further, the flow path substrate 35 is formed with one opening 351, a plurality of communication flow paths 35L corresponding to the plurality of nozzles N1, and a plurality of discharge flow paths 357 corresponding to the plurality of nozzles N1. Here, the discharge flow path 357 is a flow path that communicates with the pressure chamber 341 and the nozzle N1. Further, the communication flow path 35L is a flow path that communicates with the opening 351 and the pressure chamber 341 and includes a flow path 353 and a flow path 355. In the present embodiment, a case where a plurality of flow paths 353 are provided corresponding to a plurality of nozzles N1 on the flow path substrate 35 is illustrated, but a single flow path 353 may be provided in the flow path substrate 35 so as to be common to the plurality of nozzles N1.

Further, the flow path substrate 35 is formed with one opening 352, a plurality of communication flow paths 35R corresponding to the plurality of nozzles N2, and a plurality of discharge flow paths 358 corresponding to the plurality of nozzles N2. Here, the discharge flow path 358 is a flow path that communicates with the pressure chamber 342 and the nozzle N2. Further, the communication flow path 35R is a flow path that communicates with the opening 352 and the pressure chamber 342, and includes a flow path 354 and a flow path 356. In the present embodiment, a case where a plurality of flow paths 354 are provided corresponding to a plurality of nozzles N2 on the flow path substrate 35 is illustrated, but on the flow path substrate 35, a single flow path 354 may be provided so as to be common to the plurality of nozzles N2.

The compliance section 36 is a mechanism for suppressing pressure fluctuations in the flow path of the head chip 3 and includes two sealing plates 361 and two supports 362. The sealing plate 361 is a flexible film-shaped resin member. Of the two sealing plates 361, one sealing plate 361 closes the opening 351 and the flow path 353, which are provided in the flow path substrate 35, from the +Z direction side. Of the two sealing plates 361, the other sealing plate 361 closes the opening 352 and the flow path 354, which are provided in the flow path substrate 35, from the +Z direction side. The support 362 is formed of a metal such as stainless steel. The support 362 fixes the sealing plate 361 to the flow path substrate 35. The two sealing plates 361 may be one common sealing plate 361, and the two supports 362 may be one common support 362.

The vibrating plate 33 is provided on the upper surface of the pressure chamber forming substrate 34. The vibrating plate 33 is a flat plate-shaped member that can vibrate elastically and is composed of a laminate of an elastic film made of an elastic material such as silicon oxide and an insulating film made of an insulating material such as zirconium oxide. The pressure chamber 341 and the pressure chamber 342 described above are spaces sandwiched between the upper surface of the flow path substrate 35 and the lower surface of the vibrating plate 33.

As illustrated in FIGS. 3 and 4, the piezoelectric element 331 is provided on the upper surface of the vibrating plate 33 so as to overlap a part or the entirety of the pressure chamber 341 when viewed in the +Z direction. In addition, the piezoelectric element 332 is provided on the upper surface of the vibrating plate 33 so as to overlap a part or the entirety of the pressure chamber 342 when viewed in the +Z direction. The piezoelectric element 331 is provided corresponding to the nozzle row L1 included in the head chip 3. The piezoelectric element 332 is provided corresponding to the nozzle row L2 included in the head chip 3. In other words, the piezoelectric element 331 or 332 is provided corresponding to all of the nozzles N included in the head chip 3.

As illustrated in FIG. 4, the case 31 is fixed to the upper surfaces of the flow path substrate 35 and the protective plate 32. The case 31 is integrally formed, for example, by molding a resin material.

The case 31 is formed with a space 313 that forms a storage chamber H1 together with the opening 351 of the flow path substrate 35, and the supply port 311 that communicates with the storage chamber H1 and the supply flow path 251. Ink introduced from the supply port 311 is stored in the storage chamber H1. The ink stored in the storage chamber H1 is supplied to the pressure chamber 341 via the communication flow path 35L. The ink supplied to the pressure chamber 341 is discharged from the nozzle N1 in the +Z direction via the discharge flow path 357.

In addition, the case 31 is formed with a space 314 that forms a storage chamber H2 together with the opening 352 of the flow path substrate 35, and the supply port 312 that communicates with the storage chamber H2 and the supply flow path 251. Ink introduced from the supply port 312 is stored in the storage chamber H2. The ink stored in the storage chamber H2 is supplied to the pressure chamber 342 via the communication flow path 35R. The ink supplied to the pressure chamber 342 is discharged from the nozzle N2 in the +Z direction via the discharge flow path 358.

The wiring substrate 30 is inserted through an opening 310 that passes through the case 31 in the Z-axis direction and an opening 320 that passes through the protective plate 32 in the Z-axis direction, and the end portion of the wiring substrate 30 is joined to the vibrating plate 33. The wiring substrate 30 is a wiring substrate on which wiring for transmitting the driving signal Com to the piezoelectric element 331 and the piezoelectric element 332 is formed.

As illustrated in FIGS. 3 and 4, the wiring substrate 30 is provided with the driving circuit 300. The driving signal Com and the print signal SI are supplied to the driving circuit 300 from the control section 8. The driving circuit 300 switches between supplying and not supplying the driving signal Com to each of the plurality of piezoelectric elements 331 and each of the plurality of piezoelectric elements 332 based on the print signal SI.

The fixing plate 26 is a flat plate-shaped member. The fixing plate 26 is made of metal. A suitable metal for forming the fixing plate 26 is, for example, stainless steel. As illustrated in FIGS. 2 and 4, the fixing plate 26 is provided with the plurality of plate openings W corresponding to the plurality of head chips 3 included in the head module 2. Each plate opening W has a shape corresponding to the nozzle plate C. Specifically, the plate opening W has a rectangular shape that is long in the Y-axis direction. In the present embodiment, when the head module 2 is viewed in the −Z direction, each head chip 3 is fixed to the lower surface of the fixing plate 26 with, for example, an adhesive in a state where the nozzle plate C is positioned inside the plate opening W. Accordingly, the nozzle N of each nozzle row is arranged in the plate opening W.

Figure 23:
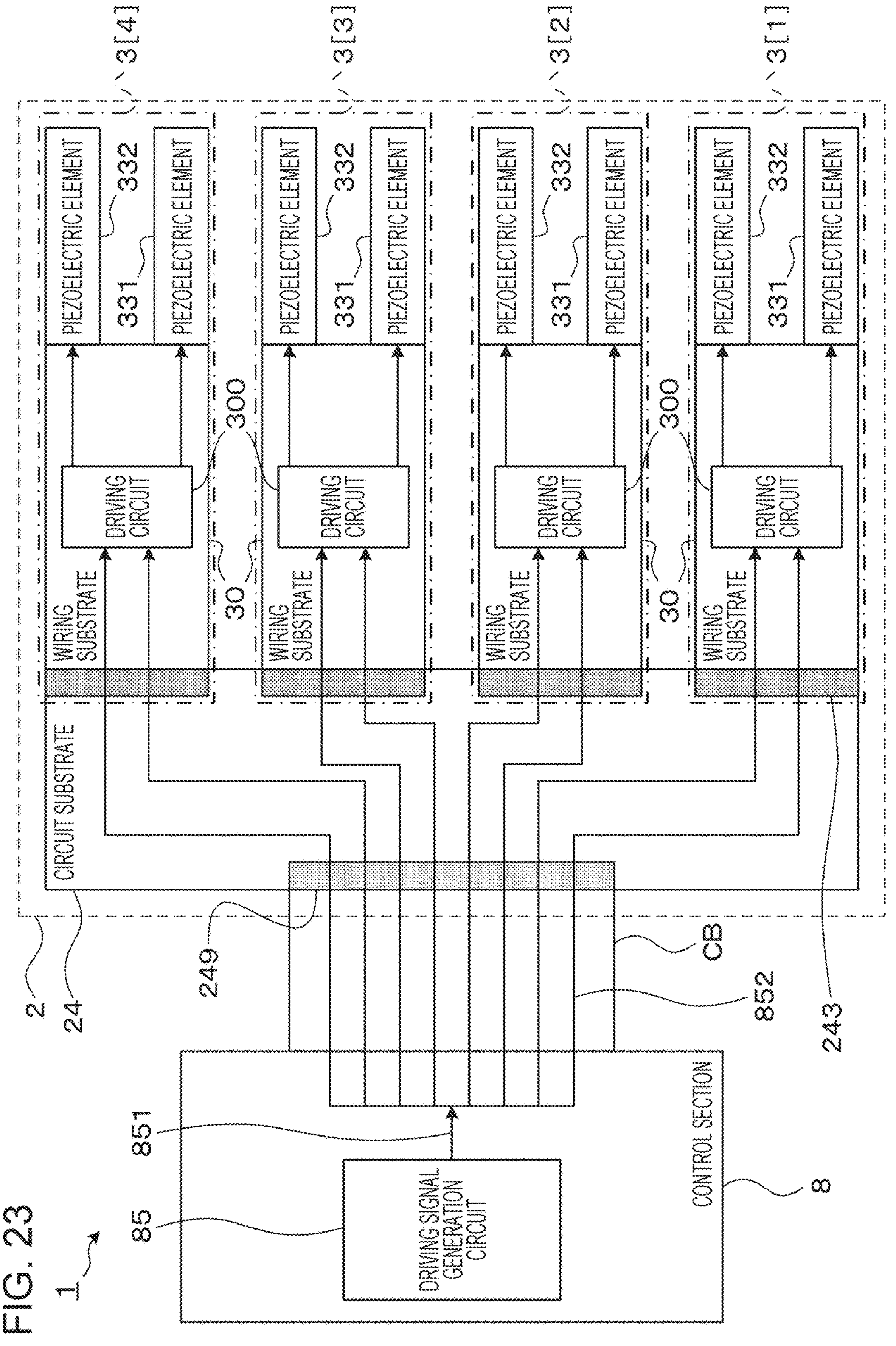
FIG. 23 is a block diagram illustrating a transmission path of a driving signal in the ink jet printer according to the first embodiment.

FIG. 23 is a block diagram illustrating a transmission path of the driving signal Com in the ink jet printer 1 according to the first embodiment. As illustrated in FIG. 23, the control section 8 includes one driving signal generation circuit 85. The driving signal generation circuit 85 generates the driving signal Com, which is a signal for discharging ink from the nozzle N by driving the piezoelectric elements 331 and 332. Further, the driving signal generation circuit 85 generates the driving signal Com at every constant time t. The generated driving signal Com is supplied to the piezoelectric elements 331 and 332 which are provided corresponding to all of the nozzles N provided in all of the head chips 3 included in the head module 2 of the ink jet printer 1 via a wiring 851, a wiring 852, the connector 249, the wiring pattern formed on the circuit substrate 24, the substrate terminal 243, the wiring substrate 30, and the driving circuit 300. In the first embodiment, the control section 8 includes one wiring 851. The wiring 851 is a common wiring for supplying the driving signal Com generated in the driving signal generation circuit 85 to the plurality of piezoelectric elements 331 and 332. Therefore, the driving signal generation circuit 85 can supply the common driving signal Com to the piezoelectric element 331 and the piezoelectric element 332. In other words, the driving signal generation circuit 85 supplies the driving signals Com having waveforms of the same shape to all of the piezoelectric elements 331 and the piezoelectric elements 332 at the same timing at every time t.

1.3. Regarding Position of Nozzle and Formation of Dots by Discharging Ink

Figure 5:
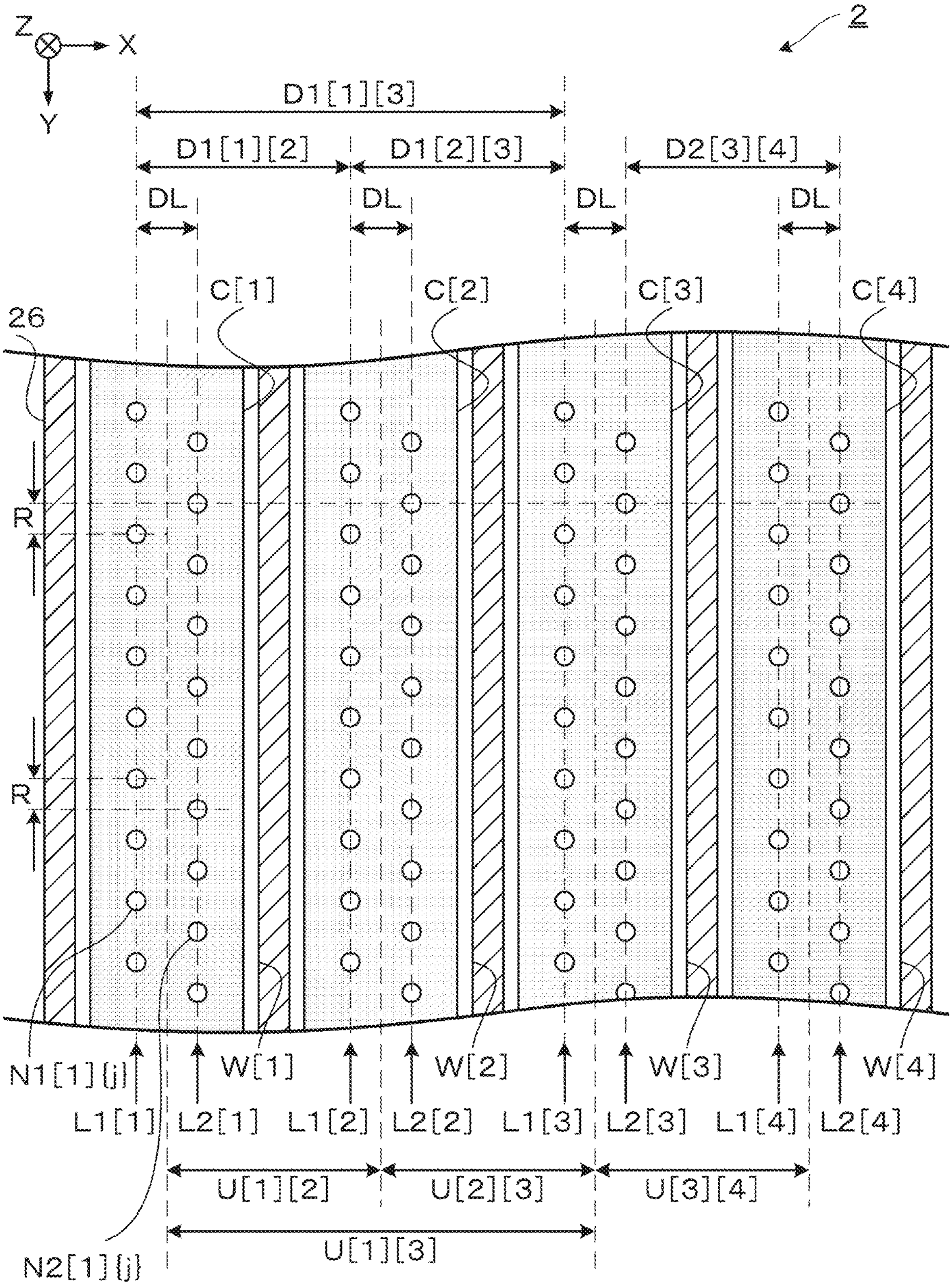
FIG. 5 is an explanatory view illustrating a positional relationship between a nozzle plate and a fixing plate in the head module according to the first embodiment.

FIG. 5 is an explanatory view illustrating a positional relationship between the nozzle plate C and the fixing plate 26 in the head module 2 according to the first embodiment. In addition, FIG. 5 illustrates various positional relationships when the head module 2 is viewed through from the −Z direction to the +Z direction.

As illustrated in FIG. 5, the head module 2 includes the nozzle plate C[1], the nozzle plate C[2], the nozzle plate C[3], and the nozzle plate C[4]. Each of the nozzle plate C[1], the nozzle plate C[2], the nozzle plate C[3], and the nozzle plate C[4] forms the head chips 3 different from each other. Here, it is assumed that all of the four nozzle plates including the nozzle plate C[1], the nozzle plate C[2], the nozzle plate C[3], and the nozzle plate C[4] have a common structure, and the four nozzle plates are collectively referred to as a nozzle plate C[m]. Here, the value m is any natural number satisfying $1 \le m \le 4$. In the following, when the head module 2 includes M nozzle plates C, it may be expressed that the head module 2 includes the nozzle plates C[1] to C[M]. In this case, the value M is a natural number of 2 or more, and the value m is any natural number satisfying 1≤m≤M. In the first embodiment, M=4. Further, the m-th nozzle plate C[m] is arranged away from the reference nozzle plate C[1], which is a reference, in the +X direction as the value m becomes larger than 1. When the head module 2 includes four nozzle plates C, the value m can be any value satisfying 1≤m≤4, but the value m is a specific value (for example, "m=1") satisfying 1≤m≤4 unless otherwise specified. In addition, when the head module 2 includes M nozzle plates C, the value m can be any value satisfying 1≤m≤M, but the value m is a specific value (for example, "m=1") satisfying 1≤m≤M unless otherwise specified.

In the first embodiment, for the value m which is any natural number satisfying 1≤m≤M, the nozzle plate C[m] has a nozzle row L1[m] and a nozzle row L2[m] having J nozzles N for discharging ink. In other words, the nozzle plate C[1] includes a nozzle row L1[1] having J nozzles N for discharging ink and a nozzle row L2[1] having J nozzles N for discharging ink. Further, the nozzle plate C[2] includes a nozzle row L1[2] having J nozzles N for discharging ink and a nozzle row L2[2] having J nozzles N for discharging ink. Further, the nozzle plate C[3] includes a nozzle row L1[3] having J nozzles N for discharging ink and a nozzle row L2[3] having J nozzles N for discharging ink. Further, the nozzle plate C[4] includes a nozzle row L1[4] having J nozzles N for discharging ink and a nozzle row L2[4] having J nozzles N for discharging ink. Here, the nozzle row L1[m] and the nozzle row L2[m] are parallel to each other. Further, the nozzle plate C[m] is fixed such that the nozzle row L1[m] and the nozzle row L2[m] intersect the main scanning direction, that is, the X-axis direction in the present embodiment. Specifically, the nozzle plate C[m] is fixed such that both the nozzle row L1[m] and the nozzle row L2[m] are parallel to each other in the Y-axis direction. The value J is a natural number of 2 or more.

In the present embodiment, both the nozzle row L1[m] and the nozzle row L2[m] are provided at positions where the distances from the center of the nozzle plate C[m] are the same in the X-axis direction. In other words, in the present embodiment, both the nozzle row L1[1] and the nozzle row L2[1] are provided at positions where the distances from the center of the nozzle plate C[1] are the same in the X-axis direction. In addition, in the present embodiment, both the nozzle row L1[2] and the nozzle row L2[2] are provided at positions where the distances from the center of the nozzle plate C[2] are the same in the X-axis direction. In addition, in the present embodiment, both the nozzle row L1[3] and the nozzle row L2[3] are provided at positions where the distances from the center of the nozzle plate C[3] are the same in the X-axis direction. In addition, in the present embodiment, both the nozzle row L1[4] and the nozzle row L2[4] are provided at positions where the distances from the center of the nozzle plate C[4] are the same in the X-axis direction.

In the present embodiment, the nozzle row L1[m] is provided at a position moved in the −X direction from the center of the nozzle plate C[m], and the nozzle row L2[m] is provided at a position moved in the +X direction from the center of the nozzle plate C[m]. In other words, in the present embodiment, the nozzle row L1[1] is provided at a position moved in the −X direction from the center of the nozzle plate C[1], and the nozzle row L2[1] is provided at a position moved in the +X direction from the center of the nozzle plate C[1]. Further, in the present embodiment, the nozzle row L1[2] is provided at a position moved in the −X direction from the center of the nozzle plate C[2], and the nozzle row L2[2] is provided at a position moved in the +X direction from the center of the nozzle plate C[2]. Further, in the present embodiment, the nozzle row L1[3] is provided at a position moved in the −X direction from the center of the nozzle plate C[3], and the nozzle row L2[3] is provided at a position moved in the +X direction from the center of the nozzle plate C[3]. Further, in the present embodiment, the nozzle row L1[4] is provided at a position moved in the −X direction from the center of the nozzle plate C[4], and the nozzle row L2[4] is provided at a position moved in the +X direction from the center of the nozzle plate C[4]. The center of the nozzle plate C[m] referred to as here is the geometric center of the nozzle plate C[m] observed in the Z-axis direction.

In the present embodiment, the distance between the nozzle row L1[m] and the nozzle row L2[m] in the X-axis direction is referred to as a nozzle row distance DL. In other words, in the present embodiment, the distance between the nozzle row L1[1] and the nozzle row L2[1] in the X-axis direction is the nozzle row distance DL. Further, in the present embodiment, the distance between the nozzle row L1[2] and the nozzle row L2[2] in the X-axis direction is the nozzle row distance DL. Further, in the present embodiment, the distance between the nozzle row L1[3] and the nozzle row L2[3] in the X-axis direction is the nozzle row distance DL. Further, in the present embodiment, the distance between the nozzle row L1[4] and the nozzle row L2[4] in the X-axis direction is the nozzle row distance DL.

In the present embodiment, it is assumed that the center of the head chip 3[m] coincides with the center of the nozzle plate C[m] included in the head chip 3[m] in the X-axis direction. In other words, in the present embodiment, it is assumed that the center of the head chip 3[1] coincides with the center of the nozzle plate C[1] included in the head chip 3[1] in the X-axis direction. Further, in the present embodiment, it is assumed that the center of the head chip 3[2] coincides with the center of the nozzle plate C[2] included in the head chip 3[2] in the X-axis direction. Further, in the present embodiment, it is assumed that the center of the head chip 3[3] coincides with the center of the nozzle plate C[3] included in the head chip 3[3] in the X-axis direction. Further, in the present embodiment, it is assumed that the center of the head chip 3[4] coincides with the center of the nozzle plate C[4] included in the head chip 3[4] in the X-axis direction. However, the present disclosure is not limited to such an aspect. In the X-axis direction, the centers of each head chip 3 may not coincide with the centers of the nozzle plates C[m] included in each head chip 3.

Further, the distance between certain two nozzles N is determined with reference to the geometric center observed in the Z-axis direction of each of the two nozzles N. Further, the distance between certain two nozzle rows in the X-axis direction is obtained with reference to the geometric center observed in the Z-axis direction of each of the total of two nozzles N provided in each of the two nozzle rows.

In the first embodiment, the nozzle N provided at the j1-th position from the end on the −Y direction side toward the +Y direction in the nozzle row L1[m] provided in the nozzle plate C[m] is expressed as a nozzle N1[m]{j1}. Here, the value j1 is a natural number satisfying "1≤j1≤J". The nozzle N1[m]{1} which is the nozzle N provided at the first position from the end on the −Y direction side toward the +Y direction in the nozzle row L1[m] provided in the nozzle plate C[m] is the nozzle N positioned on the most −Y direction side in the nozzle row L1[m]. Similarly, the nozzle N provided at the j2-th position from the end on the −Y direction side toward the +Y direction in the nozzle row L2[m] provided in the nozzle plate C[m] is expressed as a nozzle N2[m]{j2}. Here, the value j2 is a natural number satisfying "1≤j2≤J". The nozzle N2[m]{1} which is the nozzle N provided at the first position from the end on the −Y direction side toward the +Y direction in the nozzle row L2[m] provided in the nozzle plate C[m] is the nozzle N positioned on the most −Y direction side in the nozzle row L2[*m*].

In the present embodiment, the J nozzles N included in the nozzle row L1[m] are evenly arranged such that the distance between the two nozzles N adjacent to each other is constant in the Y-axis direction. In addition, in the present embodiment, the J nozzles N included in the nozzle row L2[m] are evenly arranged such that the distance between the two nozzles N adjacent to each other is constant in the Y-axis direction. Specifically, the J nozzles N included in the nozzle row L1[1] are evenly arranged such that the distance between the two nozzles N adjacent to each other is constant in the Y-axis direction. The J nozzles N included in the nozzle row L2[1] are evenly arranged such that the distance between the two nozzles N adjacent to each other is constant in the Y-axis direction. The J nozzles N included in the nozzle row L1[2] are evenly arranged such that the distance between the two nozzles N adjacent to each other is constant in the Y-axis direction. The J nozzles N included in the nozzle row L2[2] are evenly arranged such that the distance between the two nozzles N adjacent to each other is constant in the Y-axis direction. The J nozzles N included in the nozzle row L1[3] are evenly arranged such that the distance between the two nozzles N adjacent to each other is constant in the Y-axis direction. The J nozzles N included in the nozzle row L2[3] are evenly arranged such that the distance between the two nozzles N adjacent to each other is constant in the Y-axis direction. The J nozzles N included in the nozzle row L1[4] are evenly arranged such that the distance between the two nozzles N adjacent to each other is constant in the Y-axis direction. The J nozzles N included in the nozzle row L2[4] are evenly arranged such that the distance between the two nozzles N adjacent to each other is constant in the Y-axis direction.

The nozzle N1[m]{j} in the nozzle plate C[m] is provided at a position displaced in the −Y direction with respect to the nozzle N2[m]{j}. In the Y-axis direction, the nozzle distance between the nozzle N1[m]{j} and the nozzle N2[m]{j} is equal to the nozzle distance between the nozzle N2[m]{j} and the nozzle N1[m]{j+1}, and the distance is referred to as a distance R. In other words, in the Y-axis direction, between the nozzles N1[m]{j} and the nozzles N1[m]{j+1} adjacent to each other among the J nozzles N included in the nozzle row L1[m], the nozzle N2[m]{j} among the J nozzles N included in the nozzle row L2[m] is provided. Here, the value j is a natural number satisfying "1≤j≤J−1".

Specifically, in the Y-axis direction, between the nozzles N1[1]{j} and the nozzles N1[1]{j+i} adjacent to each other among the J nozzles N included in the nozzle row L1[1], the nozzle N2[1]{j} among the J nozzles N included in the nozzle row L2[1] is provided. In addition, in the Y-axis direction, between the nozzles N1[2]{j} and the nozzles N1[2]{j+1} adjacent to each other among the J nozzles N included in the nozzle row L1[2], the nozzle N2[2]{j} among the J nozzles N included in the nozzle row L2[2] is provided. In addition, in the Y-axis direction, between the nozzles N1[3]{j} and the nozzles N1[3]{j+1} adjacent to each other among the J nozzles N included in the nozzle row L1[3], the nozzle N2[3]{j} among the J nozzles N included in the nozzle row L2[3] is provided. In addition, in the Y-axis direction, between the nozzles N1[4]{j} and the nozzles N1[4]{j+1} adjacent to each other among the J nozzles N included in the nozzle row L1[4], the nozzle N2[4]{j} among the J nozzles N included in the nozzle row L2[4] is provided. Further, in the Y-axis direction, the distance between the nozzle N1[1]{j} and the nozzle N2[1]{j} is the distance R, and the distance between the nozzle N2[1]{j} and the nozzle N1[1]{j+1} is the distance R. Further, in the Y-axis direction, the distance between the nozzle N1[2]{j} and the nozzle N2[2]{j} is the distance R, and the distance between the nozzle N2[2]{j} and the nozzle N1[2]{j+1} is the distance R. Further, in the Y-axis direction, the distance between the nozzle N1[3]{j} and the nozzle N2[3]{j} is the distance R, and the distance between the nozzle N2[3]{j} and the nozzle N1[3]{j+1} is the distance R. Further, in the Y-axis direction, the distance between the nozzle N1[4]{j} and the nozzle N2[4]{j} is the distance R, and the distance between the nozzle N2[4]{j} and the nozzle N1[4]{j+1} is the distance R.

In the first embodiment, the distance between the two corresponding sets of nozzle rows provided in the two nozzle plates C[m1] and C[m2] is expressed as follows.

In the X-axis direction, the distance between the nozzle row L1[m1] provided in the nozzle plate C[m1] and the nozzle row L1[m2] provided in the nozzle plate C[m2] is expressed as the nozzle row distance D1[m1][m2]. Similarly, the distance between the nozzle row L2[m1] provided in the nozzle plate C[m1] and the nozzle row L2[m2] provided in the nozzle plate C[m2] is expressed as a nozzle row distance D2[m1][m2]. Here, the value m1 and the value m2 are any natural number satisfying 1<m1<m2≤M. When the value m1 and the value m2 satisfy "m2=1+m1", the nozzle plate C[m2] is adjacent to the nozzle plate C[m1] in the +X direction of the nozzle plate C[m1].

The fixing plate 26 is provided with M plate openings W[1] to W[M] corresponding to M nozzle plates C[1] to C[M] on a one-to-one basis. In the head chip 3[m], the nozzle row L1[m] and the nozzle row L2[m] provided in the nozzle plate C[m] included in the head chip 3[m] are fixed to the fixing plate 26 so as to be exposed from the plate opening W[m] provided in the fixing plate 26. Here, it is assumed that the M plate openings W[1] to W[M] provided in the fixing plate 26 all have a common shape. The plate opening W[m2] is provided in the +X direction of the plate opening W[m1].

In the first embodiment, it is assumed that the nozzle plates C[1] to C[M] are all fixed at the same position in the Y-axis direction. In this case, for the value m1 and the value m2, which are any natural number satisfying 1≤m1<m2≤M, the nozzle N1[m1]{j1} on the nozzle row L1[m1] and the nozzle N1[m2]{j1} on the nozzle row L1[m2] are arranged at the same position in the Y-axis direction. In other words, the nozzle N1[1]{j1} on the nozzle row L1[1], the nozzle N1[2]{j1} on the nozzle row L1[2], the nozzle N1[3]{j1} on the nozzle row L1[3], and the nozzle N1[4]{j1} on the nozzle row L1[4] are arranged at the same position in the Y-axis direction.

The distance between the center of the plate opening W[m1] and the center of the plate opening W[m2] in the X-axis direction is expressed as a plate opening distance U[m1][m2]. The center of the plate opening W[m] referred to as here is the geometric center of the plate opening W[m] observed in the Z-axis direction.

In the first embodiment, when the value m1 and the value m2 satisfy "m2=1+m1" and M≥3, it is assumed that the plate opening distance U[m1][m2] is a constant distance. In other words, in the present embodiment, it is assumed that the plate opening distances U[1][2] to U[M−1][M] are all equal. Further, in the present embodiment, it is assumed that the nozzle plate C[m] is fixed such that the relative positional relationship between the nozzle plate C[m] and the plate opening W[m] in the X-axis direction is constant. Specifically, in the present embodiment, it is assumed that the distance between the center of the nozzle plate C[m] and the center of the plate opening W[m] in the X-axis direction is constant. More specifically, it is assumed that, in the X-axis direction, the distance between the center of the nozzle plate C[1] and the center of the plate opening W[1], the distance between the center of the nozzle plate C[2] and the center of the plate opening W[2], the distance between the center of the nozzle plate C[3] and the center of the plate opening W[3], and the distance between the center of the nozzle plate C[4] and the center of the plate opening W[4] are constant. In this case, the nozzle row distance D1[1][2] to D1[M−1][M] and the nozzle row distance D2[1][2] to D2[M−1][M] are all equal.

Figure 6:
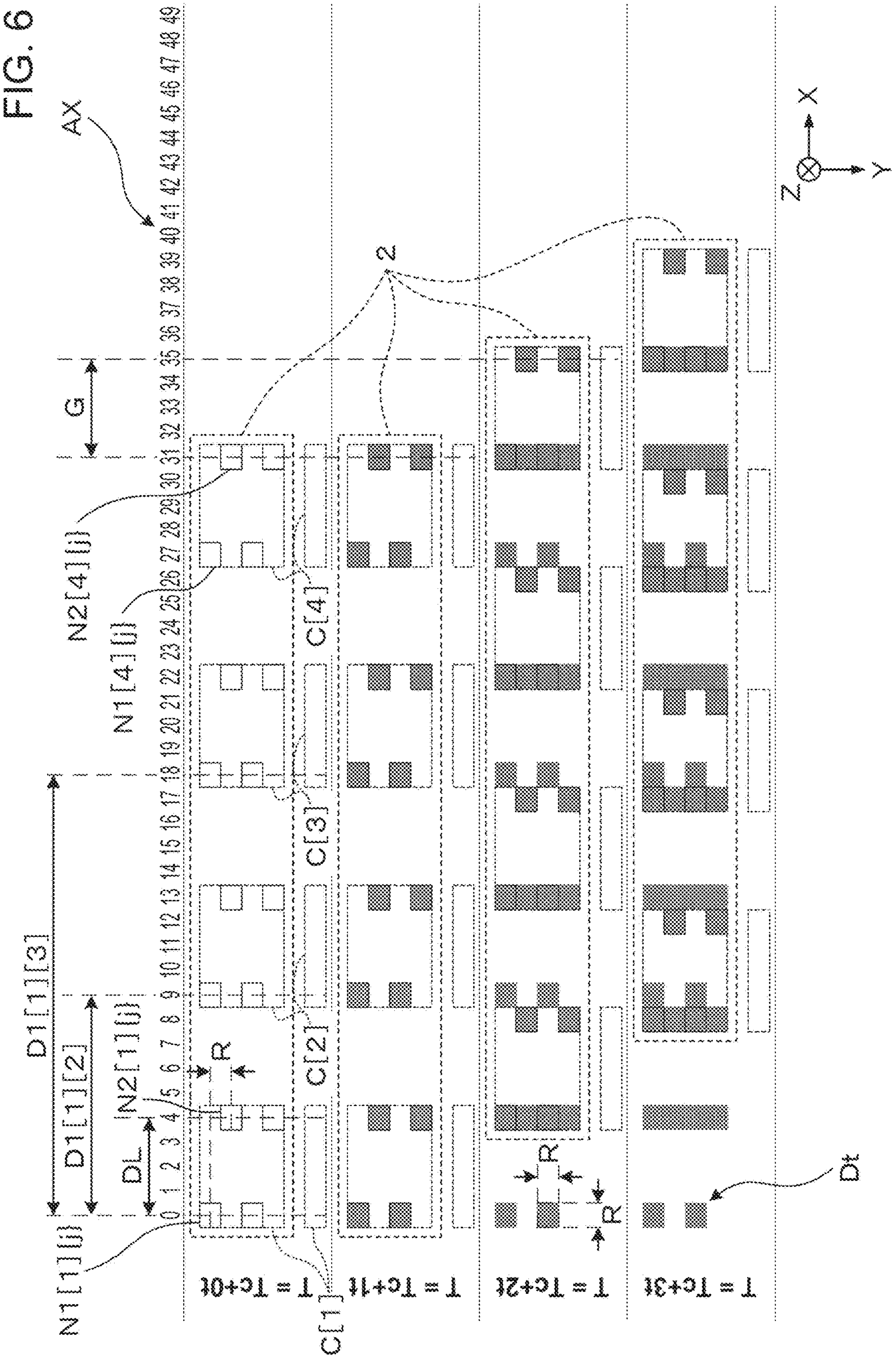
FIG. 6 is an explanatory view illustrating an operation of the head module according to the first embodiment and a positional relationship of formed dots.
Figure 7:
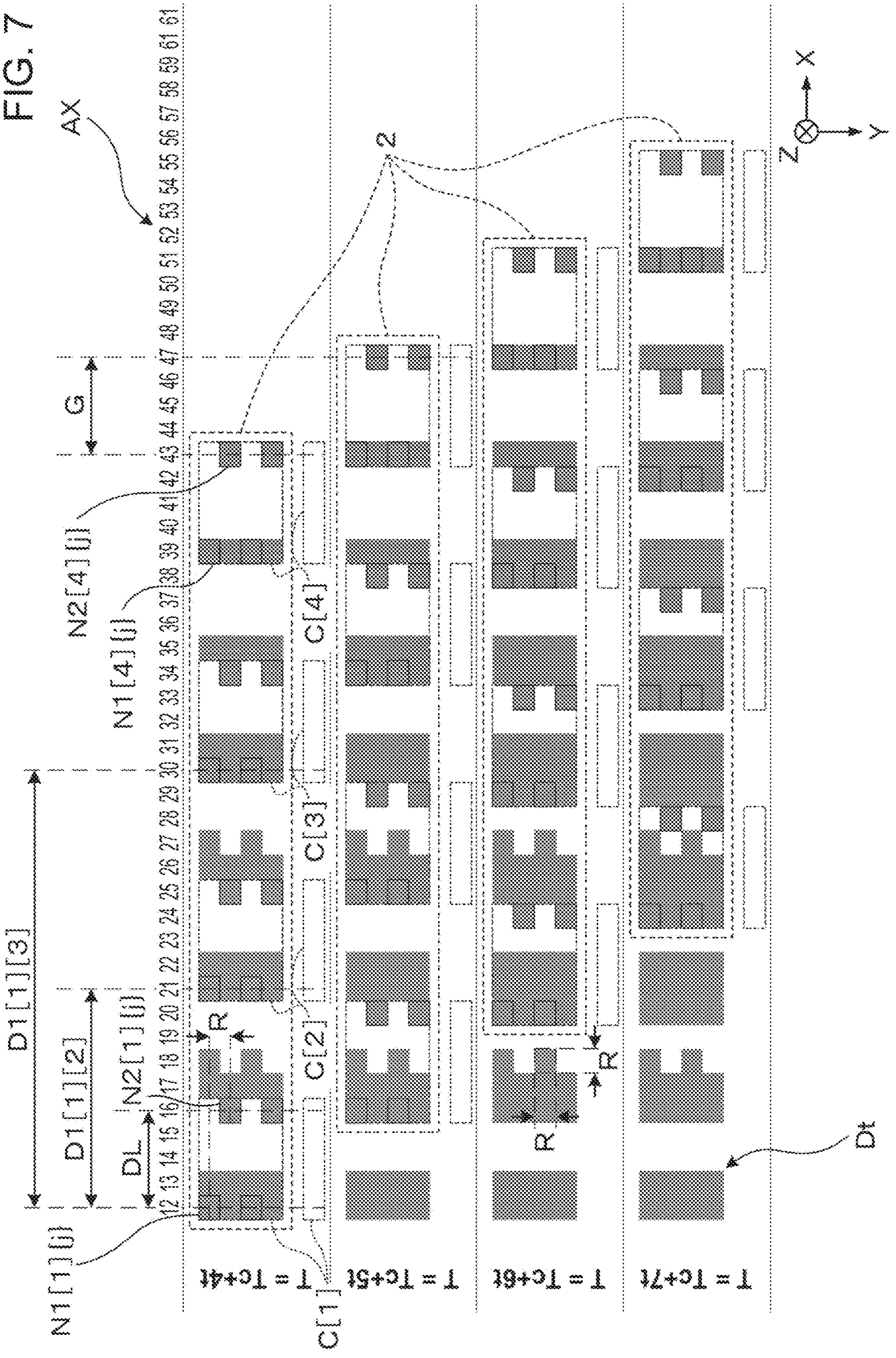
FIG. 7 is an explanatory view illustrating an operation of the head module according to the first embodiment and a positional relationship of formed dots.
Figure 8:
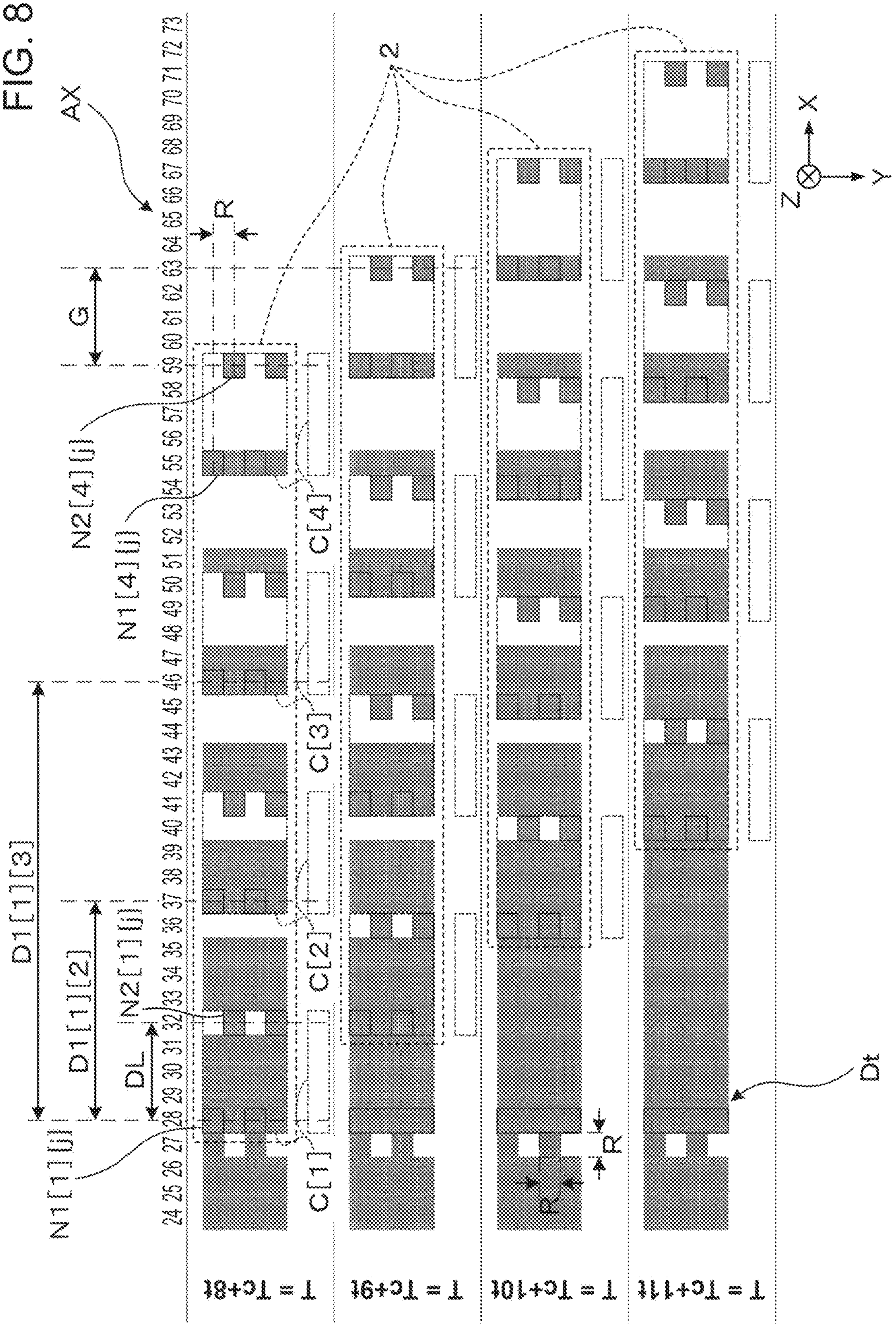
FIG. 8 is an explanatory view illustrating an operation of the head module according to the first embodiment and a positional relationship of formed dots.

FIGS. 6 to 8 are explanatory views illustrating the operation of the head module 2 and the positional relationship between formed dots Dt when the printing operation is performed using the head module 2 illustrated in FIG. 5. In FIGS. 6 to 8, the positions of the nozzles N at each time are illustrated by solid line rectangles. Further, the positions of M nozzle plates C[1] to C[M] having a plurality of nozzles N are illustrated by a broken line rectangles. Further, the position of the dot Dt formed by the ink discharged from the nozzle N is illustrated by a rectangular hatched region. In FIGS. 6 to 8, the printing operation is described focusing on M nozzles N1[1]{j} to N1[M]{j}, M nozzles N2[1]{j} to N2[M]{j}, M nozzles N1[1]{j+1} to N1[M]{j+1}, and M nozzles N2[1]{j+1} to N2[M]{j+1} among the total of 2×M×J nozzles N provided in the M nozzle plates C[1] to C[M] included in the head module 2 illustrated in FIG. 5. As described above, in the present embodiment, it is assumed that M=4. Therefore, in FIGS. 6 to 8, the four nozzles N1[1]{j} to N1[4]{j}, the four nozzles N2[1]{j} to N2[4]{j}, the four nozzles N1[1]{j+1} to N1[4]{j+1}, and the four nozzles N2[1]{j+1} to N2[4]{j+1} among the total of 8×J nozzles N, which are provided in the M nozzle plates C[1] to C[4] included in the head module 2, are illustrated.

Further, FIGS. 6 to 8 illustrate a process of forming the dots Dt when the head module 2 discharges ink while moving in the +X direction in the X-axis direction, which is the main scanning direction, with the passage of time. Of these, FIG. 6 illustrates the positional relationship between the head module 2 and the dots Dt when the time T is Tc+0t to Tc+3t. In addition, FIG. 7 illustrates the positional relationship between the head module 2 and the dots Dt when the time T is Tc+4t to Tc+7t. In addition, FIG. 8 illustrates the positional relationship between the head module 2 and the dots Dt when the time T is Tc+8t to Tc+11t. Here, the time Tc represents the time when the supply of the print signal SI to the head module 2 is started for the printing operation. Further, the time t is the time from the formation of the dot Dt by the head module 2 to the formation of the next dot Dt. For clarification, the positions of the nozzle plate C[m] in the X-axis direction at each time are illustrated below the broken line rectangle indicating the head module 2 by using a broken line rectangle having the same height as the distance R. Further, for convenience of illustration, in FIGS. 6 to 8, the dot Dt is a square having a width equal to the distance R in the X-axis direction and the Y-axis direction, and it is considered that all the dots Dt have the same shape.

As described above, in the first embodiment, the time t is the time from the formation of the dot Dt by the head module 2 to the formation of the next dot Dt. In other words, the time t is a cycle in which the driving signal Com supplied to the piezoelectric elements 331 and 332 provided corresponding to the nozzles N for discharging the ink for forming the dots Dt is generated.

Further, the time t is a value that is constrained by conditions such as the responsiveness and stability of the fluid motion of the ink. For example, when the scanning speed of the head module 2 is set to twice the predetermined reference speed, the minimum distance between the dots Dt formed by using a certain specific nozzle N becomes twice that when the head module 2 is scanned at the predetermined reference speed. Therefore, when the scanning speed of the head module 2 is set to twice the predetermined reference speed, the resolution in the X-axis direction becomes half that when the head module 2 is scanned at the predetermined reference speed. Here, even when the scanning speed of the head module 2 is set to twice the predetermined reference speed, when the time t, which is the cycle in which the dot Dt is formed, can be halved, the minimum distance between the dots Dt formed using a certain specific nozzle N can be set equal to that when the scanning speed of the head module 2 is the predetermined reference speed. However, the time t determined under the above-described restrictions cannot be set to any value. In other words, it may not be possible to halve the time t, which is the cycle in which the dot Dt is formed. Therefore, the scanning speed is a rate-limiting condition when determining the resolution. In other words, when the scanning speed of the head module 2 is set to twice the predetermined reference speed, the minimum distance between the dots Dt formed by using a certain specific nozzle N cannot be set to be equal to that when the scanning speed of the head module 2 is scanned at the predetermined reference speed.

In the first embodiment, the head module 2 discharges the first ink at time T=Tc+1t to form the dot Dt on the recording paper sheet PE, and thereafter, new dots Dt are formed every time the time t elapses. For convenience of illustration, at each time illustrated in FIGS. 6 to 8, a process of so-called solid printing in which ink is discharged from all the nozzles N provided in the head module 2 at the same timing to form the dots Dt without gaps is illustrated, but the present disclosure is not limited thereto. The head module 2 may form the dots Dt by discharging ink from some of the nozzles N. Specifically, by supplying the print signal SI to the head module 2 and designating whether or not to supply the driving signal Com to the piezoelectric element corresponding to each of the nozzles N, the dots Dt can be formed at a predetermined position every time t. Further, since all the nozzles N provided in the head module 2 are supplied with the ink introduced from the common needle hole 211 as described above, all the nozzles N discharge the same type of ink to form the dots Dt.

Various dimensions and arrangements of the head module 2, the head chip 3, the nozzle plate C, the nozzle N, and the like in the X-axis direction are set based on a basic resolution unit ΔX in the X-axis direction. Here, the resolution in the X-axis direction of an image formed by a general ink jet printer is used as the basic resolution. The basic resolution (dpi) is a value obtained by multiplying 100 by a natural number or a value obtained by multiplying 90 by a natural number, and is, for example, 100 dpi, 200 dpi, 300 dpi, 400 dpi, 600 dpi, 900 dpi, 1200 dpi, 2400 dpi, 90 dpi, 180 dpi, and 360 dpi, 540 dpi, 720 dpi, and 1080 dpi. The basic resolution unit ΔX is a length corresponding to the basic resolution, and corresponds to a distance in the X-axis direction between the dots Dt adjacent to each other in the X-axis direction of an image printed by solid printing. The distance between the adjacent dots Dt in the X-axis direction refers to the distance between the centers of the adjacent dots Dt. Further, the basic resolution unit ΔX can be referred to as a length obtained by dividing 1 inch by the maximum number of dots Dt that can be formed in 1 inch in the X-axis direction. As described above, since the basic resolution unit ΔX corresponds to the basic resolution, the basic resolution unit ΔX is a value obtained by dividing 1 by the value obtained by multiplying 100 by a natural number, or a value obtained by dividing 1 by the value obtained by multiplying 90 by a natural number, and is, for example, 1/100 inches, 1/200 inches, 1/300 inches, 1/400 inches, 1/600 inches, 1/900 inches, 1/1200 inches, 1/2400 inches, 1/90 inches, 1/180 inches, 1/360 inches, 1/540 inches, 1/720 inches, and 1/1080 inches. In other words, for example, when the basic resolution in the X-axis direction is 600 dpi, the basic resolution unit ΔX is 1/600 inches, and when the basic resolution in the X-axis direction is 360 dpi, the basic resolution unit ΔX is 1/360 inches. Further, the scanning speed of the head module 2 in the X-axis direction is set based on the basic resolution unit ΔX. For example, the head module 2 is scanned at a speed to advance by a distance G set based on the basic resolution unit ΔX every time the time t elapses after the time T=Tc+1t. Specifically, the distance G is set to a natural number multiple of the basic resolution unit ΔX.

In addition, various dimensions and arrangements of the head module 2, the head chip 3, the nozzle plate C, the nozzle N, and the like in the Y-axis direction are set based on a basic resolution unit ΔY in the Y-axis direction. The basic resolution unit ΔY is a value obtained by dividing 1 by a value obtained by multiplying 100 by a natural number or a value obtained by dividing 1 by a value obtained by multiplying 90 by a natural number, similar to the above-described basic resolution unit ΔX. For example, the distance R is set based on the basic resolution unit ΔY. Specifically, the distance R is set to a natural number multiple of the basic resolution unit ΔY.

In the first embodiment, as an example, it is assumed that the basic resolution unit ΔX is equal to the basic resolution unit ΔY. Further, in the first embodiment, as an example, it is assumed that the distance R is set to be equal to the basic resolution unit ΔX and the basic resolution unit ΔY.

In the present embodiment, the distance G is set to M times the basic resolution unit ΔX. As described above, in the present embodiment, the distance R is set to be equal to the basic resolution unit ΔX. Therefore, in the present embodiment, the distance G is equal to M times the basic resolution unit ΔX, that is, M times the distance R. In other words, in the present embodiment, the distance G is G=M×ΔX. More specifically, in the present embodiment, as described above, M=4. Therefore, in the present embodiment, the scanning speed of the head module 2 is set such that the distance G is G=4ΔX. Further, in the present embodiment, since the distance R is set to be equal to the basic resolution unit ΔX, the scanning speed of the head module 2 is set such that the distance G is G=4R.

In FIGS. 6 to 8, for convenience of description, as an X-axis coordinate AX, the position of the nozzle N1[1]{j} at time T=Tc+1t is set to "0", and every time the nozzle N1[1]{j} moves in the +X direction by the basic resolution unit ΔX, a value that increases by "1" is given. For example, in FIGS. 6 to 8, the position of the nozzle N2[4]{j} provided in the head module 2 moves from AX=31 to AX=35 while the time T elapses from Tc+1t to Tc+2t.

Further, the nozzle row distance DL is set based on the basic resolution unit ΔX in the X-axis direction. Specifically, the nozzle row distance DL is set to a natural number multiple of the basic resolution unit ΔX. Further, in the first embodiment, the above-described distance G is set to a value obtained by dividing the nozzle row distance DL by a natural number. In other words, in the present embodiment, the nozzle row distance DL is set to α times the distance G. In other words, in the present embodiment, the nozzle row distance DL is set to (M×α) times the basic resolution unit ΔX. In other words, DL=(M×α)ΔX. In the present embodiment, since the distance R is set to be equal to the basic resolution unit ΔX, the nozzle row distance DL is set to be (M×α) times the distance R. In other words, in the present embodiment, DL=(M×α)R. Here, the value α is a natural number of 1 or more. In other words, in the head module 2 that moves by (M×1)ΔX every time the time t elapses, the nozzle row L1[1] can form the dots Dt at the same position in the X-axis direction as that of the dot Dt formed by the nozzle row L2[1] provided at a position separated by (M×α) ΔX from the nozzle row L1[1] at time T, after a times the time t elapses from the time T.

Further, as described above, the nozzle row distance D1[1][ma] is determined based on the basic resolution unit ΔX in the X-axis direction. Here, the value ma is any natural number satisfying 2≤ma≤M. In addition, the value ma can be any value satisfying 2≤ma≤M, but the value ma is a specific value (for example, "ma=2") satisfying 2≤ma≤M unless otherwise specified. In this case, the nozzle row distance D1[1][ma] is set to a natural number multiple of the basic resolution unit ΔX for the value ma which is any natural number satisfying 2≤ma≤M. In other words, the nozzle row distance D1[1][2], the nozzle row distance D1[1][3], and the nozzle row distance D1[1][4] are set to a natural number multiple of the basic resolution unit ΔX. As described above, the head module 2 moves by the distance G every time the time t elapses, that is, by M times the basic resolution unit ΔX. Then, when setting the minimum distance between the dots Dt formed by the head module 2 to the basic resolution unit ΔX, it is preferable to provide the nozzle row L1[ma] such that the dots Dt can be formed at a position different from that of the dots Dt which are formed by the nozzle row L1[1] and the nozzle row L2[1] in the X-axis direction. In other words, it is preferable to provide the nozzle row L1[ma] such that the dots Dt can be formed at a position complementing the position of the dots Dt formed by the nozzle row L1[1] in the X-axis direction. Here, "complementation" will be described. As described above, in the present embodiment, the nozzle N1[1]{j1} of the nozzle row L1[1] and the nozzle N1[ma]{j1} of the nozzle row L1[ma] are arranged at the same position in the Y-axis direction, and thus these are nozzle rows for forming the same raster row as that of the nozzle row L1[1] and the nozzle row L1[ma]. In addition, "complementation" means filling the space between the dots Dt adjacent to each other along the X-axis direction formed by the nozzle N1[1]{j1} of the nozzle row L1[1] by forming the dots Dt by the nozzle N1[ma]{j1} of the nozzle row L1[ma]. Specifically, it is preferable to provide the (M−1) nozzle rows L1[2] to L1[M] such that (M−1) dots can be formed between the two closest dots Dt formed by the nozzle rows L1[1] in the X-axis direction. Therefore, in the first embodiment, the distance D1[1][ma] between the nozzle row L1[1] and the nozzle row L1[ma] is set to a distance different from the natural number multiple of the distance G. Specifically, the nozzle row distance D1[1][ma] is set to a distance obtained by adding β[ma] times the distance G and γ[ma] times the distance R. In other words, the nozzle row distance D1[1][ma] is (M×β[ma]+γ[ma]) times the basic resolution unit ΔX, that is, (M×β[ma]+γ[ma]) times the distance R. In other words, D1[1][ma]=(M×β[ma]+γ[ma])ΔX. More specifically, in the present embodiment, D1[1][2]=(M×β[2]+γ[2])ΔX, D1[1][3]=(M×β[3]+γ[3])ΔX, and D1[1][4]=(M×β[4]+γ[4])ΔX.

Here, the value β[ma] is a natural number satisfying α<β[ma]. Further, the value γ[ma] is a natural number satisfying 1≤γ[ma]≤M−1. In other words, when satisfying M=2, γ[ma]=γ[2] is 1. Further, when satisfying M≥3, the value γ[ma] satisfies γ[ma1]≠γ[ma2] when the natural number ma1 and the natural number ma2 satisfy 2≤ma1<ma2≤M. Here, for example, 1≤γ[ma]≤2 when satisfying M=3, γ[ma2] is 2 when γ[ma1] is 1, γ[ma2] is 1 when γ[ma1] is 2. Further, 1≤γ[ma]≤3 when satisfying M=4, γ[ma2] is either 2 or 3 when γ[ma1] is 1, γ[ma2] is either 1 or 3 when γ[ma1] is 2, and γ[ma2] is either 1 or 2 when γ[ma1] is 3.

As described above, in the present embodiment, the nozzle row distance DL and the nozzle row distance D1[1][ma] are set to satisfy DL:D1[1][ma]=M×α×ΔX:(M×β[ma]+γ[ma])×ΔX=M×α:M×β[ma]+γ[ma] in the X-axis direction. More specifically, in the present embodiment, the nozzle row distance DL and the nozzle row distance D1[1][2] are set to satisfy DL:D1[1][2]=M×α:M×β[2]+γ[2] in the X-axis direction. In addition, in the present embodiment, the nozzle row distance DL and the nozzle row distance D1[1][3] are set to satisfy DL:D1[1][3]=M×α:M×β[3]+γ[3] in the X-axis direction. In addition, in the present embodiment, the nozzle row distance DL and the nozzle row distance D1[1][4] are set to satisfy DL:D1[1][4]=M×α:M×β[4]+γ[4] in the X-axis direction.

As described above, in the first embodiment, it is assumed that M=4. Further, as described above, in FIGS. 6 to 8, the position of the nozzle N1[1]{j} in the X-axis direction at the time T=Tc+1t is AX=0. Further, the position of the nozzle N1[1]{j} in the X-axis direction at time T=Tc+2t is AX=4, and the position of the nozzle N1[1]{j} in the X-axis direction at time T=Tc+3t is AX=8. Accordingly, the nozzle N1[1]{j} can form the dot Dt for AX=4k−4 at the time T=Tc+kt. In other words, the nozzle N1[1]{j} can form the dot Dt for AX=4×k1. Here, the variable k is a natural number of 1 or more. Further, the variable k1 is an integer satisfying k1=k−1.

Further, in FIGS. 6 to 8, it is assumed that α=1. The nozzle N2[1]{j} is provided at a position moved from the nozzle N1[1]{j} in the +X direction by a distance equal to the nozzle row distance DL. Further, in the present embodiment, since M=4, the nozzle row distance DL is set to be (M×α) times the basic resolution unit ΔX, that is, (M×α) times the distance R, that is, four times the distance R. Accordingly, since the nozzle N2[1]{j} is provided at a position moved by 4ΔX in the +X direction from the nozzle N1[1]{j}, the dot Dt can be formed for AX=4k at the time T=Tc+kt. In other words, the nozzle N2[1]{j} can form the dot Dt for AX=4×(k1+1).

In addition, in FIGS. 6 to 8, the position of the nozzle N1[2]{j} in the X-axis direction at time T=Tc+1t is AX=9. Since the position of the nozzle N1[1]{j} in the X-axis direction at time T=Tc+1t is AX=0, in FIGS. 6 to 8, M=4 and ma=2 are substituted into the above-described equation, and D1[1][2]=(4×β[2]+γ[2])ΔX=9ΔX is expressed. As described above, since α=1<β[ma] and 1≤γ[ma]≤M−1=3, in FIGS. 6 to 8, when ma=2, β[2]=2 and γ[2]=1. Since the nozzle N1[2]{j} is provided at a position moved by AX=+9 from the nozzle N1[1]{j}, the dot Dt can be formed for AX=4k+5 at time T=Tc+kt. In other words, the nozzle N1[2]{j} can form the dot Dt for AX=4×k2+1. Here, the variable k2 is an integer satisfying k2=k+1. In other words, the variable k2 is expressed as k2=k+β[2]−1. In addition, by the γ[2]=1, the nozzle N1[2]{j} can form the dot Dt for AX=4×k2+γ[2].

In addition, in FIGS. 6 to 8, since the nozzle N2[2]{j} is provided at a position moved by 4ΔX, that is, by the distance equal to the nozzle row distance DL in the +X direction from the nozzle N1[2]{j}, the dot Dt can be formed for AX=4k+9 at the time T=Tc+kt. In other words, the nozzle N2[2]{j} can form the dot Dt for AX=4×(k2+1)+1.

In addition, in FIGS. 6 to 8, the position of the nozzle N1[3]{j} in the X-axis direction at time T=Tc+1t is AX=18. Since the position of the nozzle N1[1]{j} in the X-axis direction at time T=Tc+1t is AX=0, in FIGS. 6 to 8, M=4 and ma=3 are substituted into the above-described equation, and D1[1][3]=(4×β[3]+γ[3])ΔX=18ΔX is expressed. As described above, since α=1<β[ma] and 1≤γ[ma]≤M−1=3, in FIGS. 6 to 8, when ma=3, β[3]=4 and γ[3]=2. Since the nozzle N1[3]{j} is provided at a position moved by AX=+18 from the nozzle N1[1]{j}, the dot Dt can be formed for AX=4k+14 at time T=Tc+kt. In other words, the nozzle N1[3]{j} can form the dot Dt for AX=4×k3+2. Here, the variable k3 is an integer satisfying k3=k+3. In other words, the variable k3 is expressed as k3=k+β[3]−1. In addition, by the γ[3]=2, the nozzle N1[3]{j} can form the dot Dt for AX=4×k3+γ[3].

In addition, in FIGS. 6 to 8, since the nozzle N2[3]{j} is provided at a position moved by 4ΔX, that is, by the distance equal to the nozzle row distance DL in the +X direction from the nozzle N1[3]{j}, the dot Dt can be formed for AX=4k+18 at the time T=Tc+kt. In other words, the nozzle N2[3]{j} can form the dot Dt for AX=4×(k3+1)+2.

In addition, in FIGS. 6 to 8, the position of the nozzle N1[4]{j} in the X-axis direction at time T=Tc+1t is AX=27. Since the position of the nozzle N1[1]{j} in the X-axis direction at time T=Tc+1t is AX=0, in FIGS. 6 to 8, M=4 and ma=4 are substituted into the above-described equation, and D1[1][4]=(4×β[4]+γ[4])ΔX=27ΔX is expressed. As described above, since α=1<β[ma] and 1≤γ[ma]≤M−1=3, in FIGS. 6 to 8, when ma=4, β[4]=6 and γ[4]=3. Since the nozzle N1[4]{j} is provided at a position moved by AX=+27 from the nozzle N1[1]{j}, the dot Dt can be formed for AX=4k+23 at time T=Tc+kt. In other words, the nozzle N1[4]{j} can form the dot Dt for AX=4×k4+3. Here, the variable k4 is an integer satisfying k4=k+5. In other words, the variable k4 is expressed as k4=k+β[4]−1. In addition, by the γ[4]=3, the nozzle N1[4]{j} can form the dot Dt for AX=4×k4+γ[4].

In addition, in FIGS. 6 to 8, since the nozzle N2[4]{j} is provided at a position moved by 4ΔX, that is, by the distance equal to the nozzle row distance DL in the +X direction from the nozzle N1[4]{j}, the dot Dt can be formed for AX=4k+27 at the time T=Tc+kt. In other words, the nozzle N2[4]{j} can form the dot Dt for AX=4×(k4+1)+3.

As described above, the nozzle N1[1]{j} can form the dot Dt for AX=M×k1. Further, the nozzle N1[ma]{j} can form the dot Dt for AX=M×ka+γ[ma]. Here, the variable ka is an integer satisfying ka=k+β[ma]−1. Then, as described above, the value γ[ma] is a natural number satisfying 1≤γ[ma]≤K M−1, and when satisfying M≥3, γ[ma1]≠γ[ma2] is satisfied. Therefore, a set of M−1 values {γ[2], γ[3], . . . , γ[M]} is the same as a set of M−1 values {1, 2, . . . , M−1}, or the order of the set of M−1 values {1, 2, . . . , M−1} is changed. In addition, when satisfying M=2, γ[ma]=γ[2] is 1.

Therefore, according to the present embodiment, a plurality of dots Dt can be formed with the distances R in the X-axis direction by the M nozzles N1[1]{j} to N1[M]{j} without overlapping. In other words, according to the present embodiment, a plurality of dots Dt can be formed with the distances of the basic resolution unit ΔX in the X-axis direction by the M nozzles N1[1]{j} to N1[M]{j} without overlapping.

Specifically, in FIGS. 6 to 8, the nozzle N1[1]{j} can form the dot Dt for AX=4×k1. Further, in FIGS. 6 to 8, the nozzle N1[ma]{j} can form the dot Dt for AX=4×ka+γ[ma]. Then, in FIGS. 6 to 8, a set of three values {γ[2], γ[3], γ[4]} is the same as a set of three values {1, 2, 3}, or the order of the set of three values {1, 2, 3} is changed.

Therefore, in FIGS. 6 to 8, a plurality of dots Dt can be formed with the distances R in the X-axis direction by the four nozzles N1[1]{j} to N1[4]{j} without overlapping. In other words, in FIGS. 6 to 8, the plurality of dots Dt can be formed with the distances of the basic resolution unit ΔX in the X-axis direction by the four nozzles N1[1]{j} to N1[4] {j} without overlapping.

As described above, by performing the printing operation using the head module 2 in the first embodiment, printing can be performed in the X-axis direction without overlapping dots Dt or generating gaps. Specifically, in FIG. 8, it is possible to confirm that the dots Dt are formed without a break in the +X direction from 28 of the X-axis coordinate AX.

In other words, since there is a break in the −X direction from 28 of the X-axis coordinate AX, for example, the image formed by solid printing includes a part where the dots Dt are not formed. Therefore, in the actual printing operation, the dots Dt may be formed from the region after 28 of the X-axis coordinate AX.

As described above, according to the present embodiment, the head module 2 can form the dots Dt with distances of the basic resolution unit ΔX in the X-axis direction. In the present embodiment, the basic resolution unit ΔX and the basic resolution unit ΔY are equal to the distance R. In other words, according to the present embodiment, the head module 2 can form a plurality of dots Dt on the recording paper sheet PE such that both the distance between the dots Dt in the X-axis direction and the distance between the dots Dt in the Y-axis direction are equal to the basic resolution unit.

Further, in the present embodiment, as described above, the relationship in which the nozzle row distance DL is a times the distance G is satisfied. Therefore, according to the present embodiment, the nozzle N1[m]{j} provided in the nozzle row L1[m] and the nozzle N2[m]{j} provided in the nozzle row L2[m] can form the dots Dt at the same position in the X-axis direction and at different positions in the Y-axis direction. In other words, in the present embodiment, the nozzle N1[m]{j} and the nozzle N2[m]{j} provided at a position different from that of the nozzle N1[m]{j} in the Y-axis direction contribute to the improvement of resolution in the Y-axis direction.

Further, in the present embodiment, as described above, the relationship in which the nozzle row distance D1[1][ma] is a distance different from the natural number multiple of the distance G is satisfied. Therefore, according to the present embodiment, the nozzles N1[ma]{j} provided in the nozzle row L1[ma] can form the dots Dt at positions different from those of the dots Dt formed by the nozzles N1[1]{j}, which are provided in the nozzle rows L1[1] arranged with the nozzle row distance D1[1][ma] with respect to the nozzle row L1[ma], in the X-axis direction. In other words, in the present embodiment, the ink jet printer 1 can perform printing satisfying the desired basic resolution unit ΔX after setting the scanning speed of the head module 2 in the X-axis direction to a scanning speed that moves by M times the basic resolution unit ΔX per time t.

Further, in the present embodiment, the distance between the nozzle rows L1[1] and L2[1] and the nozzle row L1[ma] is set according to the assumed scanning speed. In other words, the distance between the head chip 3[1] having the nozzle row L1[1] and the nozzle row L2[1] and the head chip 3[ma] having the nozzle row L1[ma] is set according to the assumed scanning speed, specifically, the value M. In other words, by increasing the scanning speed of the head module 2, even when the minimum distance between the dots Dt formed by the nozzle row L1[1] and the nozzle row L2[1] in the X-axis direction is increased, it is possible to set the positions of (M−1) nozzle rows L1[2] to L1[M] corresponding to the nozzle rows L1[2] to L1[M] without changing the structure of the head chip 3, and it is possible to perform printing without reducing the resolution by forming the dots Dt by the nozzle rows L1[2] to L1[M] at positions different from those of the dots Dt formed by the nozzle row L1[1] and the nozzle row L2[1].

In the above, the value M is treated as the number of nozzle plates C having a common structure, fixed at the same position in the Y-axis direction, and arranged with predetermined distances in the X-axis direction, but the present disclosure is not limited thereto. The value M may be treated as the number of nozzle rows capable of discharging the same type of ink to different raster columns and the same raster rows. Specifically, in a head module 2QS according to the second embodiment and a head module 2B according to the fourth embodiment, which will be described later, the nozzle plate C having a common structure may be used when discharging different types of ink, and when fixed at different positions in the Y-axis direction, the value M is different from the number of nozzle plates C having a common structure.

In the above, the nozzle row L1[ma] is treated as the nozzle row L1 provided in the nozzle plate [ma] different from the nozzle plate [1], but the present disclosure is not limited thereto. The nozzle row L1[ma] may be a nozzle row capable of discharging the same type of ink to different raster columns and the same raster row with respect to the nozzle row L1[1]. The same applies to the nozzle row L2[ma].

Hereinafter, in order to clarify the effect of the present embodiment, a head module 2V according to the reference example will be described with reference to FIG. 22. The head module 2V is a head module mounted on an ink jet printer different from the ink jet printer 1 according to the first embodiment.

Figure 22:
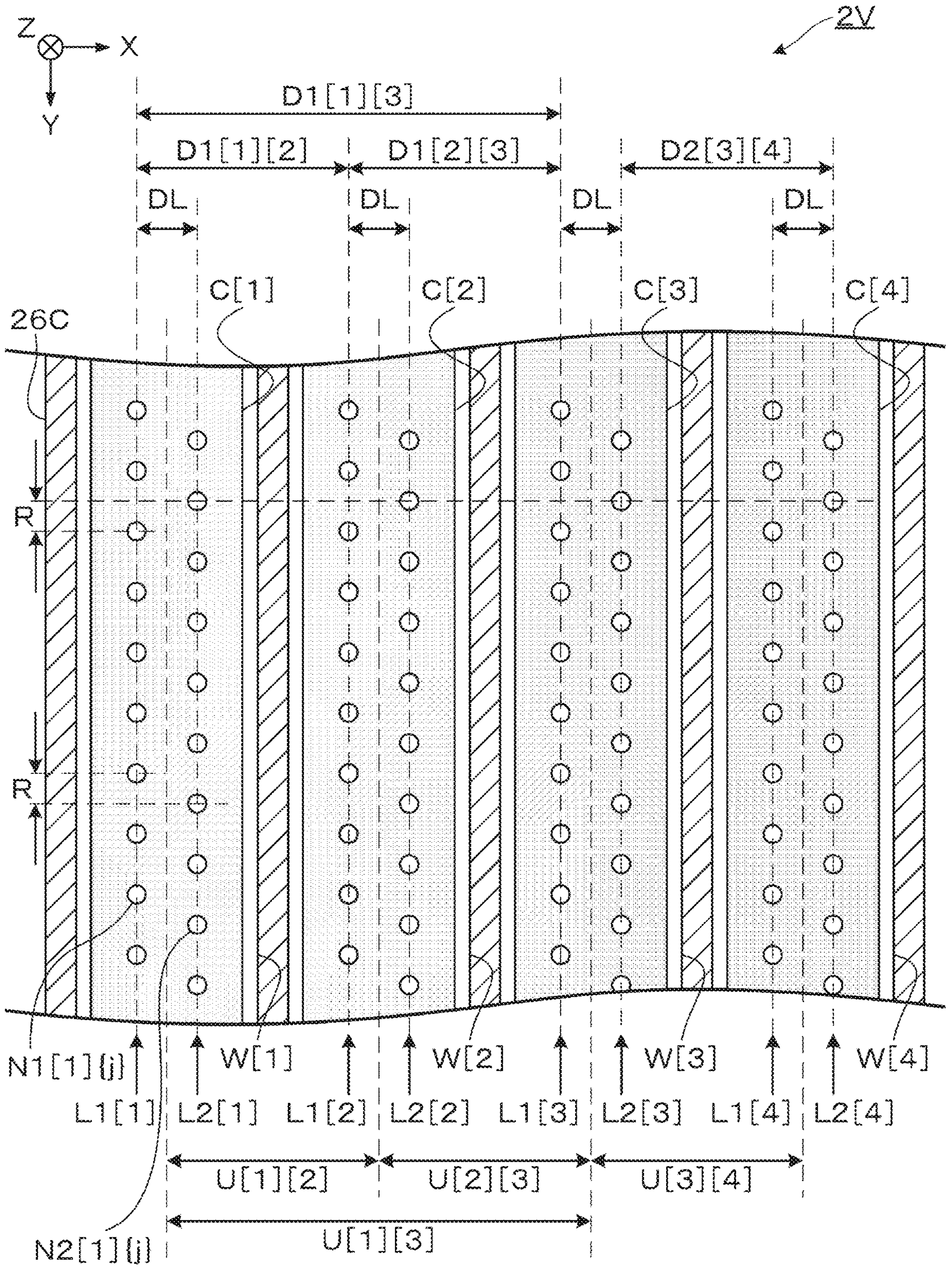
FIG. 22 is an explanatory view illustrating a positional relationship between a nozzle plate according to a reference example and a fixing plate.

FIG. 22 is an explanatory view illustrating a positional relationship between M nozzle plate C included in the head module 2V according to the reference example, and a fixing plate 26C. In addition, FIG. 22 illustrates various positional relationships when the head module 2V is viewed through from the −Z direction to the +Z direction. Further, in FIG. 22, a case where M=4 will be illustrated and described.

The head module 2V is configured in the same manner as the head module 2 according to the first embodiment except that the fixing plate 26C having the plate openings W[1] to W[M] from which each of the nozzle plates C[1] to C[M] is exposed, and that the values of the nozzle row distances D1[m1][m2] and D2[m1][m2] and the plate opening distance U[m1][m2] are different from the values in the head module 2 according to the first embodiment. In other words, the head chip 3 that forms the head module 2 of the first embodiment and the head chip 3 that forms the head module 2V of the reference example are the same. Further, the nozzle row distance DL in the first embodiment and the nozzle row distance DL in the reference example are the same.

In the reference example, as in the first embodiment, it is assumed that the nozzle plates C[1] to C[M] included in each of the M head chips 3 are all fixed at the same position in the Y-axis direction. In addition, it is assumed that the center of the head chip 3 coincides with the center of the nozzle plate C[m] included in each of the head chips 3 in the X-axis direction. In addition, M head chips 3, the nozzle row L1[m] and the nozzle row L2[m] provided in the nozzle plate C[m] included in the head chip 3 are fixed to the fixing plate 26C so as to be exposed from the plate opening W[m] provided in the fixing plate 26. As in the first embodiment, the plate opening W[m2] is provided in the +X direction of the plate opening W[m1]. Further, the nozzle plate C[m2] is provided in the +X direction of the nozzle plate C[m1].

In the reference example, as in the first embodiment, when the value m1 and the value m2 satisfy "m2=1+m1", it is assumed that the plate opening distance U[m1][m2] is a constant distance. In other words, in the reference example, it is assumed that the plate opening distances U[1][2] to U[M−1][M] are all equal. Further, in the reference example, it is assumed that the nozzle plate C[m] is fixed such that the relative positional relationship between the nozzle plate C[m] and the plate opening W[m] in the X-axis direction is constant. Specifically, it is assumed that the distance between the center of the nozzle plate C[m] and the center of the plate opening W[m] in the X-axis direction is constant. In this case, the nozzle row distance D1[1][2] to D1[M−1][M] and the nozzle row distance D2[1][2] to D2[M−1][M] are all equal.

In the reference example, the nozzle row distances D1[1][ma] and D2[1][ma] and the plate opening distance U[1][ma] are all equal and set to a natural number multiple of the distance G. Specifically, the nozzle row distances D1[1][ma] and D2[1][ma] and the plate opening distance U[1][ma] are set to Y[ma] times the distance G. Here, the value γ[ma] is a natural number larger than the value α. Further, in the reference example, as in the first embodiment, the distance G is set to M times the basic resolution unit ΔX, that is, M times the distance R. In other words, the nozzle row distance D1[1][ma] is set to (M×γ[ma]) times the basic resolution unit ΔX, that is, (M×γ[ma]) times the distance R. Further, the nozzle row distance DL is set to a natural number multiple of the distance G. Specifically, the nozzle row distance DL is set to α times the distance G. In other words, the nozzle row distance DL is set to (M×α) times the basic resolution unit ΔX, that is, (M×α) times the distance R.

As described above, in the reference example, in the X-axis direction, the distance G, the nozzle row distance DL, and the nozzle row distance D1[1][ma] are set to satisfy G:DL:D1[1][ma]=M:M×α:M×γ[ma]. In other words, the nozzle row distance DL and the nozzle row distance D1[1][ma] are set to a natural number multiple of the distance G. Therefore, the ink discharged from the nozzles N provided in the nozzle row L1[1], the nozzle row L2[1], and the nozzle row L1[ma] at the same timing every time t elapses forms the dots Dt in a plurality of rows separated from each other by the distance G in the X-axis direction on the recording paper sheet PE. In other words, in the reference example, the positions of the dots Dt formed by the ink discharged from the nozzles N belonging to the nozzle row L1[1], the dots Dt formed by the ink discharged from the nozzles N belonging to the nozzle row L2[1], and the dots Dt formed by the ink discharged from the nozzles N belonging to the nozzle row L1[ma] in the X-axis direction are the same positions in the X-axis direction. Therefore, when the scanning speed of the head module 2V is increased, that is, when the distance G is increased, more specifically, when the value M is increased, the distance between the dots Dt formed by the nozzle row L1[1], the nozzle row L2[1], and the nozzle row L1[ma] increases in proportion to the value M, and the resolution in the X-axis direction decreases.

Specifically, when M=4, when the head module 2V according to the reference example formed the dots Dt every time t while performing scanning at a speed of moving by the distance G every time t, the minimum distance between the dots Dt formed by the head module 2V is equal to the distance G corresponding to the scanning speed, that is, four times the basic resolution unit ΔX, that is, four times the distance R, in the X-axis direction. In other words, the head module 2V forms the dots Dt with distances, which is four times the distance between the dots Dt formed by head module 2 according to the first embodiment that can form the dots Dt with the basic resolution unit ΔX in the X-axis direction. In other words, while the minimum distance between the dots Dt formed by the head module 2 according to the first embodiment is the basic resolution unit ΔX in the X-axis direction, the minimum distance between the dots Dt formed by the head module 2V according to the reference example is four times the basic resolution unit ΔX, and the resolution decreases. Further, when the distance between the dots Dt formed by using the head module 2V according to the reference example is set to a value equal to the basic resolution unit ΔX in the X-axis direction, the speed at which the head module 2V is scanned is the speed of moving by the basic resolution unit ΔX (distance R) every time t, that is, the speed that needs to set the interval G to ¼, which is slower than the scanning speed of the head module 2 according to the first embodiment.

On the other hand, in the head module 2 according to the first embodiment, the distance G, the nozzle row distance DL, and the nozzle row distance D1[1][ma] are set to satisfy G:DL:D1[1][ma]=M:M×α:M×β[ma]+γ[ma]. In other words, the nozzle row distance DL is set to a natural number multiple of the distance G. On the other hand, the nozzle row distance D1[1][ma] is set to a distance different from the natural number multiple of the distance G. Therefore, the ink discharged from the nozzles N provided in the nozzle row L1[1] and the nozzle row L2[1] at the same timing every time t elapses forms the dots Dt in a plurality of raster columns separated from each other by the distance G in the X-axis direction on the recording paper sheet PE. On the other hand, the ink discharged from the nozzles N provided in the (M−1) nozzle rows L1[2] to L1[M] provided in the (M−1) head chips 3[2] to 3[M] at the same timing every time time t elapses, forms the dots Dt on the raster columns positioned between a plurality of raster columns formed by the ink discharged from the nozzles N provided in the nozzle row L1[1] and the nozzle row L2[1]. In addition, when the value ma1 and the value ma2 satisfy ma1≠ma2, the value γ[ma1] and the value γ[ma2] satisfy 0<γ[ma1]≠γ[ma2]<M−1. Therefore, the ink discharged from the nozzles N provided in the nozzle row L1[ma1] provided at a position separated from the nozzle row L1[1] by (M×β[ma1]+γ[ma1])R in the X-axis direction, and the ink discharged from the nozzles N provided in the nozzle row L1[ma2] provided at a position separated by (M×β[ma2]+γ[ma2])R from the nozzle row L1[1], form the dots Dt on the raster column at different positions in the X-axis direction. Therefore, even when the scanning speed of the head module 2 is set to be faster than the predetermined reference speed, the value M is increased according to the improvement of the scanning speed of the head module 2. Accordingly, the dots Dt can be formed on the recording paper sheet PE without widening the distance between the dots Dt formed by the nozzle row L1[1], the nozzle row L2[1], and the nozzle row L1[ma] in the X-axis direction as compared with the distance between the dots Dt formed when the scanning speed of the head module 2 is the predetermined reference speed. In other words, the ink jet printer 1 according to the first embodiment can increase the scanning speed of the head module 2 as the value M increases while maintaining the resolution in the X-axis direction. Specifically, when M=4, the moving speed of the head module 2 according to the first embodiment in which the dots Dt are formed with distances equal to the basic resolution unit ΔX while being scanned at a speed of moving by the distance G every time t in the X-axis direction, is four times faster than the scanning speed of the head module 2V when the distance between the dots Dt formed by using the head module 2V according to the reference example is a value equal to the basic resolution unit ΔX, based on the above-described correspondence. In other words, the ink jet printer 1 according to the first embodiment can shorten the printing time while maintaining the resolution in the X-axis direction compared to the head module 2V according to the reference example. In other words, the minimum distance between the dots Dt formed by the head module 2 according to the first embodiment in which the dots Dt are formed every time t while being scanned at a speed of moving by the distance G every time t in the X-axis direction, is ¼ as compared with the minimum distance between the dots Dt formed by the head module 2V according to the reference example, based on the above-described correspondence. In other words, the ink jet printer 1 according to the first embodiment can improve the resolution while maintaining the printing time while maintaining the scanning speed in the X-axis direction compared to the head module 2V according to the reference example.

As described above, the head module 2 according to the first embodiment in which the X-axis direction is the main scanning direction, includes: the nozzle row L1[1] including the nozzles N for discharging ink; the nozzle row L2[1] including the nozzles N for discharging ink; and the (M−1) specific nozzle rows including the nozzles N for discharging ink, and, when the value m is a natural number satisfying 2≤ma≤M, the nozzle row distance DL between the nozzle row L1[1] and the nozzle row L2[1] in the X-axis direction, and the nozzle row distance D1[1][ma] between the nozzle row L1[1] and the nozzle row L1[ma] among the (M−1) specific nozzle rows in the X-axis direction are expressed as DL:D1[1][ma]=M×α:M×β[ma]+γ[ma] where the value M is a natural number of 3 or more, the value α is a natural number of 1 or more, a value β[ma] is a natural number satisfying β[ma]>α, and a value γ[ma] is a natural number satisfying 0<γ[ma]≤M−1 and satisfying γ[ma1]≠γ[ma2] when a value ma1 is a natural number satisfying 2≤ma1≤M and a value ma2 is a natural number satisfying 2≤ma2≤M and satisfying ma1≠ma2.

Therefore, in the first embodiment, for example, even when the nozzle row distance DL between the nozzle row L1[1] and the nozzle row L2[1] is determined as a distance that makes it possible for the nozzle row L2[1] to form the dots Dt at the same position as that of the dots Dt formed by the nozzle row L1[1] in the X-axis direction, the nozzle row distance D1[1][ma] between the nozzle row L1[1] and the nozzle row L1[ma] can be determined as a distance that makes it possible for the nozzle row L1[ma] to form the dots Dt at positions different from those of the dots Dt formed by the nozzle row L1[1] in the X-axis direction. Therefore, in the first embodiment, when ink is discharged from each nozzle N every predetermined time t and the nozzle row L1[1] forms a plurality of dots Dt with the distance G in the X-axis direction, the dots Dt can be formed by the nozzle row L1[ma] so as to complement the plurality of dots Dt in the X-axis direction between the plurality of dots Dt formed with the distance G by the nozzle row L1[1]. In other words, according to the first embodiment, it is possible to suppress the overlapping of dots Dt and generation of gaps in the X-axis direction, which is the main scanning direction, and perform high-speed and high-resolution printing.

Further, in the first embodiment, for example, even when the nozzle row distance D1[1][ma] between the nozzle row L1[1] and the nozzle row L1[ma] is determined as a distance that makes it possible for the nozzle row L1[ma] to form the dots Dt at positions different from those of the dots Dt formed by the nozzle row L1[1] in the X-axis direction, the nozzle row distance DL between the nozzle row L1[1] and the nozzle row L2[1] can be determined as a distance that makes it possible for the nozzle row L2[1] to form the dots Dt at the same position as that of the dots Dt formed by the nozzle row L1[1] in the X-axis direction. Therefore, in the first embodiment, when ink is discharged from each nozzle N every predetermined time t and the nozzle row L1[1] forms the plurality of dots Dt with the distance G in the X-axis direction, the nozzle row L2[1] can form the dots Dt at the same position as that of the plurality of dots Dt formed by the nozzle row L1[1] in the X-axis direction. In other words, according to the first embodiment, high-speed and high-resolution printing is realized in the X-axis direction, which is the main scanning direction, and at the same time, high-resolution printing can be realized in the Y-axis direction, which is the sub-scanning direction intersecting the main scanning direction.

In the first embodiment, the X-axis direction is an example of the "first direction", the head module 2 is an example of the "head module", the ink is an example of the "liquid", the nozzle N is an example of the "nozzle", the nozzle row L1[1] is an example of the "first nozzle row", the nozzle row L2[1] is an example of the "second nozzle row", the nozzle row distance DL is an example of the "distance P1", the nozzle row L1[ma] is an example of then "m-th specific nozzle row", the nozzle row distance D1[1][ma] is an example of the "distance PT[m]", P[Ma] is an example of "PT[m]", and γ[ma] is an example of "γT[m]". Further, ma has a value equal to m+1, ma1 has a value equal to m1+1, and ma2 has a value equal to m2+1.

Regarding the nozzle row distance DL and the nozzle row distance D1[1][ma], there may be a value other than 1 which is a common divisor between the nozzle row distance DL and the nozzle row distance D1[1][ma] similar to the distance R in the first embodiment. When the value which is the greatest common divisor of the nozzle row distance DL and the nozzle row distance D1[1][ma] is referred to as a value F1, the value obtained by dividing the nozzle row distance DL by the value F1 is referred to as a value DLF1, and the value obtained by dividing the nozzle row distance D1[1][ma] by the value F1 is referred to as a value DIF1, it is considered that the nozzle row distance DL and the nozzle row distance D1[I][ma] can be expressed as DL:D1[I][ma]=M×α:M×β[ma]+γ[ma] when the value DLF1 and the value D1F1 satisfy DLF1:DLF1=M×α:M×β[ma]+γ[ma]. The value DLF1 and the value D1F1 are relatively prime. Further, the nozzle row distance DL and the nozzle row distance D1[1][ma] may be relatively prime. In other words, the value obtained by multiplying the value M and the value α and the value obtained by adding γ[ma] to the value obtained by multiplying the value M and the value β[ma] may be relatively prime.

Further, in the head module 2 according to the first embodiment, the nozzle row L1[1] has the nozzle N1[1]{j} for discharging ink, the nozzle row L1[ma] has the nozzle N1[ma]{j} for discharging ink, the nozzle N1[1]{j} and the nozzle N1[ma]{j} are arranged at the same position in the Y-axis direction orthogonal to the X-axis direction. In other words, the ink discharged from the nozzle N1[1]{j} and the nozzle N1[ma]{j} can form the dots Dt at the same position in the Y-axis direction. Accordingly, the head module 2 can improve the resolution in the X-axis direction.

In the first embodiment, the nozzle N1[1]{j} is an example of the "first nozzle", the nozzle N1[ma]{j} is an example of the "specific nozzle", and the Y-axis direction is an example of the "second direction".

Further, in the head module 2 according to the first embodiment, the nozzle row L1[1] includes a plurality of nozzles N for discharging ink, the nozzle row L2[1] includes a plurality of nozzles N for discharging ink, and in the Y-axis direction, one of the plurality of nozzles N included in the nozzle row L2[1] is provided between the two nozzles N adjacent to each other among the plurality of nozzles N included in the nozzle row L1[1]. In other words, in the Y-axis direction, the dots Dt formed by the nozzle N2[1]{j} are positioned between the dots Dt formed by the nozzle N1[1]{j} and the nozzle N1[1]{j+1}. Accordingly, the head module 2 can improve the resolution in the Y-axis direction.

Further, the head module 2 according to the first embodiment includes the head chip 3[1] having the nozzle row L1[1] and the nozzle row L2[1], and the (M−1) specific head chips, and the head chip 3[ma] including the nozzle plate C[ma] among the (M−1) specific head chips has the nozzle row L1[ma].

As described above, in the present embodiment, by setting the nozzle row distance DL between the nozzle row L1[1] and the nozzle row L2[1] and the nozzle row distance D1[1][ma] between the nozzle row L1[1] and the nozzle row L1[ma] to be expressed as DL:D1[1][ma]=M×α:M×β[ma]+γ[ma], it is possible to realize high-speed and high-resolution printing in the X-axis direction, which is the main scanning direction, and at the same time, to realize high-resolution printing in the Y-axis direction, which is the sub-scanning direction intersecting the main scanning direction.

However, when the value of M changes, the actual dimensions of the nozzle row distance DL and the nozzle row distance D1[1][ma] that satisfy this proportional expression will change. In other words, there is a possibility that the nozzle row distance DL and the nozzle row distance D1[1][ma] need to be appropriately changed according to M. There is also a need for a head module such that the nozzle row distance DL and all nozzle row distances D1[1][ma] are divisible by M, as illustrated in the reference example. Therefore, not a structure in which all the nozzle rows are formed in one nozzle plate, but a configuration in which a plurality of head chips each having one nozzle row are arranged on the fixing plate or the holder, is desirable. Specifically, not a configuration in which the nozzle row L1[1], the nozzle row L2[1], and the nozzle row L1[ma] are formed in one head chip, but a configuration in which the nozzle row distance DL and the nozzle row distance D1[1][ma] can be freely changed by arranging the head chip having the nozzle row L1[1], the head chip having the nozzle row L2[1], and the head chip having the nozzle row L1[ma], is desirable. In this manner, various head modules can be realized simply by changing the conditions of the process of arranging the plurality of head chips, the plurality of head chips can be made into a common platform, and thus the manufacturing cost can be reduced. However, in the configuration in which the head module is composed of the plurality of head chips provided for each nozzle row, there is a problem that the number of the processes of arranging the plurality of head chips increases and the influence of the deviation of the landing accuracy becomes large. Accordingly, it is desirable to provide a plurality of nozzle rows for each platformized head chip.

Again, in order to achieve the above-described effect of the present embodiment, the nozzle row distance DL between the nozzle row L1[1] and the nozzle row L2[1], and the nozzle row distance D1[1][ma] between the nozzle row L1[1] and the nozzle row L1[ma] may be expressed by the proportional expression of DL:D1[1][ma]=M×α:M×β[ma]+γ[ma]. Therefore, it is not always necessary to provide all of the nozzle row L1[1], the nozzle row L2[1], and the nozzle row L1[ma] on the same head chip, and it is not necessary to provide the nozzle row L1[1] and the nozzle row L1[2] on the same head chip 3, either, unlike in the present embodiment. In other words, when either one of the nozzle row L2[2] or the nozzle row L1[ma] is provided in the same head chip as the nozzle row L1[1] and the other is provided in another head chip, and when the plurality of head chips are arranged to satisfy the above-described proportional expression, the plurality of nozzle rows are provided in the platformized head chip, and thus, it is possible to achieve the above-described effect. Here, the nozzle row L1[1] and the nozzle row L2[1] are nozzle rows that form the dots in the same raster column in order to achieve high resolution in the Y-axis direction, or, in order to replace the dots that are scheduled to be discharged by the nozzle N1[1]{j} with the dots discharged from the nozzles N2[1]{j} when a discharge abnormality occurs in the nozzle N1[1]{j} and dot missing occurs, which will be described in detail in the third embodiment below. Therefore, a case where the nozzle row L1[1] and the nozzle row L2[1] that form the dots in the same raster column are provided in the same head chip 3 is more preferable since distortion of the landing position of the dot Dt in the X-axis direction is unlikely to occur, and printing accuracy can be improved, as compared with a case where the nozzle row L1[1] and the nozzle row L2[1] are provided in different head chips 3. Further, when the value of M is changed within the range where the nozzle row distance DL satisfies the above-described proportional expression, the values of the nozzle row distance D1[1][ma] may be changed so as to satisfy the above-described proportional expression. In other words, when the nozzle rows L1[1] and L2[1] that form the same raster column are provided in the same head chip 3, it is possible to change the nozzle row distance D1[1][ma] to satisfy the above-described proportional expression by adjusting the distance between the head chips 3 in the main scanning direction, it is not necessary to change the internal structure of the head chip 3, and the manufacturing cost can be reduced.

In the first embodiment, the head chip 3[1] is an example of the "first head chip", and the head chip 3[ma] is an example of the "m-th specific head chip".

Further, in the head module 2 according to the first embodiment, the head chip 3[1] and the head chip 3[ma] have a common structure. Accordingly, the manufacturing cost of the head chip can be reduced.

Further, in the head module 2 according to the first embodiment, the head chip 3[1] includes the nozzle plate C[1] having the nozzle row L1[1] and the nozzle row L2[1], and the head chip 3[ma] includes the nozzle plate C[ma] having the nozzle row L1[ma] among the (M−1) specific nozzle plates corresponding to the (M−1) specific head chips. Accordingly, it is possible to improve the alignment accuracy of two nozzle rows capable of forming the dots Dt at the same position in the X-axis direction.

In the first embodiment, the nozzle plate C[1] is an example of the "first nozzle plate", and the nozzle plate C[ma] is an example of the "m-th specific nozzle plate".

Further, in the head module 2 according to the first embodiment, the fixing plate 26 to which the head chip 3[1] and the head chip 3[ma] are fixed, and which has the plate opening W for exposing at least the nozzle row L1[1] and the nozzle row L2[1] in the nozzle plate C[1] and at least the nozzle row L1[ma] in the nozzle plate C[ma], is further provided, and the head chip 3[1] and the head chip 3[ma] are fixed to the fixing plate 26 such that the distance between the center of the head chip 3[1] and the center of the head chip 3[ma] in the X-axis direction is the nozzle row distance D1[1][ma] when the fixing plate 26 is viewed in plan view. In the X-axis direction, the center of the head chip 3[m] coincides with the center of the nozzle plates C[m] included in the head chip 3[m]. Further, in the X-axis direction, the distance between the center of the nozzle plate C[m] and the center of the plate opening W[m] is constant. In other words, the head chip 3[1] and the head chip 3[ma] are fixed to the fixing plate 26 such that the distance between the centers thereof coincides with the plate opening distance U[1][ma] in the X-axis direction, and coincides with the nozzle row distance D1[1][ma]. Further, the head module 2 is provided with the plurality of head chips 3. Accordingly, when printing is performed using the head module 2 according to the first embodiment, distortion of the landing position of the dot Dt is unlikely to occur, and printing accuracy is improved, as compared with a case where the plurality of head modules are used to perform similar printing such that the total number of nozzles N of the head module 2 and the total number of nozzles are equal in the X-axis direction.

In the first embodiment, the plate opening W and the plate opening W[m] are examples of the "opening portion", and the fixing plate 26 is an example of the "fixing plate".

Further, the head module 2 according to the first embodiment further includes the holder 25 that has the supply flow path 251 for supplying ink to the head chip 3[1] and the (M−1) specific head chips, and holds the head chip 3[1] and the (M−1) specific head chip such that the distance between the center of the head chip 3[1] and the center of the head chip 3[ma] in the X-axis direction is the nozzle row distance D1[1][ma]. Accordingly, ink can be supplied to each head chip.

In the first embodiment, the supply flow path 251 is an example of the "supply flow path", and the holder 25 is an example of the "holder". Further, in the first embodiment, an aspect in which ink is supplied to each head chip from different supply flow paths 251 is illustrated, but the present disclosure is not limited to such an aspect. The supply flow path for supplying ink to each head chip may be a common flow path having a branch.

Further, the head module 2 according to the first embodiment further includes: the inlet 220 for introducing ink; and the distribution flow path 221 that communicates with the nozzle N1[1]{j} and at least one specific nozzle among the (M−1) specific nozzles corresponding to the (M−1) specific nozzle rows and distributes the ink introduced from the inlet 220 to the nozzle N1[1]{j} and at least one specific nozzle. Accordingly, the same ink can be supplied to the plurality of nozzles N.

In the first embodiment, the inlet 220 is an example of the "inlet", and the distribution flow path 221 is an example of the "distribution flow path".

Further, the ink jet printer 1 according to the first embodiment includes: the head module 2 according to the first embodiment; and the carriage 761 for reciprocating the head module 2 in the X-axis direction and in the direction opposite to the X-axis direction. Accordingly, by performing the printing operation using the ink jet printer 1 including the head module 2 according to the first embodiment, it is possible to suppress the overlapping of dots Dt and generation of gaps and perform high-speed and high-resolution printing.

In the first embodiment, the ink jet printer 1 is an example of the "liquid discharge apparatus", and the carriage 761 is an example of the "carriage".

Further, in the ink jet printer 1 according to the first embodiment, the nozzle row L1[1] includes the nozzles N1[1]{j} for discharging ink, and the minimum distance between the two dots Dt formed by the nozzle N1[1]{j} in the X-axis direction is M times the basic resolution unit ΔX, which is a distance obtained by dividing the nozzle row distance DL by the value obtained by multiplying the value M and the value α and is a distance obtained by dividing the nozzle row distance D1[1][ma] by the value obtained by adding the value γ[ma] to the value obtained by multiplying the value M and the value β[ma]. In other words, the head module 2 mounted on the ink jet printer 1 according to the first embodiment is scanned at a speed for advancing by the distance G, that is, M times the basic resolution unit ΔX, while forming two dots Dt from the specific nozzle N in the X-axis direction. Further, in the X-axis direction, the nozzle row distance DL is set to an integer multiple of the distance G with respect to the minimum distance G between the dots Dt formed by the specific nozzle N included in the head module 2. Accordingly, when forming the dots Dt by the nozzle N1[1]{j} included in the nozzle row L1[1] and the nozzle N2[1]{j} included in the nozzle row L2[1] while the head module 2 is scanned in the X-axis direction, it is possible to form the dot Dt formed by the nozzle N1[1]{j} and the dot Dt formed by the nozzle N2[1]{j} at the same position in the X-axis direction.

In the first embodiment, the dot Dt is an example of the "dot", and the basic resolution unit ΔX is an example of the "distance P0".

Further, in the ink jet printer 1 according to the first embodiment, the nozzle row L2[1] includes the nozzle N2[1]{j} for discharging ink, each of the (M−1) specific nozzle rows includes specific nozzles for discharging ink, and the nozzle N1[1]{j}, the nozzle N2[1]{j}, and the (M−1) specific nozzles corresponding to the (M−1) specific nozzle rows can discharge ink at the same timing. Accordingly, it is possible to form the dots Dt with predetermined distances.

In the first embodiment, the nozzle N2[1]{j} is an example of the "second nozzle".

Further, in the ink jet printer 1 according to the first embodiment, the nozzle row L1[1] includes the nozzle N1[1]{j} for discharging ink, the nozzle row L2[1] includes the nozzle N2[1]{j} for discharging ink, each of the (M−1) specific nozzle rows includes the specific nozzle for discharging ink, and the common driving signal Com is supplied to a first driving element provided for the nozzle N1[1]{j}, a second driving element provided for the nozzle N2[1]{j}, and the (M−1) specific driving elements provided for the (M−1) specific nozzles corresponding to the (M−1) specific nozzle rows. Accordingly, it is possible to achieve size reduction and cost reduction of the apparatus as compared with the configuration in which separate driving signals Com are supplied to the first driving element, the second driving element, and the (M−1) specific driving elements.

In the first embodiment, the piezoelectric element 331 corresponding to the nozzle N1[1]{j} provided in the nozzle plate C[1] is an example of the "first driving element", the piezoelectric element 332 corresponding to the nozzle N2[1]{j} provided in the nozzle plate C[1] is an example the "second driving element", and the piezoelectric element 331 corresponding to the nozzle N1[ma]{j} provided in the nozzle plate C[ma] is an example of the "specific driving element". Further, the driving signal Com is an example of the "driving signal".

Further, in the ink jet printer 1 according to the first embodiment, each of the plurality of nozzles N included in the nozzle row L1[1], each of the plurality of nozzles N included in the nozzle row L2[1], and each of the plurality of nozzles N included in the (M−1) specific nozzle rows discharge the same type of ink. In other words, the same type of ink is discharged from each of the plurality of nozzles N provided at different positions in the Y-axis direction. Accordingly, it is possible to achieve high resolution in the Y-axis direction.

Further, in the ink jet printer 1 according to the first embodiment, the nozzle row L1[1] includes the nozzles N1[1]{j} for discharging ink, the nozzle row L2[1] includes the nozzles N2[1]{j} for discharging ink, each of the (M−1) specific nozzle rows includes specific nozzles for discharging ink, the nozzle N1[1]{j}, the nozzle N2[1]{j}, and the (M−1) specific nozzles corresponding to the (M−1) specific nozzle rows discharge the same type of ink, the minimum distance between two dots Dt formed by the nozzle N1[1]{j} in the X-axis direction is M times the basic resolution unit ΔX, which is a distance obtained by dividing the nozzle row distance DL by a value obtained by multiplying the value M and the value α, and is a distance obtained by dividing the nozzle row distance D1[1][ma] by a value obtained by adding the value γ[ma] to a value obtained by multiplying the value M and the value β[ma], in the Y-axis direction orthogonal to the X-axis direction, a distance between two nozzles N adjacent to each other among the plurality of nozzles N included in the nozzle row L1[1] is n times the basic resolution unit ΔX, in the Y-axis direction orthogonal to the X-axis direction, the distance between the nozzle N1[1]{j} and the nozzle N2[1]{j} is the basic resolution unit ΔX, and the value n is a natural number indicating the number of nozzle rows provided in the nozzle plate C[1] having the nozzle row L1[1] and the nozzle row L2[1]. Accordingly, it is possible to make the resolutions both in the main scanning direction and the sub-scanning direction uniform. The n nozzle rows are arranged so as to be displaced from each other in the Y-axis direction. In other words, the n nozzle rows do not include the nozzle rows arranged at the same position in the Y-axis direction. Further, each of the n nozzle rows has the same distance in the Y-axis direction of adjacent nozzles N among the plurality of nozzles N that form the nozzle row. Further, in the Y-axis direction, each of the nozzles N in one or more other nozzle rows different from any nozzle row among the n nozzle rows is positioned one by one between the adjacent nozzles N among the plurality of nozzles N that form any nozzle row of the n nozzle rows. The n nozzle rows are arranged such that the value obtained by dividing the distance between the adjacent nozzles N in the Y-axis direction among the plurality of nozzles N that form the nozzle row, by n, corresponds to the distance R.

Further, the head module 2 according to the first embodiment in which the X-axis direction is the main scanning direction, includes: the nozzle N1[1]{j} for discharging ink; the nozzle N2[1]{j} for discharging ink; and the nozzle N1[2]{j} for discharging ink, and when the distance between the first dot formed by the ink discharged by the nozzle N1[1]{j} at the first timing and the second dot formed by the ink discharged at the second timing at which the ink can be discharged first by the nozzle N1[1]{j} after the first timing in the X-axis direction is a first distance, the distance between the third dot formed by the ink discharged by the nozzle N2[1]{j} at the first timing and the first dot in the X-axis direction is a second distance, and the distance between the fourth dot formed by the ink discharged by the nozzle N1[2]{j} at the first timing and the first dot in the X-axis direction is a third distance, the nozzle N1[1]{j}, the nozzle N2[1]{j}, and the nozzle N1[2]{j} are provided such that the second distance is a distance which is an integer multiple of the first distance, and the third distance is a distance which is different from the integer multiple of the first distance. In other words, the nozzle N1[1]{j} and the nozzle N2[1]{j} are set in an arrangement capable of forming the dots Dt at the same position in the X-axis direction, and the nozzles N1[1]{j} and N2[1]{j} and the nozzle N1[2]{j} are set in an arrangement capable of forming the dots Dt at different positions in the X-axis direction. Accordingly, it is possible to form the dots Dt without making gaps in the X-axis direction, which is the main scanning direction, even when the printing speed is increased.

In the first embodiment, the nozzle N1[2]{j} is an example of the "third nozzle". Further, the value equal to the distance G is an example of the "first distance", the value equal to the nozzle row distance DL is an example of the "second distance", and the value equal to the nozzle row distance D1[1][2] is an example of the "third distance". Further, the "first timing" is any timing (for example, the timing at which the time T becomes Tc+1t) at which the nozzle N1[1]{j} discharges ink, and the "second timing" is a timing after the time t from the first timing (for example, the timing at which the time T becomes Tc+2t). Further, the "first dot" is the dot Dt formed by the ink discharged from the nozzle N1[1]{j} at the first timing, the "second dot" is the dot Dt formed by the ink discharged from the nozzle N1[1]{j} at the second timing, the "third dot" is the dot Dt formed by the ink discharged from the nozzle N2[1]{j} at the first timing, and the "fourth dot" is the dot Dt formed by the ink discharged from the nozzle N1[2]{j} at the first timing.

Further, the head module 2 according to the first embodiment in which the X-axis direction is the main scanning direction, includes: the nozzle row L1[1] including the nozzle N1[1]{j} for discharging ink; the nozzle row L2[1] including the nozzle N2[1]{j} for discharging ink; and the nozzle row L1[2] including the nozzle N1[2]{j} for discharging ink, and the nozzle row distance DL between the nozzle row L1[1] and the nozzle row L2[1] in the X-axis direction, and the nozzle row distance D1[1][2] between the nozzle row L1[1] and the nozzle row L1[2] in the X-axis direction can be expressed as DL:D1[1][2]=M×α:M×β[2]+1 where the value M is a natural number of 3 or more, the value α is a natural number of 1 or more, and the value β[2] is a natural number satisfying β[2]>α. In other words, when the head module 2 forms the dots Dt with predetermined distances while being scanned in the X-axis direction, the nozzle row distance D1[1][2] between the nozzle row L1[1] and the nozzle row L1[2] is set to have a predetermined ratio with respect to the nozzle row distance DL between the nozzle row L1[1] and the nozzle row L2[1]. Accordingly, by performing the printing operation using the head module 2 according to the first embodiment, it is possible to suppress the overlapping of dots Dt and generation of gaps in the X-axis direction and perform high-speed and high-resolution printing.

In the first embodiment, the nozzle row L1[2] is an example of the "third nozzle row", the nozzle row distance D1[1][2] is an example of the "distance P2", and β[2] is an example of "β".

Further, the nozzle row distance DL and the nozzle row distance D1[1][2] may be relatively prime. In other words, the value obtained by multiplying the value M and the value α and the value obtained by adding 1 to the value obtained by multiplying the value M and the value β[2] may be relatively prime.

Further, in the head module 2 according to the first embodiment, the nozzle N1[1]{j} and the nozzle N1[2]{j} are arranged at the same position in the Y-axis direction orthogonal to the X-axis direction. In other words, the ink discharged from the nozzle N1[1]{j} and the nozzle N1[2]{j} can form the dots Dt at the same position in the Y-axis direction. Accordingly, the head module 2 can improve the resolution in the X-axis direction.

Further, the head module 2 according to the first embodiment includes the head chip 3[1] including the nozzle row L1[1] and the nozzle row L2[1], and the head chip 3[2] including the nozzle row L1[2]. In other words, one head chip 3 is provided with two nozzle rows that form the dots Dt at the same position in the X-axis direction. Accordingly, distortion of the landing position of the dot Dt in the X-axis direction is unlikely to occur, and printing accuracy is improved.

Further, in the head module 2 according to the first embodiment, the head chip 3[1] including the nozzle row L1[1] and the nozzle row L2[1] and the head chip 3[2] including the nozzle row L1[2] have a common structure. Accordingly, the manufacturing cost of the head chip can be reduced.

Further, in the head module 2 according to the first embodiment, the head chip 3[1] having the nozzle row L1[1] and the nozzle row L2[1] includes the nozzle plate C[1] in which the nozzle row L1[1] and the nozzle row L2[1] are provided, and the head chip 3[2] having the nozzle row L1[2] includes the nozzle plate C[2] in which the nozzle row L1[2] is provided. Accordingly, it is possible to improve the alignment accuracy of two nozzle rows capable of forming the dots Dt at the same position in the X-axis direction.

In the first embodiment, the nozzle plate C[2] is an example of the "second nozzle plate".

Further, in the head module 2 according to the first embodiment, the fixing plate 26 to which the head chip 3[1] having the nozzle row L1[1] and the nozzle row L2[1] and the head chip 3[2] having the nozzle row L1[2] are fixed, and which has the plate opening W for exposing at least the nozzle row L1[1] and the nozzle row L2[1] in the nozzle plate C[1] and at least the nozzle row L1[2] in the nozzle plate C[2], is further provided, and the head chip 3[1] having the nozzle row L1[1] and the nozzle row L2[1] and the head chip 3[2] having the nozzle row L1[2] are fixed to the fixing plate 26 such that the distance between the center of the head chip 3[1] having the nozzle row L1[1] and the nozzle row L2[1] and the center of the head chip 3[2] having the nozzle row L1[2] in the X-axis direction is the nozzle row distance D1[1][2] when the fixing plate 26 is viewed in plan view. In the X-axis direction, the center of the head chip 3[m] coincides with the center of the nozzle plates C[m] included in the head chip 3[m]. Further, in the X-axis direction, the distance between the center of the nozzle plate C[m] and the center of the plate opening W[m] is constant. In other words, the head chip 3[1] having the nozzle row L1[1] and the nozzle row L2[1] and the head chip 3[2] having the nozzle row L1[2] are fixed to the fixing plate 26 such that the distance between the centers thereof in the X-axis direction coincides with the plate opening distance U[1][2] and coincides with the nozzle row distance D1[1][2]. Further, the plurality of head chips 3 are provided in the head module 2 with constant distances. Accordingly, when printing is performed using the head module 2 according to the first embodiment, distortion of the landing position of the dot Dt is unlikely to occur, and printing accuracy is improved, as compared with a case where the plurality of head modules are used to perform similar printing such that the total number of nozzles N of the head module 2 and the total number of nozzles are equal in the X-axis direction.

Further, the head module 2 according to the first embodiment further includes the holder 25 that has the supply flow path 251 for supplying ink to the head chip 3[1] having the nozzle row L1[1] and the nozzle row L2[1] and the head chip 3[2] having the nozzle row L1[2], and holds the head chip 3[1] having the nozzle row L1[1] and the nozzle row L2[1] and the head chip 3[2] having the nozzle row L1[2] such that the distance between the center of the head chip 3[1] having the nozzle row L1[1] and the nozzle row L2[1] and the center of the head chip 3[2] having the nozzle row L1[2] in the X-axis direction is the nozzle row distance D1[1][2]. Accordingly, ink can be supplied to each head chip.

Further, the head module 2 according to the first embodiment further includes: the inlet 220 for introducing ink; and the distribution flow path 221 that communicates with the nozzle N1[1]{j} and the nozzle N1[2]{j} and distributes the ink introduced from the inlet 220 to the nozzle N1[1]{j} and the nozzle N1[2]{j}. Accordingly, the same ink can be supplied to the plurality of nozzles N.

Further, in the ink jet printer 1 according to the first embodiment, the nozzle N1[1]{j}, the nozzle N2[1]{j}, and the nozzle N1[2]{j} can discharge ink at the same timing. Accordingly, it is possible to form the dots Dt with predetermined distances.

Further, in the ink jet printer 1 according to the first embodiment, the common driving signal Com is supplied to the first driving element corresponding to the nozzle N1[1]{j}, the second driving element corresponding to the nozzle N2[1]{j}, and the third driving element corresponding to the nozzle N1[2]{j}. Accordingly, it is possible to achieve size reduction and cost reduction of the apparatus.

In the first embodiment, the piezoelectric element 331 corresponding to the nozzle N1[2]{j} provided in the nozzle plate C[2] is an example of the "third driving element".

Further, in the ink jet printer 1 according to the first embodiment, the nozzle N1[1]{j}, the nozzle N2[1]{j}, and the nozzle N1[2]{j} discharge the same type of ink. In other words, the same type of ink is discharged from the nozzle N2[1]{j} and the nozzles N1[1]{j} and N1[2]{j} provided at positions different from that of the nozzle N2[1]{j} in the Y-axis direction. Accordingly, it is possible to achieve high resolution in the Y-axis direction.

Further, in the ink jet printer 1 according to the first embodiment, the nozzle N1[1]{j}, the nozzle N2[1]{j}, and the nozzle N1[2]{J} discharge the same type of ink, the distance between the two adjacent nozzles N among the plurality of nozzles N included in the nozzle row L1[1] in the Y-axis direction orthogonal to the X-axis direction is n times the basic resolution unit ΔX, the distance between the nozzle N1[1]{j} and the nozzle N2[1]{j} in the Y-axis direction orthogonal to the X-axis direction is the basic resolution unit ΔX, and the value n is a natural number indicating the number of nozzle rows provided in the nozzle plate C[1] including the nozzle row L1[1] and the nozzle row L2[1]. Accordingly, it is possible to make the resolutions both in the main scanning direction and the sub-scanning direction uniform.

The numerical values used in the above description according to the first embodiment are examples, and the numerical values described below may be applied including the unit.

Basic resolution unit ΔX=basic resolution unit ΔY=1/600 inches, nozzle row distance DL=24/600 inches, value α=6, nozzle row distance D1[1][2]=193/600 inches, value β[2]=48, value γ[2]=1, distance R=1/600 inches, distance G=4/600 inches, nozzle row distance D1[1][3]=386/600 inches, value β[3]=2β[2]=96, value γ[3]=2, nozzle row distance D1[1][4]=579/600 inches, value β[4]=3β[2]=144, and value γ[4]=3.

2. Second Embodiment

Hereinafter, the second embodiment of the present disclosure will be described. In addition, in each modification example illustrated below, elements having the same effects and functions as those of the first embodiment will be given the reference numerals used in the description of the first embodiment, and each of the detailed descriptions thereof will be appropriately omitted.

The ink jet printer according to the second embodiment is different from the ink jet printer 1 according to the first embodiment including one ink cartridge 4 and the head module 2 in that a plurality of ink cartridges 4 corresponding to inks of a plurality of colors are provided and a head module 2QS corresponding to inks of a plurality of colors is provided.

The head module 2QS includes a head chip group 300Q and a head chip group 300S. When the head chip group 300Q and the head chip group 300S are referred to as a head chip group 300 when the head chip groups are not distinguished from each other. In the present embodiment, each head chip group 300 includes M head chips 3 as in the first embodiment. Further, in the present embodiment, each head chip 3 includes the nozzle row L1 composed of J nozzles N1 and the nozzle row L2 composed of J nozzles N2, as in the first embodiment.

Specifically, in the second embodiment, as an example, it is assumed that two ink cartridges 4, that is, an ink cartridge 4Q (not illustrated) in which yellow ink is stored and an ink cartridge 4S (not illustrated) in which cyan ink is stored, are stored in the carriage 761. Further, the ink jet printer according to the second embodiment includes two head chip groups 300, that is, the head chip group 300Q provided corresponding to the ink cartridge 4Q and the head chip group 300Q provided corresponding to the ink cartridge 4S.

Of these, the head chip group 300Q includes M head chips 3Q (not illustrated). The head chip 3Q includes 2J nozzles NQ for discharging yellow ink. Specifically, the head chip 3Q includes a nozzle plate CQ in which a nozzle row LQ1 composed of J nozzles NQ1 and a nozzle row LQ2 composed of J nozzles NQ2 are formed.

In addition, the head chip group 300S includes M head chips 3S (not illustrated). The head chip 3S includes 2J nozzles NS for discharging cyan ink. Specifically, the head chip 3S includes a nozzle plate CS in which a nozzle row LS1 composed of J nozzles NS1 and a nozzle row LS2 composed of J nozzles NS2 are formed.

Figure 9:
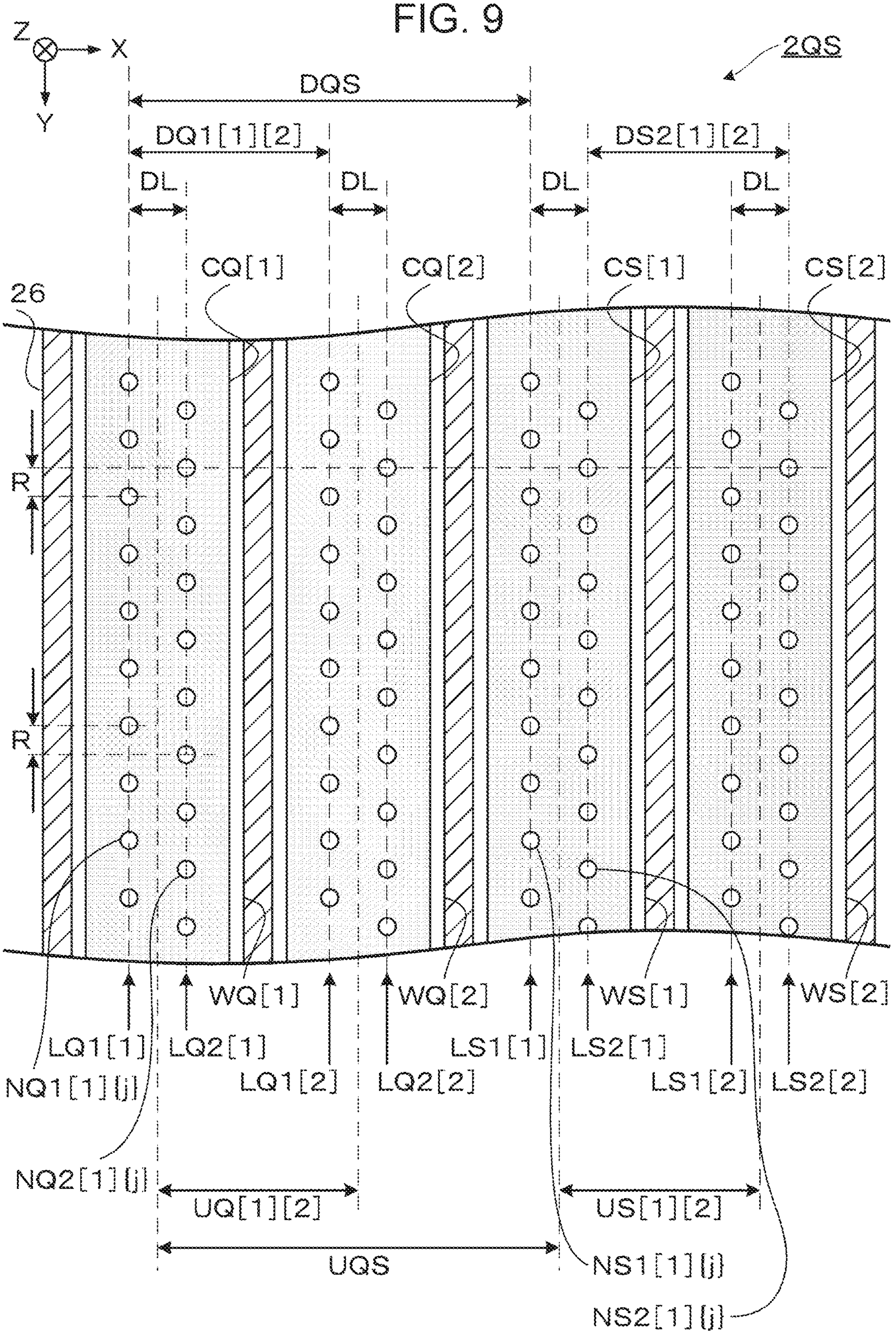
FIG. 9 is an explanatory view illustrating a positional relationship of nozzle plates according to a second embodiment and the fixing plate.

FIG. 9 is an explanatory view illustrating the positional relationship of the M nozzle plates CQ included in the head chip group 300Q, the M nozzle plate CS included in the head chip group 300S, and the fixing plate 26. In addition, FIG. 9 illustrates various positional relationships when the head chip group 300Q and the head chip group 300S are viewed through from the −Z direction to the +Z direction. Hereinafter, a case where M=2 will be illustrated and described.

As illustrated in FIG. 9, M nozzle plates CQ[1] to CQ[M] and M nozzle plates CS[1] to CS[M] are fixed to the fixing plate 26. In the present embodiment, both the M nozzle plates CQ[1] to CQ[M] and the M nozzle plates CS[1] to CS[M] have a common structure.

In the following, among the M nozzle plates CQ[1] to CQ[M], the m-th nozzle plate CQ counted from the −X direction side to the +X direction side is referred to as a nozzle plate CQ[m]. In addition, among the M nozzle plates CS[1] to CS[M], the m-th nozzle plate CS counted from the −X direction side to the +X direction side is referred to as a nozzle plate CS[m]. In the present embodiment, the value m is any natural number satisfying 1≤m≤M. The nozzle plate CQ[m] is fixed to the head chip 3Q[m], and the nozzle plate CS[m] is fixed to the head chip 3S[m]. In the present embodiment, the nozzle plate CQ[1] is fixed to the head chip 3Q[1], and the nozzle plate CS[1] is fixed to the head chip 3S[1]. The nozzle plate CQ[2] is fixed to the head chip 3Q[2], and the nozzle plate CS[2] is fixed to the head chip 3S[2].

In the present embodiment, the nozzle plate CQ[m2] is positioned in the +X direction of the nozzle plate CQ[m1]. Here, as described above, the value m1 and the value m2 are any natural number satisfying 1<m1<m2≤M. Further, in the present embodiment, the nozzle plate CS[m2] is positioned in the +X direction of the nozzle plate CS[m1]. Further, in the present embodiment, the nozzle plate CS[m] is positioned in the +X direction of the nozzle plate CQ[m]. In the present embodiment, since it is assumed that M=2, the value m1 and the value m2 satisfy 1≤m1<m2≤2. In other words, in the present embodiment, it is assumed that m1=1 and m2=2.

In the following, the nozzle row LQ1 provided in the nozzle plate CQ[m] will be referred to as a nozzle row LQ1[m], the nozzle row LQ2 provided in the nozzle plate CQ[m] will be referred to as a nozzle row LQ2[m], the nozzle row LS1 provided in the nozzle plate CS[m] is referred to as a nozzle row LS1[m], and the nozzle row LS2 provided in the nozzle plate CS[m] is referred to as a nozzle row LS2[*m*].

In the present embodiment, the distance between the nozzle row LQ1[m] and the nozzle row LQ2[m] in the X-axis direction is the nozzle row distance DL, and the distance between the nozzle row LS1[m] and the nozzle row LS2[m] in the X-axis direction is the nozzle row distance DL. Further, in the following, the distance between the nozzle row LQ1[m1] and the nozzle row LQ1[m2] in the X-axis direction is expressed as a nozzle row distance DQ1[m1][m2], the distance between the nozzle row LQ2[m1] and the nozzle row LQ2[m2] in the X-axis direction is expressed as a nozzle row distance DQ2[m1][m2], the distance between the nozzle row LS1[m1] and the nozzle row LS1[m2] in the X-axis direction is expressed as a nozzle row distance DS1[m1][m2], and the distance between the nozzle row LS2[m1] and the nozzle row LS2[m2] in the X-axis direction is expressed as the nozzle row distance DS2[m1][m2]. In the present embodiment, the distance between the nozzle row LQ1[m] and the nozzle row LS1[m] in the X-axis direction and the distance between the nozzle row LQ2[m] and the nozzle row LS2[m] in the X-axis direction are commonly referred to as a distance DQS.

Further, in the following, the j-th nozzle N from the −Y direction side among the J nozzles N provided in the nozzle row LQ1[m] is referred to as a nozzle NQ1[m]{j}, the j-th nozzle N from the −Y direction side among the J nozzles N provided in the nozzle row LQ2[m] is referred to as a nozzle NQ2[m]{j}, the j-th nozzle N from the −Y direction side among the J nozzles N provided in the nozzle row LS1[m] is referred to as a nozzle NS1[m]{j}, and the j-th nozzle N from the −Y direction side among the J nozzles N provided in the nozzle row LS2[m] is referred to as a nozzle NS2[m]{j}. In the present embodiment, the nozzle NQ1[m]{j} is positioned on the −Y direction side with respect to the nozzle NQ2[m]{j}, the distance between the nozzle NQ1[m]{j} and the nozzle NQ2[m]{j} in the Y-axis direction is the distance R, and the distance between the nozzle NQ2[m]{j} and the nozzle NQ1[m]{j+1} in the Y-axis direction is the distance R. In addition, in the present embodiment, the nozzle NS1[m]{j} is positioned on the −Y direction side with respect to the nozzle NS2[m]{j}, the distance between the nozzle NS1[m]{j} and the nozzle NS2[m]{j} in the Y-axis direction is the distance R, and the distance between the nozzle NS2[m]{j} and the nozzle NS1[m]{j+1} in the Y-axis direction is the distance R.

The fixing plate 26 includes M plate openings WQ[1] to WQ[M] corresponding to M nozzle plates CQ[1] to CQ[M] on a one-to-one basis, and M plate openings WS[1] to WS[M] corresponding to M nozzle plates CS[1] to CS[M] on a one-to-one basis. In the head chip 3Q[m], the nozzle row LQ1[m] and the nozzle row LQ2[m] provided in the nozzle plate CQ[m] included in the head chip 3Q[m] are fixed to the fixing plate 26 so as to be exposed from the plate opening WQ[m] provided in the fixing plate 26. In the head chip 3S[m], the nozzle row LS1[m] and the nozzle row LS2[m] provided in the nozzle plate CS[m] included in the head chip 3S[m] are fixed to the fixing plate 26 so as to be exposed from the plate opening WS[m] provided in the fixing plate 26. In the present embodiment, it is assumed that both the nozzle plates CQ[1] to CQ[M] and the nozzle plates CS[1] to CS[M] are fixed at the same position in the Y-axis direction. In other words, the nozzle NQ1[m1]{j}, the nozzle NQ1[m2]{j}, the nozzle NS1[m1]{j}, and the nozzle NS1[m2]{j} are arranged at the same position in the Y-axis direction. The plate opening WQ[m2] is provided in the +X direction of the plate opening WQ[m1]. The plate opening WS[m2] is provided in the +X direction of the plate opening WS[m1].

In the following, the distance between the center of the plate opening WQ[m1] and the center of the plate opening WQ[m2] in the X-axis direction is referred to as a plate opening distance UQ[m1][m2], and the distance between the center of the plate opening WS[m1] and the center of the plate opening WS[m2] in the X-axis direction is referred to as a plate opening distance US[m1][m2]. In the present embodiment, it is assumed that, when the value m1 and the value m2 satisfy "m2=1+m1", the plate opening distance UQ[m1][m2] and the plate opening distance US[m1][m2] are constant distances. In other words, in the present embodiment, it is assumed that both the plate opening distance UQ[1][2] and the plate opening distance US[1][2] are equal.

Further, in the present embodiment, it is assumed that the distance between the center of the nozzle plate CQ[m] and the center of the plate opening WQ[m] in the X-axis direction, and the distance between the center of the nozzle plate CS[m] and the center of the plate opening WS[m] in the X-axis direction are constant. Further, in the present embodiment, the distance between the plate opening WQ[m] and the plate opening WS[m] in the X-axis direction is a distance UQS. In the present embodiment, the distance UQS is equal to the distance DQS.

Figure 10:
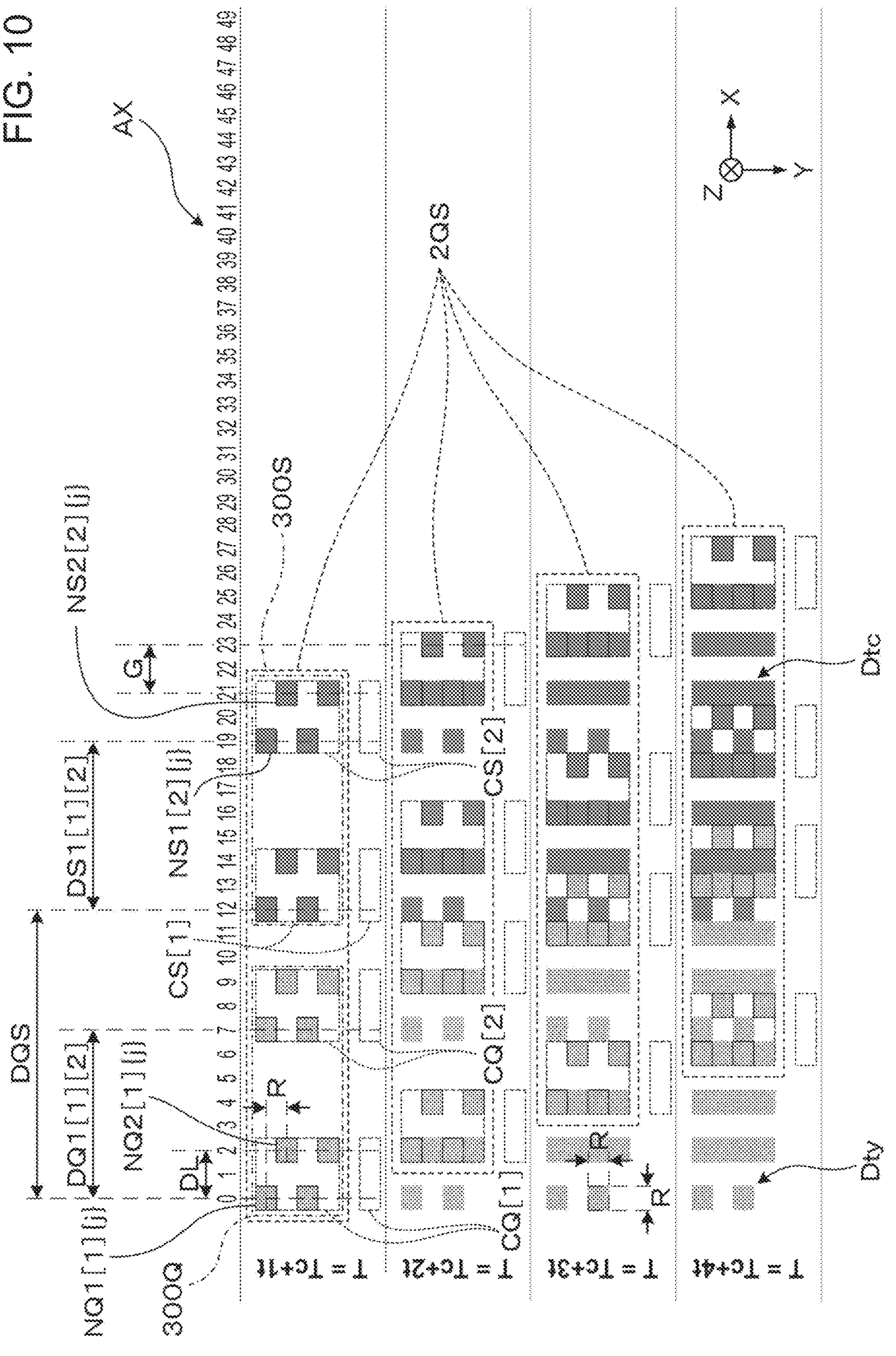
FIG. 10 is an explanatory view illustrating an operation of a head module according to the second embodiment and a positional relationship of formed dots.
Figure 11:
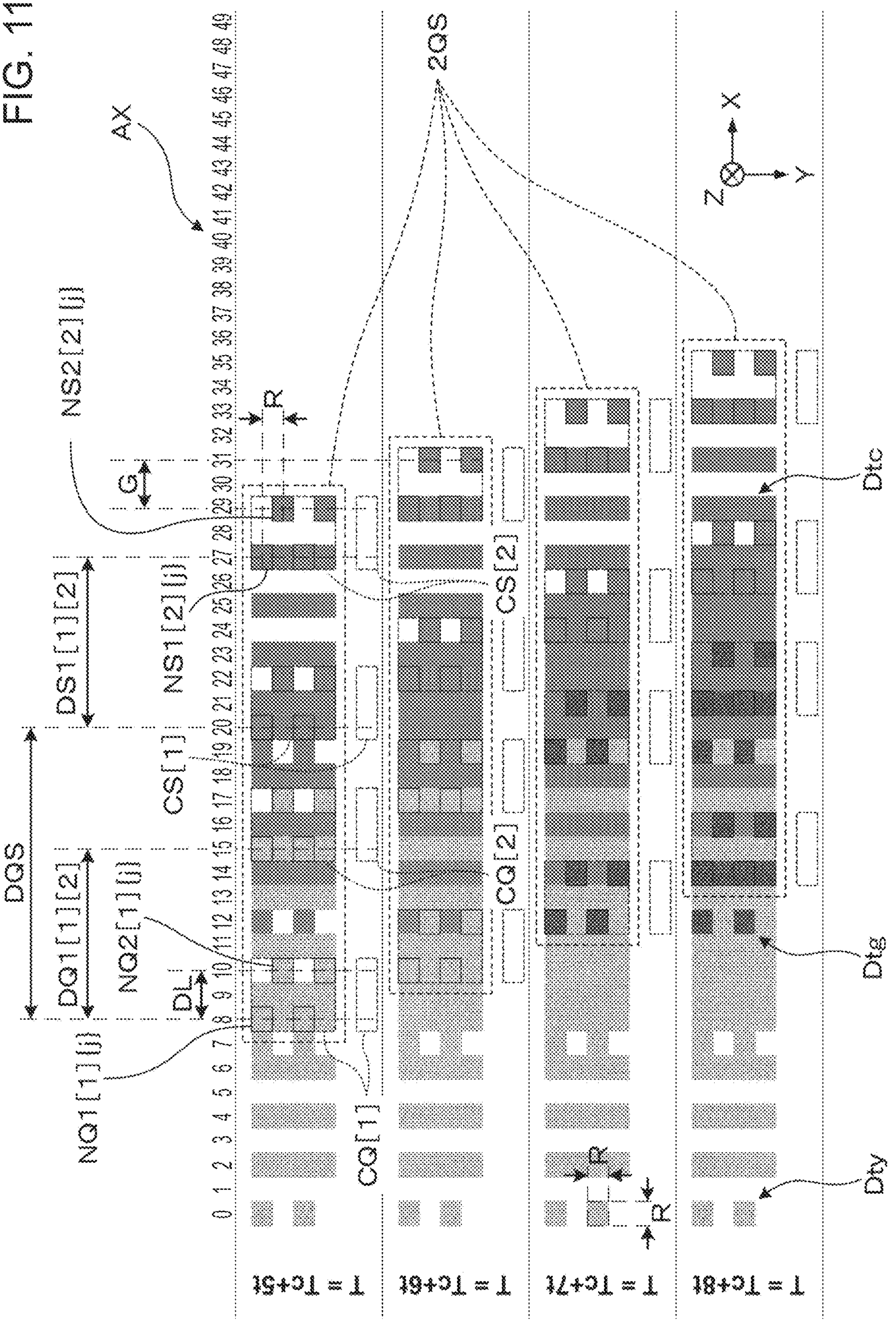
FIG. 11 is an explanatory view illustrating an operation of the head module according to the second embodiment and a positional relationship of formed dots.
Figure 12:
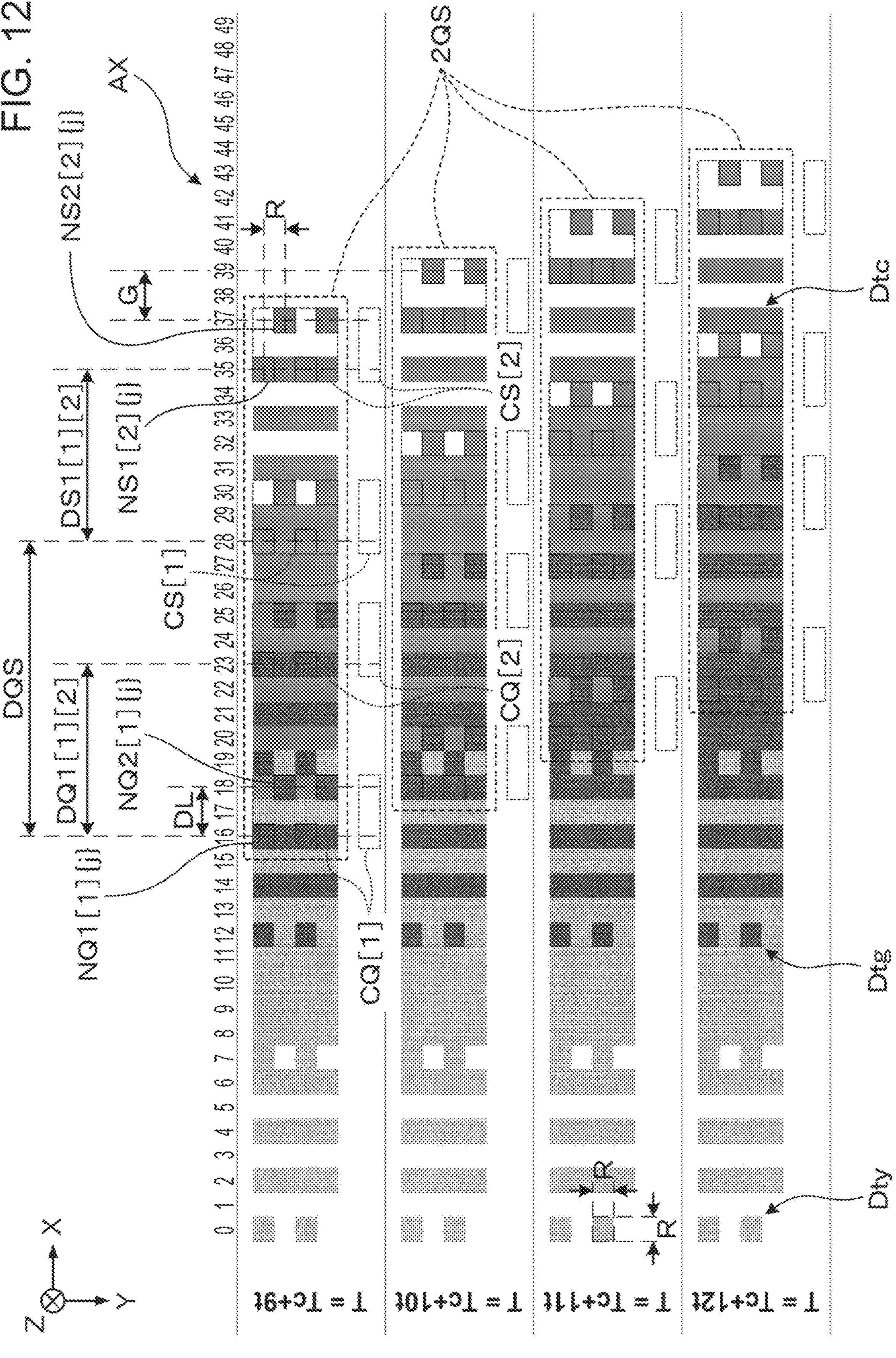
FIG. 12 is an explanatory view illustrating an operation of the head module according to the second embodiment and a positional relationship of formed dots.

FIGS. 10 to 12 are explanatory views illustrating the operations of the head chip group 300Q and the head chip group 300S when the printing operation is performed using the head module 2QS illustrated in FIG. 9, and the positional relationship between the dots Dt formed by the head chip group 300Q and the head chip group 300S.

Further, in FIGS. 10 to 12, the printing operation will be described focusing on M nozzles NQ1[1]{j} to NQ1[M]{j}, M nozzles NQ1[1]{j+1} to NQ1[M]{j+1}, M nozzles NQ2[1]{j} to NQ2[M]{j}, M nozzles NQ2[1]{j+1} to NQ2[M]{j+1}, M nozzles NS1[1]{j} to NS1[M]{j}, M nozzles NS1[1]{j+1} to NS1[M]{j+1}, M nozzles NS2[1]{j} to NS2[M]{j}, and M nozzles NS2[1]{j+1} to NS2[M]{j+1}, among the total of 4×M×J nozzles N provided in the head module 2QS.

As described above, in the present embodiment, it is assumed that M=2. Therefore, FIGS. 10 to 12 illustrate two nozzles NQ1[1]{j} to NQ1[2]{j}, two nozzles NQ1[1]{j+1} to NQ1[2]{j+1}, two nozzles NQ2[1]{j} to NQ2[2]{j}, two nozzles NQ2[1]{j+1} to NQ2[2]{j+1}, two nozzles NS1[1]{j} to NS1[2]{j}, two nozzles NS1[1]{j+1} to NS1[2]{j+1}, two nozzles NS2[1]{j} to NS2[2]{j}, and two nozzles NS2[1]{j+1} to NS2[2]{j+1}, among the total of 8×J nozzles N provided in the head module 2QS.

Further, FIGS. 10 to 12 illustrate the process of forming the dots Dt when the head module 2QS discharges ink while moving in the +X direction, as in FIGS. 6 to 8. Of these, FIG. 10 illustrates the positional relationship between the head module 2QS and the dots Dt when the time T is Tc+1t to Tc+4t. In addition, FIG. 11 illustrates the positional relationship between the head module 2QS and the dots Dt when the time T is Tc+5t to Tc+8t. In addition, FIG. 12 illustrates the positional relationship between the head module 2QS and the dots Dt when the time T is Tc+9t to Tc+12t. For clarification, the positions of the nozzle plate CQ[m] and the nozzle plate CS[m] in the X-axis direction at each time are illustrated below the broken line rectangle indicating the head module 2QS by using a broken line rectangle having the same height as the distance R. Further, for convenience of illustration, in FIGS. 10 to 12, the dot Dt is a square having a width equal to the distance R in the X-axis direction and the Y-axis direction, and it is considered that all the dots Dt have the same shape.

In FIGS. 10 to 12, among the plurality of dots Dt formed by the head module 2QS, the dot Dt formed by yellow ink discharged from the nozzle NQ provided in the head chip group 300Q is referred to as a dot Dty, and the dot Dt formed by cyan ink discharged from the nozzle NS provided in the head chip group 300S is referred to as a dot Dtc. Further, in FIGS. 10 to 12, the green dot Dt obtained as a result of forming the yellow dot Dty and the cyan dot Dtc at the same position is referred to as a dot Dtg. As illustrated in FIGS. 10 to 12, the position of the dot Dty is illustrated as a region indicated by the thinnest hatching, the position of the dot Dtg is illustrated as a region indicated by the darkest hatching, and the position of the dot Dtc is illustrated as a region hatched with an intermediate density between the hatching of the region indicating the position of the dot Dty and the hatching of the region indicating the position of the dot Dtg, respectively. More specifically, in the process of forming the dot Dt at the time T=Tc+12t illustrated in FIG. 12, the dot Dt formed at the position where the X-axis coordinate AX is 8 is the dot Dty, the dot Dt formed at the position where the X-axis coordinate AX is 21 is the dot Dtg, and the dot Dt formed at the position where the X-axis coordinate AX is 36 is the dot Dtc.

In the second embodiment, each of the plurality of nozzles N provided in the head module 2QS discharges the initial ink at the time T=Tc+1t to form the dot Dt on the recording paper sheet PE, and thereafter, new dots Dt are formed every time the time t elapses. For convenience of illustration, as in FIGS. 6 to 8, a process of so-called solid printing in which ink is discharged from all the nozzles N provided in the head module 2QS at the same timing to form the dots Dt without gaps is illustrated, but the present disclosure is not limited thereto. The head module 2QS may form the dots Dt by discharging ink from some of the nozzles N.

In the head module 2QS, various dimensions and arrangements in the X-axis direction are set based on the basic resolution unit ΔX in the X-axis direction. In the head module 2QS, various dimensions and arrangements in the Y-axis direction are set based on the basic resolution unit ΔY in the Y-axis direction. In the second embodiment, as an example, it is assumed that the basic resolution unit ΔX is equal to the basic resolution unit ΔY. Further, in the present embodiment, as an example, it is assumed that the distance R is set to be equal to the basic resolution unit ΔX and the basic resolution unit ΔY.

Further, the scanning speed of the head module 2QS in the X-axis direction is set based on the basic resolution unit ΔX. For example, the head module 2QS is scanned at a speed for advancing by a distance G set based on the basic resolution unit ΔX every time the time t elapses after the time T=Tc+1t. In the present embodiment, the distance G is set to a natural number multiple of the basic resolution unit ΔX. Specifically, the distance G is set to M times the basic resolution unit ΔX, that is, M times the distance R. In other words, in the present embodiment, the distance G is G=MR. More specifically, in the present embodiment, as described above, M=2. Therefore, in the present embodiment, the scanning speed of the head module 2QS is set such that the distance G is G=2R.

In the present embodiment, the nozzle row distance DL is set based on the basic resolution unit ΔX in the X-axis direction. Specifically, the nozzle row distance DL is set to a natural number multiple of the basic resolution unit ΔX. Further, the nozzle row distance DL is set to a natural number multiple of the distance G. Specifically, the nozzle row distance DL is set to a times the distance G. In other words, the nozzle row distance DL is set to (M×α) times the basic resolution unit ΔX, that is, (M×α) times the distance R. In other words, DL=(M×α)×R. Here, the value α is a natural number of 1 or more.

In the present embodiment, the nozzle row distance DQ1[1][ma] is determined based on the basic resolution unit ΔX in the X-axis direction. As described above, the value ma is any natural number satisfying 2≤ma≤M. Specifically, the nozzle row distance DQ1[1][ma] is set to a natural number multiple of the basic resolution unit ΔX. More specifically, in the present embodiment, since it is assumed that M=2, the value ma satisfies ma=2. In other words, the nozzle row distance DQ1[1][2] is set to a natural number multiple of the basic resolution unit ΔX. In addition, the nozzle row distance DQ1[1][ma] is set to a distance different from the natural number multiple of the distance G. Specifically, the nozzle row distance DQ1[1][ma] is set to a distance obtained by adding β[ma] times the distance G and γ[ma] times the distance R. In other words, the nozzle row distance DQ1[1][ma] is (M×β[ma]+γ[ma]) times the basic resolution unit ΔX, that is, (M×J3[ma]+γ[ma]) times the distance R. In other words, DQ1[1][ma]=(M×β[ma]+γ[ma])×R. In addition, as described above, the value ma is any natural number satisfying 2≤ma≤M. Further, the value β[ma] is a natural number satisfying α<β[ma]. Further, the value γ[ma] is a natural number satisfying 1≤γ[ma]≤M−1. Further, when satisfying M≥3, the value γ[ma] satisfies γ[ma1]≠γ[ma2] when the natural number ma1 and the natural number ma2 satisfy 2≤ma1<ma2≤M. In other words, in the present embodiment, since it is assumed that M=2, ma=2, β[ma]=[2], γ[ma]=γ[2]=1, and DQ1[1][ma]=DQ1[1][2]=(2×β[2]+γ[2])×R=(2×β[2]+1)×R are established.

In the present embodiment, the nozzle row distance DS1[1][ma] is determined based on the basic resolution unit ΔX in the X-axis direction. Further, the nozzle row distance DS1[1][ma] is set to the same distance as the nozzle row distance DQ1[1][ma]. In other words, the nozzle row distance DS1[1][ma] is (M×β[ma]+γ[ma]) times the basic resolution unit ΔX, that is, (M×β[ma]+γ[ma]) times the distance R. In other words, DS1[1][ma]=(M×β[ma]+γ[ma])×R. In addition, as described above, since it is assumed that M=2, ma=2, β[ma]=[2], γ[ma]=γ[2]=1, and DS1[1][ma]=DS1[1][2]=(2×β[2]+γ[2])×R=(2×β[2]+1)×R are established.

Further, in the present embodiment, the distance DQS is set to a natural number multiple of the basic resolution unit ΔX. Further, the distance DQS is set to a natural number multiple of the distance G. Specifically, the distance DQS is set to ω times the distance G. In other words, the distance DQS is set to (M×ω) times the basic resolution unit ΔX, that is, (M×ω) times the distance R. In other words, DQS=(M×ω)×R. Here, the value ω is a natural number satisfying β[ma]<ω.

As described above, in the present embodiment, the nozzle row distance DL, the nozzle row distances DQ1[1][ma] and DS1[1][ma], and the distance DQS are set to satisfy DL:DQ1[1][ma] (=DS1[1][ma]):DQS=ΔX×M×α:ΔX×(M×β[ma]+γ[ma]):ΔX×M×ω=M×α:M×β[ma]+γ[ma]:M×ω.

In the present embodiment, it is assumed that M=2 and ma=2. Therefore, in the present embodiment, γ[ma]=1 and M×α, M×β[ma], and M×ω are even numbers. In other words, in the present embodiment, M×α is an even number, M×β[ma]+γ[ma] is an odd number, and M×ω is an even number. Therefore, in the present embodiment, the nozzle row distance DL, the nozzle row distances DQ1[1][ma] and DS1[1][ma], and the distance DQS are set to satisfy DL:DQ1[1][ma] (=DS1[1][ma]) DQS=E1:O1:E2. Here, the value E1 is a positive even number, the value O1 is a positive odd number satisfying O1>E1, and the value E2 is a positive even number satisfying E2>O1.

In FIGS. 10 to 12, the position of the nozzle NQ1[1]{j} in the X-axis direction at time T=Tc+1t is AX=0. Accordingly, the nozzle NQ1[1]{j} can form the dot Dty for AX=2k−2 at the time T=Tc+kt. In other words, the nozzle NQ1[1]{j} can form the dot Dty for AX=2×k1. Here, the variable k is a natural number of 1 or more. In addition, in the present embodiment, the variable k1 is an integer satisfying k1=k−1.

Further, in FIGS. 10 to 12, it is assumed that α=1. The nozzle NQ2[1]{j} is provided at a position moved from the nozzle NQ1[1]{j} in the +X direction by a distance equal to the nozzle row distance DL. Further, in the present embodiment, since M=2, the nozzle row distance DL is set to be (M×α) times the basic resolution unit ΔX, that is, (M×α)

times the distance R, that is, two times the distance R. Accordingly, the nozzle NQ2[1]{j} can form the dot Dty for AX=2k at the time T=Tc+kt. In other words, the nozzle NQ2[1]{j} can form the dot Dty for AX=2×(k1+1).

In addition, in FIGS. 10 to 12, the position of the nozzle NQ1[2]{j} in the X-axis direction at time T=Tc+1t is AX=7. Since the position of the nozzle NQ1[1]{j} in the X-axis direction at time T=Tc+1t is AX=0, in FIGS. 10 to 12, DQ1[1][2]=(2×$\beta$[2]+$\gamma$[2])R=7R. As described above, since $\gamma$[2]=1, in FIGS. 10 to 12, $\beta$[2]=3 when ma=2. Since the nozzle NQ1[2]{j} is provided at a position moved by AX=+7 from the nozzle NQ1[1]{j}, the dot Dty can be formed for AX=2k+5 at time T=Tc+kt. In other words, the nozzle NQ1[2]{j} can form the dot Dty for AX=2×k2+1. In addition, in the present embodiment, the variable k2 is an integer satisfying k2=k+2.

In addition, in FIGS. 10 to 12, since the nozzle NQ2[2]{j} is provided at a position moved by 2R, that is, by the distance equal to the nozzle row distance DL in the +X direction from the nozzle NQ1[2]{j}, the dot Dty can be formed for AX=2k+7 at the time T=Tc+kt. In other words, the nozzle NQ2[2]{j} can form the dot Dty for AX=2×(k2+1)+1.

As described above, the nozzle NQ1[1]{j} can form the dot Dty for AX=2×k1, and the nozzle NQ1[2]{j} can form the dot Dty for AX=2×k2+1. Therefore, in FIGS. 10 to 12, a plurality of dots Dty can be formed with the basic resolution unit $\Delta X$ (distance R) without overlapping in the X-axis direction by the two nozzles NQ1[1]{j} and NQ1[2]{j}.

In addition, in FIGS. 10 to 12, the position of the nozzle NS1[1]{j} in the X-axis direction at time T=Tc+1t is AX=12. Accordingly, the nozzle NS1[1]{j} can form the dot Dtc for AX=2k+10 at the time T=Tc+kt. In other words, the nozzle NS1[1]{j} can form the dot Dtc for AX=2×k3. In addition, in the present embodiment, the variable k3 is an integer satisfying k3=k+5.

In addition, in FIGS. 10 to 12, since the nozzle NS2[1]{j} is provided at a position moved by 2R, that is, by the distance equal to the nozzle row distance DL in the +X direction from the nozzle NS1[1]{j}, the dot Dtc can be formed for AX=2k+12 at the time T=Tc+kt. In other words, the nozzle NS2[1]{j} can form the dot Dty for AX=2×(k3+1).

In addition, in FIGS. 10 to 12, the position of the nozzle NS1[2]{j} in the X-axis direction at time T=Tc+1t is AX=19. In other words, the positional relationship between the nozzle NS1[1]{j} and the nozzle NS1[2]{j} is the same as the positional relationship between the nozzle NQ1[1]{j} and the nozzle NQ1[2]{j} described above. Therefore, in FIGS. 10 to 12, $\beta$[2]=3 and $\gamma$[2]=1. In addition, the nozzle NS1[2]{j} can form the dot Dtc for AX=2k+17 at the time T=Tc+kt. In other words, the nozzle NS1[2]{j} can form the dot Dtc for AX=2×k4+1. In addition, in the present embodiment, the variable k4 is an integer satisfying k4=k+8.

In addition, in FIGS. 10 to 12, since the nozzle NS2[2]{j} is provided at a position moved by 2R, that is, by the distance equal to the nozzle row distance DL in the +X direction from the nozzle NS1[2]{j}, the dot Dtc can be formed for AX=2k+19 at the time T=Tc+kt. In other words, the nozzle NS2[2]{j} can form the dot Dtc for AX=2×(k4+1)+1.

As described above, the nozzle NS1[1]{j} can form the dot Dtc for AX=2×k3, and the nozzle NS1[2]{j} can form the dot Dtc for AX=2×k4+1. Therefore, in FIGS. 10 to 12, a plurality of dots Dtc can be formed with the basic resolution unit $\Delta X$ (distance R) without overlapping in the X-axis direction by the two nozzles NS1[1]{j} and NS1[2]{j}.

As described above, according to the present embodiment, the head module 2QS can form the dot Dty and the dot Dtc with the basic resolution unit $\Delta X$ in the X-axis direction. In other words, according to the present embodiment, the head module 2QS can form the dots Dtg with the basic resolution unit $\Delta X$ (distance R) without overlapping the plurality of dots Dt in the X-axis direction. In other words, according to the present embodiment, it is possible to form a plurality of dots Dtg on the recording paper sheet PE such that the distance between the dots Dtg in the X-axis direction and the distance between the dots Dtg in the Y-axis direction are equal.

As described above, according to the present embodiment, the head module 2QS can form a plurality of types of dots Dt with the distances R in the X-axis direction. As described above, the distance R is equal to the basic resolution unit $\Delta X$ and the basic resolution unit $\Delta Y$, and thus, according to the present embodiment, the head module 2QS can form a plurality of types of dots Dt on the recording paper sheet PE such that both the distance between the dots Dt in the X-axis direction and the distance between the dots Dt in the Y-axis direction are equal to the basic resolution unit.

Further, in the present embodiment, as in the first embodiment, by using two nozzle rows provided at different positions in the Y-axis direction, a plurality of types of dots Dt can be formed at different positions in the Y-axis direction.

Further, in the present embodiment, as in the first embodiment, by using two nozzle rows that can form the dots Dt at different positions in the X-axis direction, a plurality of types of dots Dt can be formed at different positions in the X-axis direction.

As described above, the head module 2QS according to the second embodiment in which the X-axis direction is the main scanning direction, includes: the nozzle row LQ1[1] including the nozzle NQ1[1]{j} for discharging ink; the nozzle row LQ2[1] including the nozzle NQ2[1]{j} for discharging ink; and the nozzle row LQ1[2] including the nozzle NQ1[2]{j} for discharging ink, and the nozzle row distance DL between the nozzle row LQ1[1] and the nozzle row LQ2[1] in the X-axis direction, and the nozzle row distance DQ1[1][2] between the nozzle row LQ1[1] and the nozzle row LQ1[2] in the X-axis direction can be expressed as DL:DQ1[1][2]=E1:O1 where the value E1 is a positive even number and the value O1 is a positive odd number satisfying O1>E1. In other words, when the head module 2QS forms the dots Dty with predetermined distances while being scanned in the X-axis direction, the nozzle row distance DQ1[1][2] between the nozzle row LQ1[1] and the nozzle row LQ1[2] is set to have a predetermined ratio with respect to the nozzle row distance DL between the nozzle row LQ1[1] and the nozzle row LQ2[1]. Accordingly, by performing the printing operation using the head module 2QS according to the second embodiment, it is possible to suppress the overlapping of dots Dty and generation of gaps in the X-axis direction and perform high-speed and high-resolution printing.

In the second embodiment, the X-axis direction is an example of the "first direction", the head module 2QS is an example of the "head module", the ink is an example of the "liquid", the nozzle NQ1[1]{j} is an example of the "first nozzle", the nozzle row LQ1[1] is an example of the "first nozzle row", the nozzle NQ2[1]{j} is an example of the "second nozzle", the nozzle row LQ2[1] is an example of the "second nozzle row", the nozzle NQ1[2]{j} is an example of the "third nozzle", the nozzle row LQ1[2] is an example of the "third nozzle row", the nozzle row distance DL is an example of the "distance P1", and the nozzle row distance DQ1[1][2] is an example of the "distance P2".

Regarding the nozzle row distance DL and the nozzle row distance DQ1[1][2], there may be a value other than 1 which is a common divisor between the nozzle row distance DL and the nozzle row distance DQ1[1][2]. When the value which is the greatest common divisor of the nozzle row distance DL and the nozzle row distance DQ1[1][2] is referred to as a value F2, the value obtained by dividing the nozzle row distance DL by the value F2 is referred to as a value DLF2, and the value obtained by dividing the nozzle row distance DQ1[1][2] by the value F2 is referred to as a value D1F2, it is considered that the nozzle row distance DL and the nozzle row distance DQ1[1][2]can be expressed as DL:DQ1[1][2]=E1:O1 when the value DLF2 and the value D1F2 satisfy DLF2:D1F2=E1:O1. The value DLF2 and the value D1F2 are relatively prime. Further, the nozzle row distance DL and the nozzle row distance DQ1[1][2] may be relatively prime. In other words, the value E1 and the value O1 may be relatively prime.

Further, in the head module 2QS according to the second embodiment, the nozzle NQ1[1]{j} and the nozzle NQ1[2]{j} are arranged at the same position in the Y-axis direction orthogonal to the X-axis direction. In other words, the ink discharged from the nozzle NQ1[1]{j} and the nozzle NQ1[2]{j} can form the dots Dt at the same position in the Y-axis direction. Accordingly, the head module 2QS can improve the resolution in the X-axis direction.

In the second embodiment, the Y-axis direction is an example of the "second direction".

Further, in the head module 2QS according to the second embodiment, the nozzle row LQ1[1] includes a plurality of nozzles N for discharging ink, the nozzle row LQ2[1] includes a plurality of nozzles NQ for discharging ink, and in the Y-axis direction, one of the plurality of nozzles NQ included in the nozzle row LQ2[1] is provided between the two nozzles N adjacent to each other among the plurality of nozzles NQ included in the nozzle row LQ1[1]. In other words, in the Y-axis direction, the dots Dty formed by the nozzle NQ2[1]{j} are positioned between the dots Dty formed by the nozzle NQ1[1]{j} and the nozzle NQ1[1]{j+1}. Accordingly, the head module 2QS can improve the resolution in the Y-axis direction.

In the second embodiment, the nozzle NQ is an example of the "nozzle".

Further, the head module 2QS according to the second embodiment includes the head chip 3Q[1] having the nozzle row LQ1[1] and the nozzle row LQ2[1] and the head chip 3Q[2] having the nozzle row LQ1[2]. In other words, one head chip 3Q is provided with two nozzle rows that form the dots Dty at the same position in the X-axis direction. Accordingly, distortion of the landing position of the dot Dty in the X-axis direction is unlikely to occur, and printing accuracy is improved.

In the second embodiment, the head chip 3Q[1] is an example of the "first head chip", and the head chip 3Q[2] is an example of the "second head chip".

Further, in the head module 2QS according to the second embodiment, the head chip 3Q[1] including the nozzle row LQ1[1] and the nozzle row LQ2[1] and the head chip 3Q[2] including the nozzle row LQ1[2] have a common structure. Accordingly, the manufacturing cost of the head chip can be reduced.

Further, in the head module 2QS according to the second embodiment, the head chip 3Q[1] having the nozzle row LQ1[1] and the nozzle row LQ2[1] includes the nozzle plate CQ[1] in which the nozzle row LQ1[1] and the nozzle row LQ2[1] are provided, and the head chip 3Q[2] having the nozzle row LQ1[2] includes the nozzle plate CQ[2] in which the nozzle row LQ1[2] is provided. Accordingly, it is possible to improve the alignment accuracy of two nozzle rows capable of forming the dots Dty at the same position in the X-axis direction.

In the second embodiment, the nozzle plate CQ[1] is an example of the "first nozzle plate", and the nozzle plate CQ[2] is an example of the "second nozzle plate".

Further, in the head module 2QS according to the second embodiment, the fixing plate 26 to which the head chip 3Q[1] having the nozzle row LQ1[1] and the nozzle row LQ2[1] and the head chip 3Q[2] having the nozzle row LQ1[2] are fixed, and which has the plate opening W for exposing at least the nozzle row LQ1[1] and the nozzle row LQ2[1] in the nozzle plate CQ[1] and at least the nozzle row LQ1[2] in the nozzle plate CQ[2], is further provided, and the head chip 3Q[1] having the nozzle row LQ1[1] and the nozzle row LQ2[1] and the head chip 3Q[2] having the nozzle row LQ1[2] are fixed to the fixing plate 26 such that the distance between the center of the head chip 3Q[1] having the nozzle row LQ1[1] and the nozzle row LQ2[1] and the center of the head chip 3Q[2] having the nozzle row LQ1[2] in the X-axis direction is the nozzle row distance DQ1[1][2] when the fixing plate 26 is viewed in plan view. In the X-axis direction, the centers of each head chip coincide with the centers of the nozzle plates C included in each head chip. Further, in the X-axis direction, the distance between the center of the nozzle plate CQ[m] and the center of the plate opening WQ[m] is constant. In other words, the head chip 3Q[1] having the nozzle row LQ1[1] and the nozzle row LQ2[1] and the head chip 3Q[2] having the nozzle row LQ1[2] are fixed to the fixing plate 26 such that the distance between the centers thereof in the X-axis direction coincides with the plate opening distance UQ[1][2] and coincides with the nozzle row distance DQ1[1][2]. Further, the plurality of head chips 3Q are provided in the head module 2QS with constant distances. Accordingly, when printing is performed using the head module 2QS according to the second embodiment, distortion of the landing position of the dot Dt is unlikely to occur, and printing accuracy is improved, as compared with a case where the plurality of head modules are used to perform similar printing such that the total number of nozzles N of the head module 2QS and the total number of nozzles are equal in the X-axis direction.

In the second embodiment, the plate opening W is an example of the "opening portion", and the fixing plate 26 is an example of the "fixing plate".

Further, the head module 2QS according to the second embodiment further includes the holder 25 that has the supply flow path 251 for supplying ink to the head chip 3Q[1] having the nozzle row LQ1[1] and the nozzle row LQ2[1] and the head chip 3Q[2] having the nozzle row LQ1[2], and holds the head chip 3Q[1] having the nozzle row LQ1[1] and the nozzle row LQ2[1] and the head chip 3Q[2] having the nozzle row LQ1[2] such that the distance between the center of the head chip 3Q[1] having the nozzle row LQ1[1] and the nozzle row LQ2[1] and the center of the head chip 3Q[2] having the nozzle row LQ1[2] in the X-axis direction is the nozzle row distance DQ1[1][2]. Accordingly, ink can be supplied to each head chip.

In the second embodiment, the supply flow path 251 is an example of the "supply flow path", and the holder 25 is an example of the "holder".

Further, the head module 2QS according to the second embodiment further includes: the inlet 220 for introducing a liquid; and the distribution flow path 221 that communicates with the nozzle NQ1[1]{j} and the nozzle NQ1[2]{j} and distributes the ink introduced from the inlet 220 to the nozzle NQ1[1]{j} and the nozzle NQ1[2]{j}. Accordingly, the same ink can be supplied to the plurality of nozzles N.

In the second embodiment, the inlet 220 is an example of the "inlet", and the distribution flow path 221 is an example of the "distribution flow path".

Further, the ink jet printer according to the second embodiment includes the head module 2QS according to the second embodiment; and the carriage 761 for reciprocating the head module 2QS in the X-axis direction and in the direction opposite to the X-axis direction. Accordingly, by performing the printing operation using the ink jet printer including the head module 2QS according to the second embodiment, it is possible to suppress the overlapping of dots Dty and generation of gaps and perform high-speed and high-resolution printing.

In the second embodiment, the ink jet printer is an example of the "liquid discharge apparatus", and the carriage 761 is an example of the "carriage".

Further, in the ink jet printer according to the second embodiment, the minimum distance between two dots Dty formed by the nozzle NQ1[1]{j} in the X-axis direction is twice the basic resolution unit ΔX, which is a distance obtained by dividing the nozzle row distance DL by the value E1 and obtained by dividing the nozzle row distance DQ1[1][2] by the value O1. In other words, the head module 2QS mounted on the ink jet printer according to the second embodiment is scanned at a speed for advancing by the distance G, that is, twice the basic resolution unit ΔX, while forming two dots Dty from the specific nozzle NQ in the X-axis direction. Further, in the X-axis direction, the nozzle row distance DL is set to an integer multiple of the distance G with respect to the minimum distance G between the dots Dty formed by the specific nozzle NQ included in the head module 2QS. Accordingly, when forming the dots Dty by the nozzle NQ1[1]{j} included in the nozzle row LQ1[1] and the nozzle NQ2[1]{j} included in the nozzle row LQ2[1] while the head module 2QS is scanned in the X-axis direction, it is possible to form the dot Dty formed by the nozzle NQ1[1]{j} and the dot Dty formed by the nozzle NQ2[1]{j} at the same position in the X-axis direction.

In the second embodiment, the dot Dty is an example of the "dot", and the basic resolution unit ΔX is an example of the "distance P0".

Further, in the ink jet printer according to the second embodiment, the nozzle NQ1[1]{j}, the nozzle NQ2[1]{j}, and the nozzle NQ1[2]{j} can discharge ink at the same timing. Accordingly, it is possible to form the dots Dty with predetermined distances.

Further, in the ink jet printer according to the second embodiment, the common driving signal Com is supplied to the first driving element corresponding to the nozzle NQ1[1]{j}, the second driving element corresponding to the nozzle NQ2[1]{j}, and the third driving element corresponding to the nozzle NQ1[2]{J}. Accordingly, it is possible to achieve size reduction and cost reduction of the apparatus.

In the second embodiment, the piezoelectric element 331 corresponding to the nozzle NQ1[1]{j} provided in the nozzle plate CQ[1] is an example of the "first driving element", the piezoelectric element 332 corresponding to the nozzle NQ2[1]{j} provided in the nozzle plate CQ[1] is an example the "second driving element", and the piezoelectric element 331 corresponding to the nozzle NQ1[2]{J} provided in the nozzle plate CQ[2] is an example of the "third driving element". Further, the driving signal Com is an example of the "driving signal".

Further, in the ink jet printer according to the second embodiment, the nozzle NQ1[1]{j}, the nozzle NQ2[1]{j}, and the nozzle NQ1[2]{j} discharge the same type of ink. In other words, the same type of ink is discharged from the nozzle NQ2[1]{j} and the nozzles NQ1[1]{j} and NQ1[2]{j} provided at positions different from that of the nozzle NQ2[1]{j} in the Y-axis direction. Accordingly, it is possible to achieve high resolution in the Y-axis direction.

Further, in the ink jet printer according to the second embodiment, the nozzle NQ1[1]{j}, the nozzle NQ2[1]{j}, and the nozzle NQ1[2]{j} discharge the same type of ink, the distance between the two adjacent nozzles NQ among the plurality of nozzles NQ included in the nozzle row LQ1[1] in the Y-axis direction orthogonal to the X-axis direction is twice the basic resolution unit ΔX, and the distance between the nozzle NQ1[1]{j} and the nozzle NQ2[1]{j} in the Y-axis direction orthogonal to the X-axis direction is the basic resolution unit ΔX. Accordingly, it is possible to make the resolutions both in the main scanning direction and the sub-scanning direction uniform.

3. Third Embodiment

Hereinafter, the third embodiment of the present disclosure will be described.

The ink jet printer according to the third embodiment is different from the ink jet printers according to the above-described first embodiment and second embodiment in that, in each head chip 3, the position of each nozzle N1[m]{j} that forms the nozzle row L1 provided in the head chip 3 in the Y-axis direction and the position of each nozzle N2[m]{j} that forms the nozzle row L2 provided in the head chip 3 in the Y-axis direction are the same.

Specifically, the ink jet printer according to the third embodiment is different from the ink jet printer 1 according to the first embodiment in that a head module 2A is provided instead of the head module 2. The head module 2A includes M head chips 3A. The head chip 3A is different from the head chip 3 according to the first embodiment in that a nozzle plate CA is provided instead of the nozzle plate C. In other words, in the present embodiment, the head module 2A includes M nozzle plates CA[1] to CA[M]. Hereinafter, among the M nozzle plates CA[1] to CA[M] provided in the head module 2A, the m-th nozzle plate CA from the −X direction is referred to as a nozzle plate CA[m]. Further, based on the change from the nozzle plate C to the nozzle plate CA, the pressure chamber forming substrate 34, the flow path substrate 35, the wiring substrate 30, and the like of the head chip 3A are different from those of the head chip 3.

Figure 13:
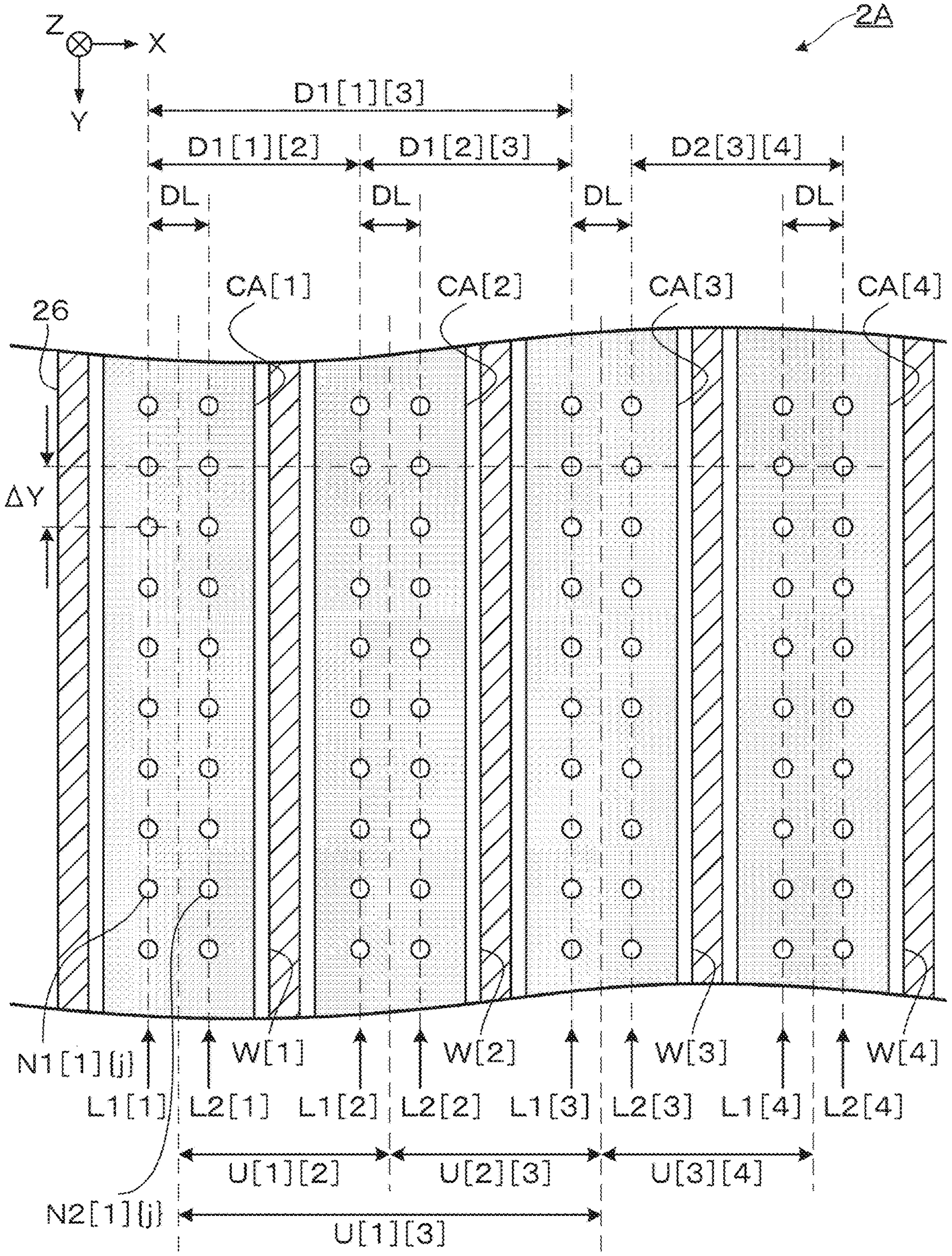
FIG. 13 is an explanatory view illustrating a positional relationship between a nozzle plate according to a third embodiment and the fixing plate.

FIG. 13 is an explanatory view illustrating the positional relationship between M nozzle plate CA included in the head module 2A and the fixing plate 26. In addition, FIG. 13 illustrates various positional relationships when the head module 2A is viewed through from the −Z direction to the +Z direction. Hereinafter, a case where M=4 will be illustrated and described.

As illustrated in FIG. 13, in the present embodiment, M nozzle plates CA[1] to CA[M] are fixed to the fixing plate 26. In the present embodiment, it is assumed that the M nozzle plates CA[1] to CA[M] all have a common structure.

Further, the nozzle plate CA[m2] is positioned in the +X direction of the nozzle plate CA[m1]. Here, as described above, the value m1 and the value m2 are natural numbers satisfying 1<m1<m2≤M.

As illustrated in FIG. 13, the nozzle plate CA[m] is provided with the nozzle row L1[m] and the nozzle row L2[m]. As described above, the distance between the nozzle row L1[m] and the nozzle row L2[m] in the X-axis direction is set to the nozzle row distance DL. Further, as described above, the distance between the nozzle row L1[m1] and the nozzle row L1[m2] in the X-axis direction is referred to as the nozzle row distance D1[m1][m2], and the distance between the nozzle row L2[m1] and the nozzle row L2[m2] in the X-axis direction is referred to as the nozzle row distance D2[m1][m2]. Further, as described above, the j-th nozzle N from the −Y direction side among the J nozzles N provided in the nozzle row L1[m] is referred to as a nozzle N1[m]{j}, and the j-th nozzle N from the −Y direction side among the J nozzles N provided in the nozzle row L2[m] is referred to as a nozzle N2[m]{j}.

As illustrated in FIG. 13, in the present embodiment, in the nozzle plate CA[m], the nozzles N1[m]{1} to N1[m]{J} and the nozzles N2[m]{1} to N2[m]{J} are provided such that the nozzles N1[m]{j} and the nozzles N2[m]{j} are at the same position in the Y-axis direction. Further, in the present embodiment, both the distance between the nozzle N1[m]{j} and the nozzle N1[m]{j+1} in the Y-axis direction, and the distance between the nozzle N2[m]{j} and the nozzle N2[m]{j+1} in the Y-axis direction, are the basic resolution unit ΔY.

The fixing plate 26 is provided with M plate openings W[1] to W[M] corresponding to M nozzle plates CA[1] to CA[M] on a one-to-one basis. The nozzle plate CA[m] is fixed such that the nozzle row L1[m] and the nozzle row L2[m] are exposed from the plate opening W[m] provided in the fixing plate 26.

As described above, the distance between the center of the plate opening W[m1] and the center of the plate opening W[m2] in the X-axis direction is referred to as the plate opening distance U[m1][m2]. When the value m1 and the value m2 satisfy "m2=1+m1", it is assumed that the plate opening distance U[m1][m2] is a constant distance. Further, it is assumed that the distance between the center of the nozzle plate C[m] and the center of the plate opening W[m] in the X-axis direction is constant.

Figure 14:
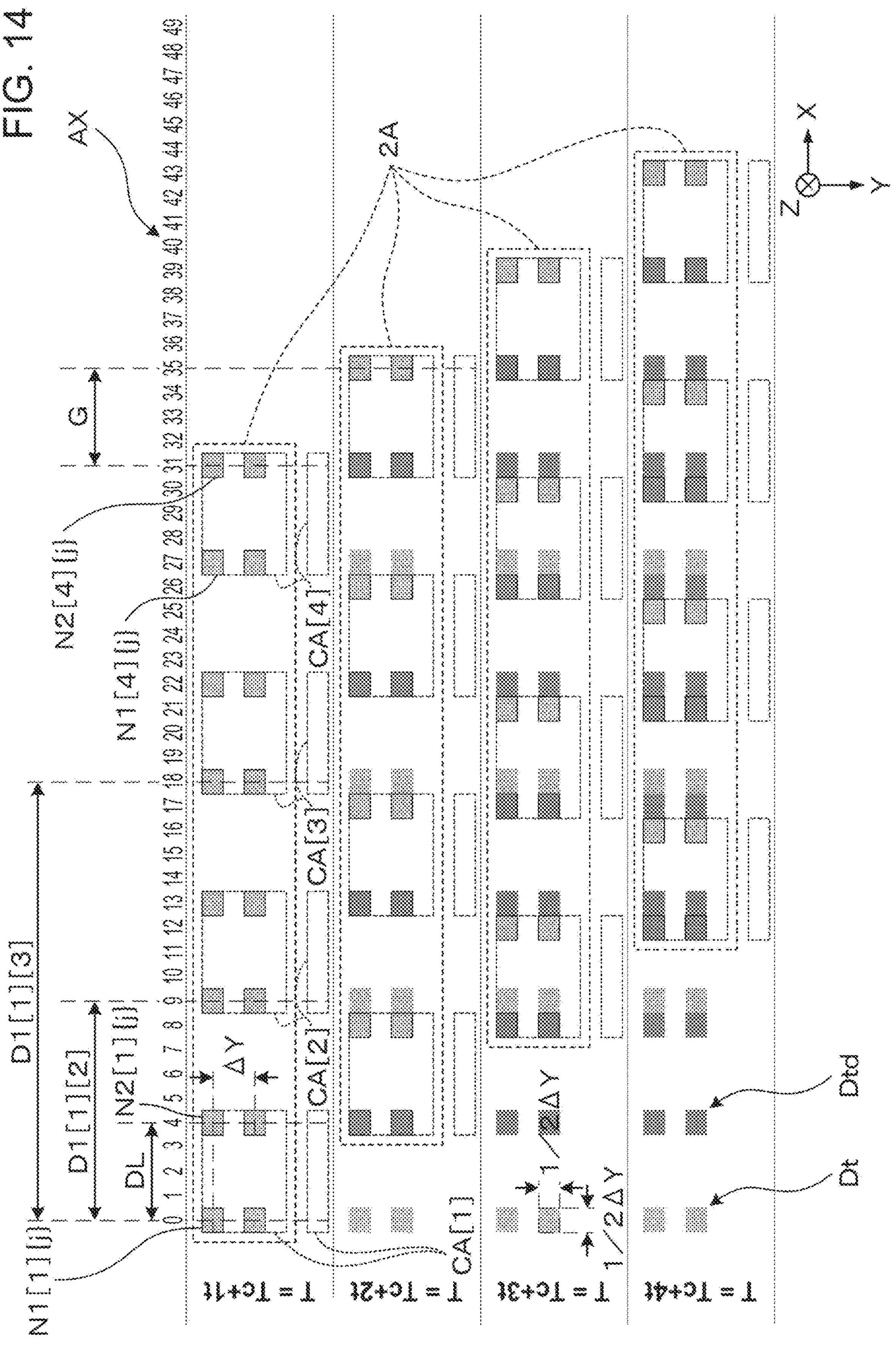
FIG. 14 is an explanatory view illustrating an operation of a head module according to the third embodiment and a positional relationship of formed dots.
Figure 15:
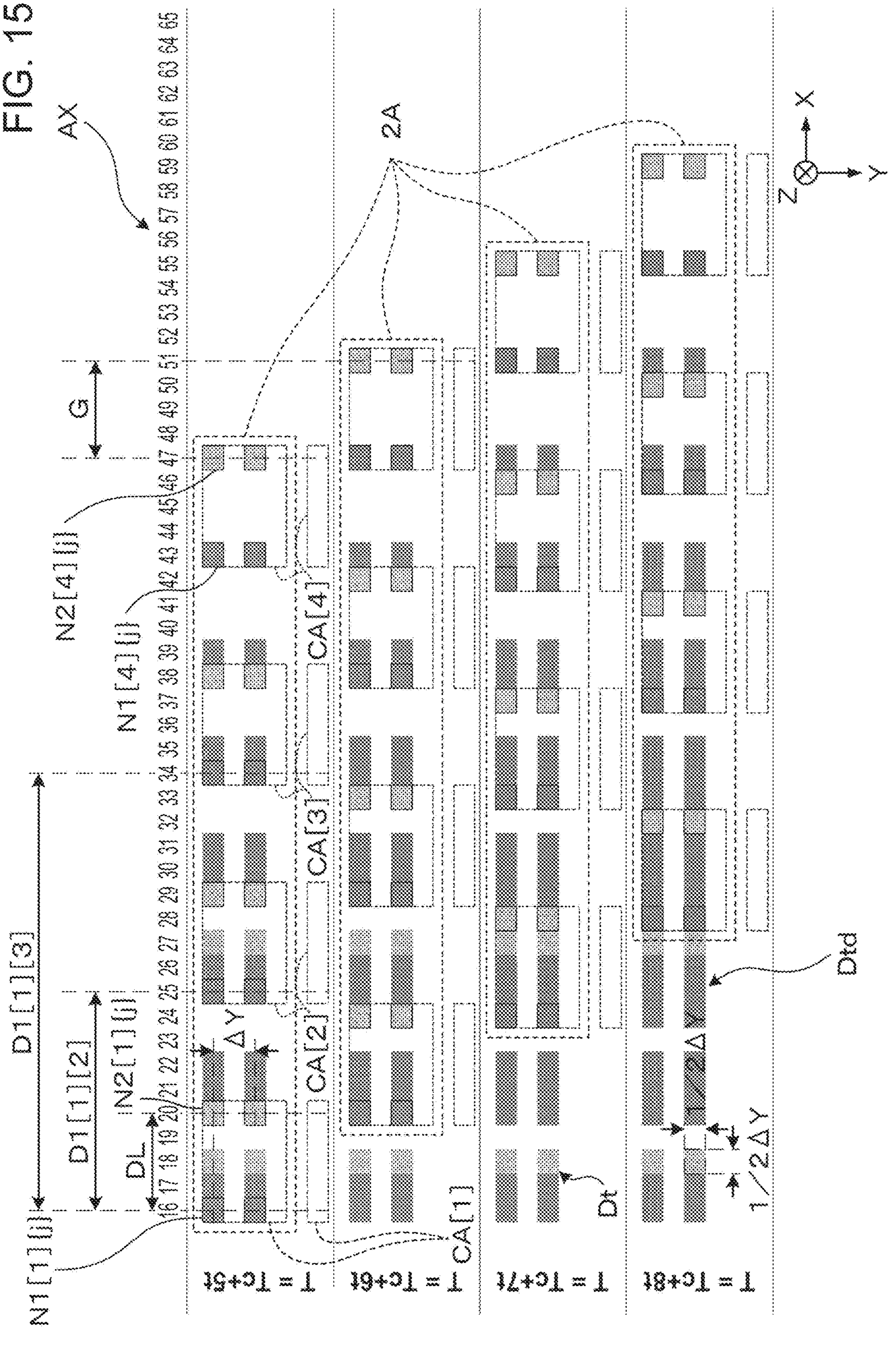
FIG. 15 is an explanatory view illustrating an operation of the head module according to the third embodiment and a positional relationship of formed dots.
Figure 16:
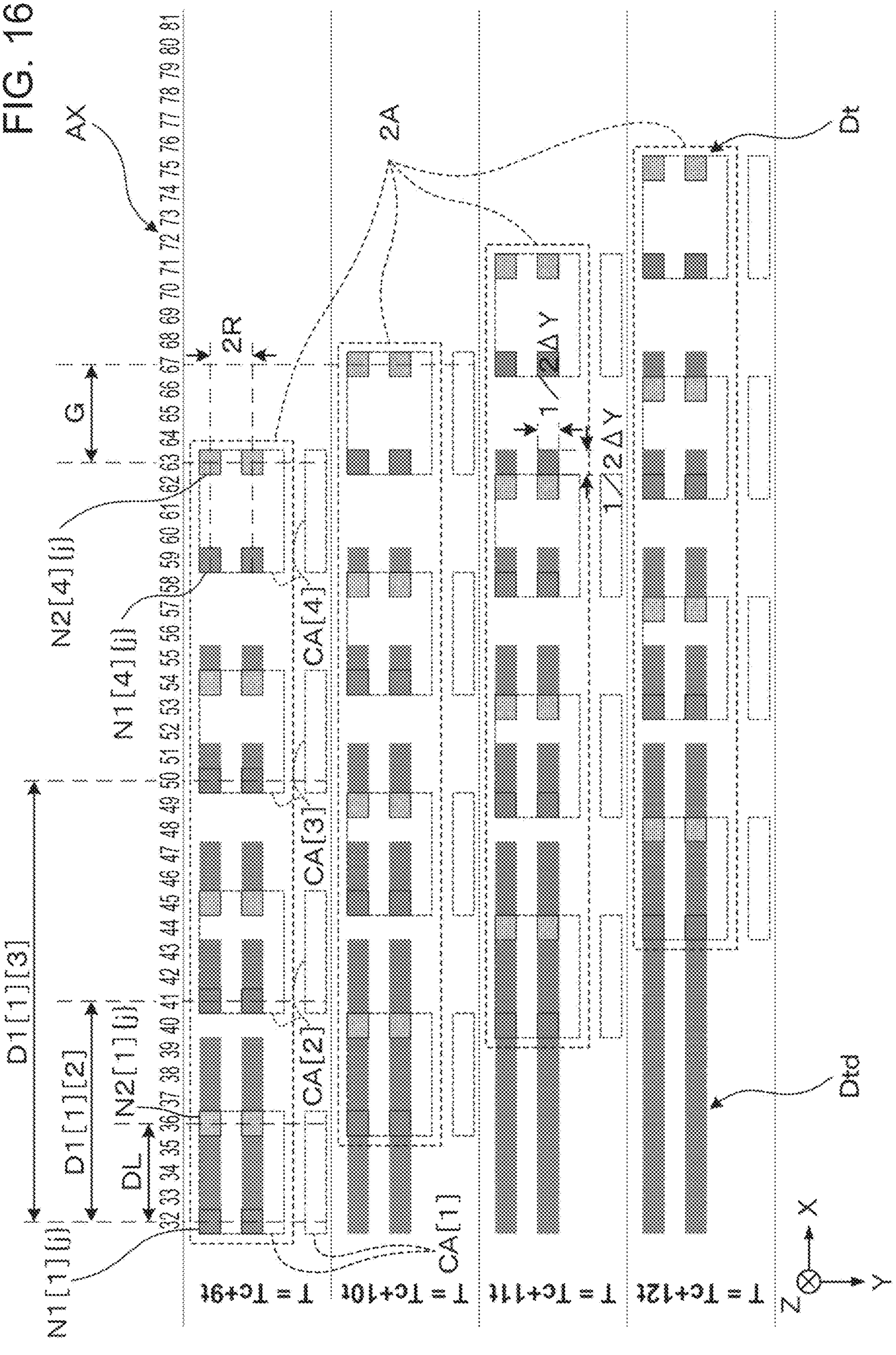
FIG. 16 is an explanatory view illustrating an operation of the head module according to the third embodiment and a positional relationship of formed dots.

FIGS. 14 to 16 are explanatory views illustrating the operation of the head module 2A when the printing operation is performed using the head module 2A illustrated in FIG. 13, and the positional relationship between the dots Dt formed by the head module 2A.

In FIGS. 14 to 16, the printing operation is described focusing on M nozzles N1[1]{j} to N[1[M]]{j}, M nozzles N2[1]{j} to N2[M]{j}, M nozzles N1[1]{j+1} to N1[M]{j+1}, and M nozzles N2[1]{j+1} to N2[M]{j+1} among the total of 2×M×J nozzles N provided in the head module 2A illustrated in FIG. 13. As described above, in the present embodiment, it is assumed that M=4. Therefore, in FIGS. 14 to 16, the four nozzles N1[1]{j} to N1[4]{j}, the four nozzles N2[1]{j} to N2[4]{j}, the four nozzles N1[1]{j+1} to N1[4]{j+1}, and four nozzles N2[1]{j+1} to N2[4]{j+1} are illustrated.

In FIGS. 14 to 16, the head module 2A discharges ink while moving in the +X direction with the passage of time to form the dots Dt. Of these, FIG. 14 illustrates the positional relationship between the head module 2A and the dots Dt when the time T is Tc+1t to Tc+4t. In addition, FIG. 15 illustrates the positional relationship between the head module 2A and the dots Dt when the time T is Tc+5t to Tc+8t. In addition, FIG. 16 illustrates the positional relationship between the head module 2A and the dots Dt when the time T is Tc+9t to Tc+12t.

In FIGS. 14 to 16, among the plurality of dots Dt formed by the plurality of nozzles N provided in the head module 2A, the dots Dt formed by the ink discharged from the nozzle N2 is referred to as a dot Dtd.

In the present embodiment, each of the plurality of nozzles N provided in the head module 2A discharges the initial ink at the time T=Tc+1t to form the dot Dt on the recording paper sheet PE, and thereafter, new dots Dt are formed every time the time t elapses.

Further, the head module 2A is scanned at a speed for advancing by the distance G every time the time t elapses after the time T=Tc+1t. In the present embodiment, the distance G is set to M times the basic resolution unit ΔX. Specifically, in the present embodiment, as described above, M=4. Therefore, in the present embodiment, the scanning speed of the head module 2A is set such that the distance G is G=4ΔX. Further, in the present embodiment, it is assumed that the basic resolution unit ΔX is ½ times the basic resolution unit ΔY.

In the present embodiment, the nozzle row distance DL is set to a natural number multiple of the distance G. Specifically, the nozzle row distance DL is set to α times the distance G. In other words, the nozzle row distance DL is set to (M×α) times the basic resolution unit ΔX. In other words, DL=(M×α)ΔX. In other words, in the present embodiment, DL=4×α×ΔX. Here, the value α is a natural number of 1 or more.

Further, in the present embodiment, the nozzle row distance D1[1][ma] is set to be a distance different from the natural number multiple of the distance G. Specifically, the nozzle row distance D1[1][ma] is set to a distance obtained by adding β[ma] times the distance G and γ[ma] times the basic resolution unit ΔX. In other words, the nozzle row distance D1[1][ma] is set to (M×β[ma]+γ[ma]) times the basic resolution unit ΔX. In other words, D1[1][ma]=(M×β[ma]+γ[ma])ΔX. In addition, as described above, the value ma is a natural number satisfying 2≤ma≤M. Further, the value β[ma] is a natural number satisfying α<β[ma]. Further, the value γ[ma] is a natural number satisfying 1≤γ[ma]≤M−1 and satisfying γ[ma1]≠γ[ma2]. In addition, the value ma1 and the value ma2 are natural numbers satisfying 2≤ma1<ma2≤M.

As described above, in the present embodiment, in the X-axis direction, the nozzle row distance DL and the nozzle row distance D1[1][ma] are set to satisfy DL: D1[1][ma]=Mα:Mβ[ma]×γ[ma].

In FIGS. 14 to 16, the position of the nozzle N1[1]{j} in the X-axis direction at time T=Tc+1t is AX=0. Accordingly, the nozzle N1[1]{j} can form the dot Dt for AX=4k−4 at the time T=Tc+kt. In other words, the nozzle N1[1]{j} can form the dot Dt for AX=4×k1. Here, the variable k is a natural number of 1 or more. In addition, in the present embodiment, the variable k1 is an integer satisfying k1=k−1.

Further, in FIGS. 14 to 16, it is assumed that α=1. Accordingly, the nozzle N2[1]{j} can form the dot Dtd for AX=4k at the time T=Tc+kt. In other words, the nozzle N2[1]{j} can form the dot Dtd for AX=4×(k1+1).

In addition, in FIGS. 14 to 16, the position of the nozzle N1[2]{j} in the X-axis direction at time T=Tc+1t is AX=9. In other words, in FIGS. 14 to 16, D1[1][2]=(4×β[2]+γ[2])=9. In other words, in FIGS. 14 to 16, when ma=2, β[2]=2 and γ[2]=1. In addition, the nozzle N1[2]{j} can form the dot Dt for AX=4k+5 at the time T=Tc+kt. In other words, the nozzle N1[2]{j} can form the dot Dt for AX=4×k2+1. Here, in the present embodiment, the variable k2 is an integer satisfying k2=k+1.

Further, in FIGS. 14 to 16, the nozzle N2[2]{j} can form the dots Dtd for AX=4k+9 at time T=Tc+kt. In other words, the nozzle N2[2]{j} can form the dot Dtd for AX=4×(k2+1)+1.

In addition, in FIGS. 14 to 16, the position of the nozzle N1[3]{j} in the X-axis direction at time T=Tc+1t is AX=18. In other words, in FIGS. 14 to 16, D1[1][3]=(4×β[3]+γ[3])=18. In other words, in FIGS. 14 to 16, when ma=3, β[3]=4 and γ[3]=2. In addition, the nozzle N1[3]{j} can form the dot Dt for AX=4k+14 at the time T=Tc+kt. In other words, the nozzle N1[3]{j} can form the dot Dt for AX=4×k3+2. Here, in the present embodiment, the variable k3 is an integer satisfying k3=k+3.

Further, in FIGS. 14 to 16, the nozzle N2[3]{j} can form the dot Dtd for AX=4k+18 at time T=Tc+kt. In other words, the nozzle N2[3]{j} can form the dot Dtd for AX=4×(k3+1)+2.

In addition, in FIGS. 14 to 16, the position of the nozzle N1[4]{j} in the X-axis direction at time T=Tc+1t is AX=27. In other words, in FIGS. 14 to 16, D1[1][4]=(4×β[4]+γ[4])=27. In other words, in FIGS. 14 to 16, when ma=4, β[4]=6 and γ[4]=3. In addition, the nozzle N1[4]{j} can form the dot Dt for AX=4k+23 at the time T=Tc+kt. In other words, the nozzle N1[4]{j} can form the dot Dt for AX=4×k4+3. Here, in the present embodiment, the variable k4 is an integer satisfying k4=k+5.

Further, in FIGS. 14 to 16, the nozzle N2[4]{j} can form the dot Dtd for AX=4k+27 at time T=Tc+kt. In other words, the nozzle N2[4]{j} can form the dot Dtd for AX=4×(k4+1)+3.

As described above, according to the present embodiment, the nozzle N1[1]{j} can form the dot Dt for AX=M×k1, and the nozzle N1[ma]{j} can form the dot Dt for AX=M×ka+γ[ma]. In addition, as described above, the variable ka is an integer satisfying ka=k+β[ma]−1. Therefore, according to the present embodiment, a plurality of dots Dt can be formed with the distances of the basic resolution unit ΔX in the X-axis direction by the M nozzles N1[1]{j} to N1[M]{j} without overlapping. Specifically, in FIGS. 14 to 16, the plurality of dots Dt can be formed with the distance of the basic resolution unit ΔX in the X-axis direction without overlapping by the four nozzles N1[1]{j} to N1[4]{j}.

Furthermore, according to the present embodiment, the nozzle N2[1]{j} can form the dot Dtd for AX=M×(k1+1), and the nozzle N2[ma]{j} can form the dot Dtd for AX=M×(ka+1)+γ[ma]. Therefore, according to the present embodiment, a plurality of dots Dtd can be formed with the distances of the basic resolution unit ΔX in the X-axis direction by the M nozzles N2[1]{j} to N2[M]{j} without overlapping. Specifically, in FIGS. 14 to 16, the plurality of dots Dtd can be formed with the distances of the basic resolution unit ΔX in the X-axis direction without overlapping by the four nozzles N2[1]{j} to N2[4]{j}.

Further, according to the present embodiment, the nozzle N2[m]{j} can form the dot Dtd at the same position where the nozzle N1[m]{j} forms the dot Dt. Therefore, when a discharge abnormality that ink cannot be discharged from the nozzle N1[m]{j} occurs and the ink discharged from the nozzle N1[m]{j} cannot form the dot Dt on the recording paper sheet PE, the dot Dtd formed by the ink discharged from the nozzle N2 [m]{j} can replace the dot Dt that is scheduled to be formed by ink discharged from the nozzle N1[m]{j}. Therefore, according to the present embodiment, even when a discharge abnormality occurs in some of the nozzles N among the plurality of nozzles N provided in the head module 2A, it is possible to suppress the degree of deterioration of the image quality of the image formed by the head module 2A.

In the present embodiment, the control section 8 inspects whether or not a discharge abnormality occurred in each of the plurality of nozzles N provided in the head module 2A. Specifically, in the present embodiment, the control section 8 first drives the piezoelectric element 331 or the piezoelectric element 332 corresponding to the nozzle N by the driving signal Com to generate vibration in the piezoelectric element 331 or the piezoelectric element 332. Next, the control section 8 inspects whether or not a discharge abnormality occurred in the nozzle N based on the waveform of the vibration generated in the piezoelectric element 331 or the piezoelectric element 332. Then, when the control section 8 obtains an inspection result that a discharge abnormality occurred in the nozzle N1[m]{J}, by changing the print signal SI, the control section 8 discharges ink from the nozzle N2[m]{j} instead of discharging ink from the nozzle N1[m]{j}. Then, when the control section 8 obtains an inspection result that a discharge abnormality occurred in the nozzle N2[m]{j}, by changing the print signal SI, the control section 8 discharges ink from the nozzle N1[m]{j} instead of discharging ink from the nozzle N2[m]{j}.

4. Fourth Embodiment

Hereinafter, the fourth embodiment of the present disclosure will be described.

The ink jet printer according to the fourth embodiment is different from the ink jet printer 1 according to the first embodiment in that the positions of the nozzle plates C[1] and C[3] in the Y-axis direction and the positions of the nozzle plates C[2] and C[4] in the Y-axis direction are different.

Specifically, the ink jet printer according to the fourth embodiment is different from the ink jet printer 1 according to the first embodiment in that a head module 2B is provided instead of the head module 2. The head module 2B includes M head chips 3. As described above, the head chip 3 includes the nozzle plate C.

Figure 17:
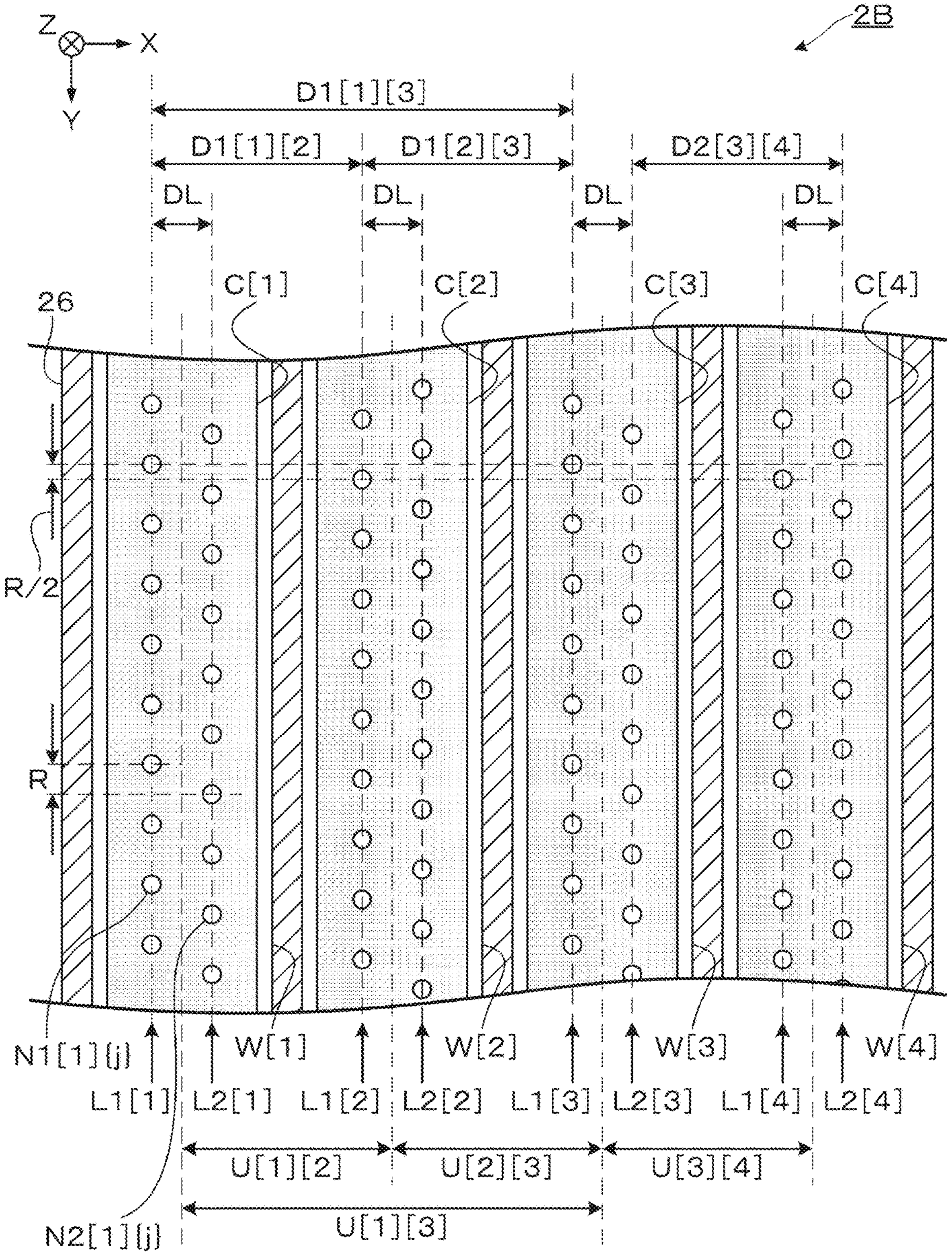
FIG. 17 is an explanatory view illustrating a positional relationship between a nozzle plate according to a fourth embodiment and the fixing plate.

FIG. 17 is an explanatory view illustrating the positional relationship between M nozzle plate C included in the head module 2B and the fixing plate 26. In addition, FIG. 17 illustrates various positional relationships when the head module 2B is viewed through from the −Z direction to the +Z direction. Hereinafter, a case where M=4 will be illustrated and described.

As illustrated in FIG. 17, in the present embodiment, M nozzle plates C[1] to C[M] are fixed to the fixing plate 26. In the present embodiment, it is assumed that the M nozzle plates C[1] to C[M] all have a common structure. Further, the nozzle plate C[m2] is positioned in the +X direction of the nozzle plate C[m1]. Here, as described above, the value m1 and the value m2 are natural numbers satisfying 1<m1<m2≤M.

As described above, the nozzle plate C[m] is provided with the nozzle row L1[m] and the nozzle row L2[m]. Further, as described above, the j-th nozzle N from the −Y direction side among the J nozzles N provided in the nozzle row L1[m] is referred to as a nozzle N1[m]{j}, and the j-th nozzle N from the −Y direction side among the J nozzles N provided in the nozzle row L2[m] is referred to as a nozzle N2[m]{j}.

As illustrated in FIG. 17, the nozzle N1[m]{j} is provided on the −Y direction side with respect to the nozzle N2[m]{j}. In the present embodiment, the distance between the nozzle N1[m]{j} and the nozzle N2[m]{j} in the Y-axis direction is the distance R, and the distance between the nozzle N2[m]{j} and the nozzle N1[m]{j+1} in the Y-axis direction is the distance R.

Further, in the present embodiment, the nozzle N1[mz1]{j} is positioned in the −Y direction with respect to the nozzle N1[mz2]{j}, and the nozzle N2[mz1]{j} is positioned in the −Y direction with respect to the nozzle N2[mz2]{j}. Here, the value mz1 is an odd number satisfying 1≤mz1≤M, and the value mz2 is an even number satisfying 2≤mz2≤M. However, the present disclosure is not limited to such an aspect. For example, the nozzle N1[mz1]{j} is positioned in the +Y direction with respect to the nozzle N1[mz2]{j}, and the nozzle N2[mz1]{j} is positioned in the +Y direction with respect to the nozzle N2[mz2]{j}.

In addition, in the present embodiment, the distance between the nozzle N1[mz1]{j} and the nozzle N1[mz2]{j} in the Y-axis direction is a half of the distance R, and the distance between the nozzle N2[mz1]{j} and the nozzle N2[mz2]{j} in the Y-axis direction is a half of the distance R. In other words, in the present embodiment, the nozzle plates C[1] to C[M] are arranged such that the nozzle plate C[mz1] is at a position displaced from the nozzle plate C[mz2] by half of the distance R in the −Y direction. In the following, the distance of a half of the distance R will be referred to as a distance Rh.

In the present embodiment, the nozzle plate CA[m] is fixed such that the nozzle row L1[m] and the nozzle row L2[m] are exposed from the plate opening W[m] provided in the fixing plate 26.

Further, in the present embodiment, the distance between the nozzle row L1[m1] and the nozzle row L1[m2] in the X-axis direction is referred to as the nozzle row distance D1[m1][m2], and the distance between the nozzle row L2[m1] and the nozzle row L2[m2] in the X-axis direction is referred to as the nozzle row distance D2[m1][m2]. In addition, in the present embodiment, the distance between the center of the plate opening W[m1] and the center of the plate opening W[m2] in the X-axis direction is referred to as the plate opening distance U[m1][m2].

Figure 18:
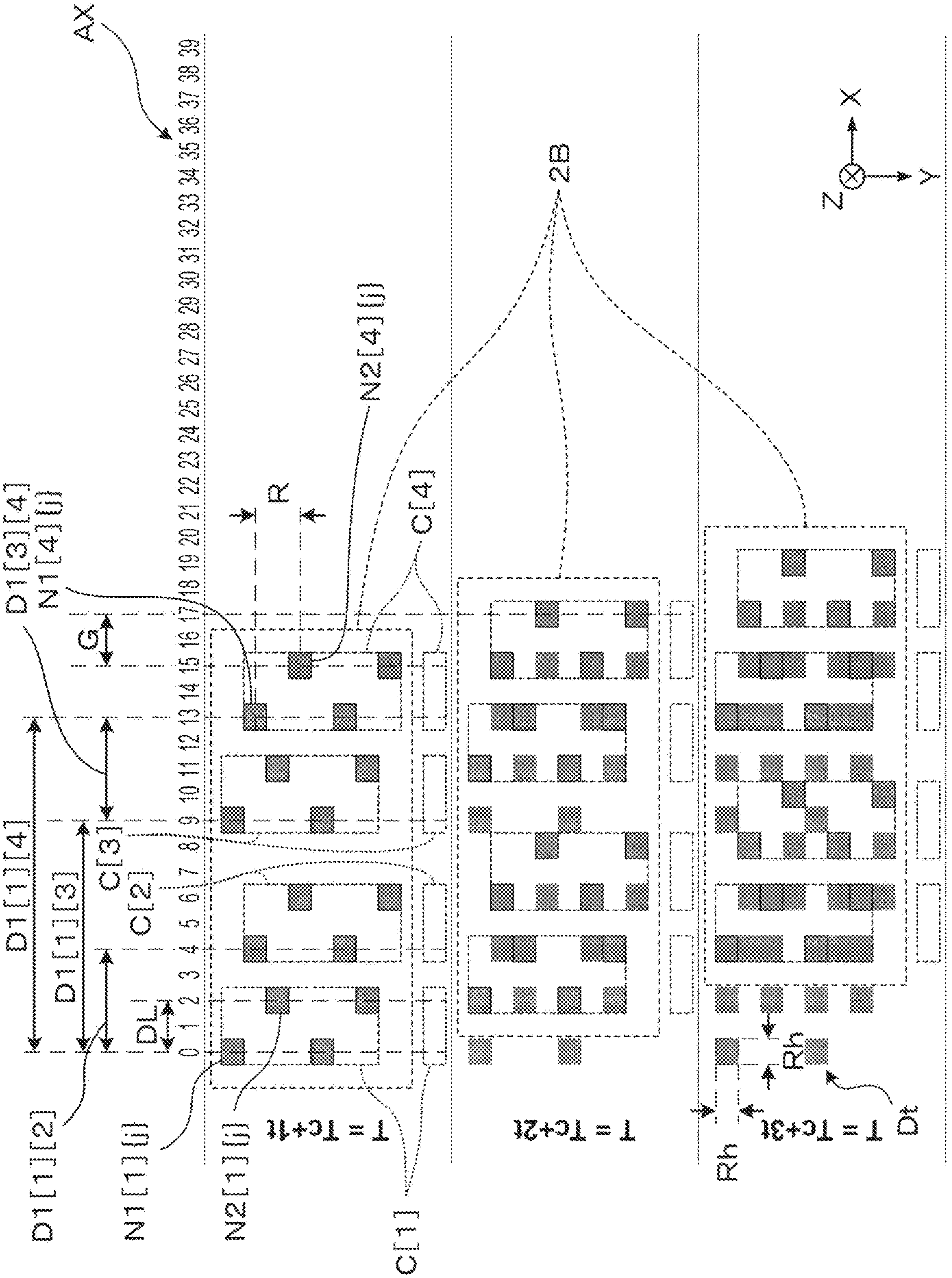
FIG. 18 is an explanatory view illustrating an operation of a head module according to the fourth embodiment and a positional relationship of formed dots.
Figure 19:
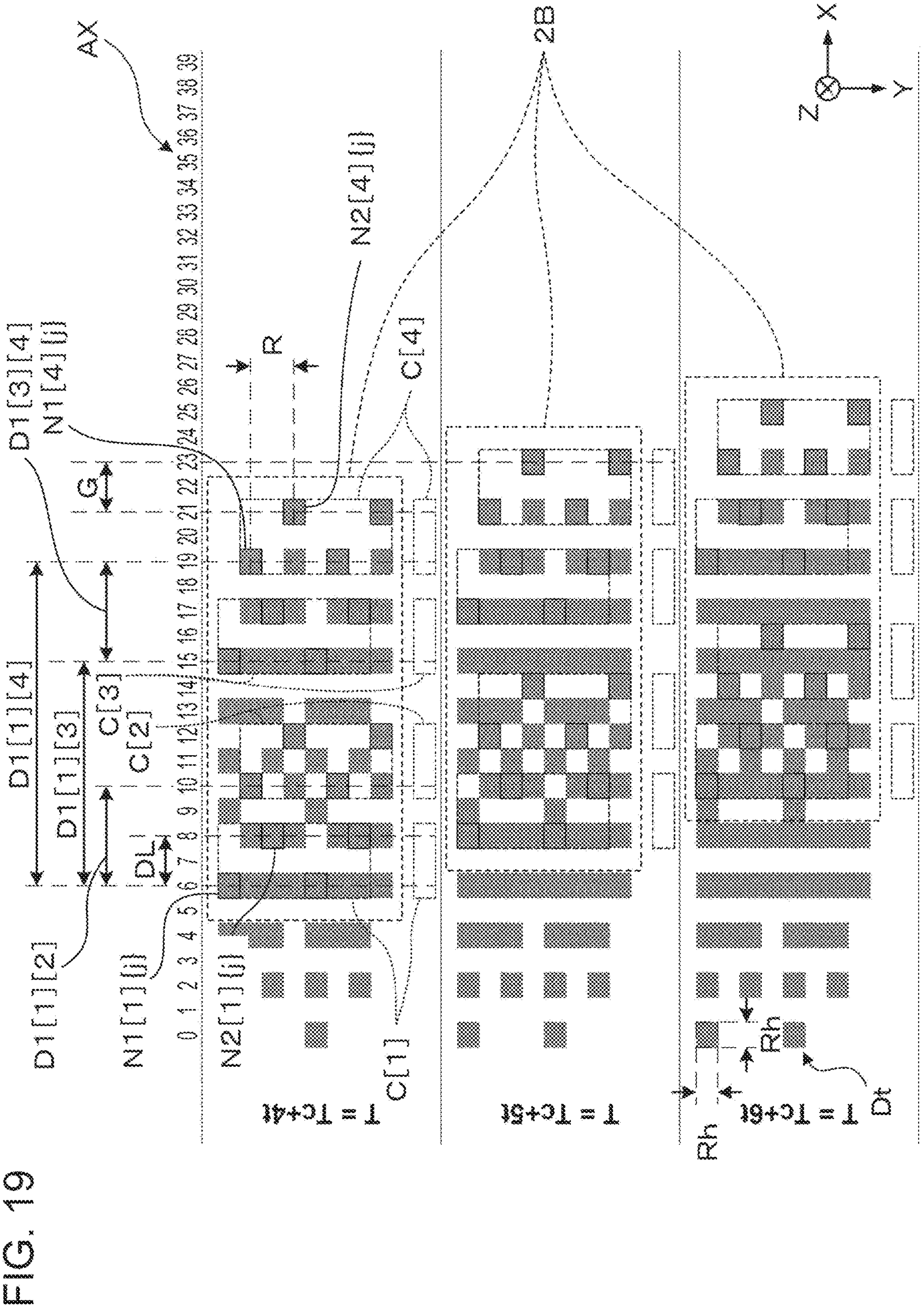
FIG. 19 is an explanatory view illustrating an operation of the head module according to the fourth embodiment and a positional relationship of formed dots.
Figure 20:
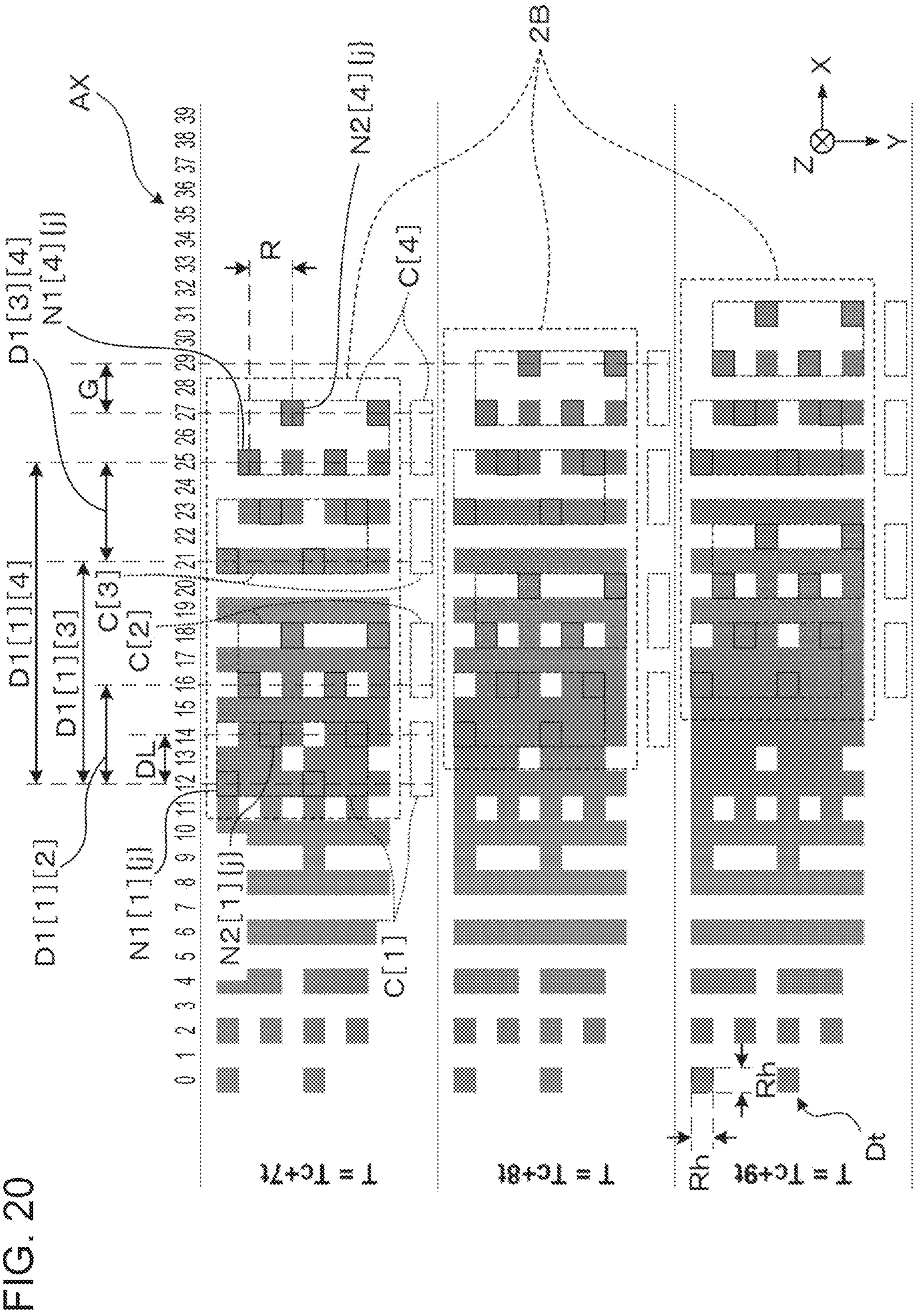
FIG. 20 is an explanatory view illustrating an operation of the head module according to the fourth embodiment and a positional relationship of formed dots.

FIGS. 18 to 20 are explanatory views illustrating the operation of the head module 2B when the printing operation is performed using the head module 2B illustrated in FIG. 17, and the positional relationship between the dots Dt formed by the head module 2B. In FIGS. 18 to 20, the printing operation is described focusing on M nozzles N1[1]{j} to N1[M]{j}, M nozzles N2[1]{j} to N2[M]{j}, M nozzles N1[1]{j+1} to N1[M]{j+1}, and M nozzles N2[1]{j+1} to N2[M]{j+1} among the total of 2×M×J nozzles N provided in the head module 2B illustrated in FIG. 17. As described above, in the present embodiment, it is assumed that M=4. Therefore, in FIGS. 18 to 20, the four nozzles N1[1]{j} to N1[4]{j}, the four nozzles N2[1]{j} to N2[4]{j}, the four nozzles N1[1]{j+1} to N1[4]{j+1}, and four nozzles N2[1]{j+1} to N2[4]{j+1} are illustrated.

Further, FIGS. 18 to 20 illustrate the process of forming the dots Dt when the head module 2B discharges ink while moving in the +X direction with the passage of time. Of these, FIG. 18 illustrates the positional relationship between the head module 2B and the dots Dt when the time T is Tc+1t to Tc+3t. In addition, FIG. 19 illustrates the positional relationship between the head module 2B and the dots Dt when the time T is Tc+4t to Tc+6t. In addition, FIG. 20 illustrates the positional relationship between the head module 2B and the dots Dt when the time T is Tc+7t to Tc+9t. For clarification, in FIGS. 18 to 20, the positions of the nozzle plate C[m] in the X-axis direction at each time are illustrated below the broken line rectangle indicating the head module 2B by using a broken line rectangle having a height of the distance Rh. Further, for convenience of illustration, in FIGS. 18 to 20, the dots Dt are represented as a square in which the distance in the X-axis direction and in the Y-axis direction is the distance Rh.

In the present embodiment, each of the plurality of nozzles N provided in the head module 2B discharges the initial ink at the time T=Tc+1t to form the dot Dt on the recording paper sheet PE, and thereafter, new dots Dt are formed every time the time t elapses.

Further, the head module 2B is scanned at a speed for advancing by the distance G every time the time t elapses after the time T=Tc+1t. In the present embodiment, the distance G is determined as a value obtained by multiplying the number Mh of the head chips 3 having the same position in the Y-axis direction and a reciprocal Mg of a value obtained by dividing the value M by the value Mh, with respect to the distance R. In the examples of FIGS. 18 to 20, Mh=2. Moreover, the value Mg is one half. Accordingly, in the examples of FIGS. 18 to 20, the distance G is equal to the distance R. In other words, in the examples of FIGS. 18 to 20, the distance G is twice the distance Rh. In other words, in the present embodiment, the scanning speed of the head module 2B is set such that the distance G is G=R=2Rh.

In FIGS. 18 to 20, for convenience of description, as an X-axis coordinate AX, the position of the nozzle N1[1]{j} at time T=Tc+1t is set to "0", and every time the nozzle N1[1]{j} moves in the +X direction by the distance Rh, a value that increases by "1" is given. For example, in FIGS. 18 to 20, the position of the nozzle N2[4]{j} provided in the head module 2B moves from AX=15 to AX=17 while the time T elapses from Tc+1t to Tc+2t.

In the present embodiment, the nozzle row distance DL is set to a natural number multiple of the distance G. Specifically, the nozzle row distance DL is set to α times the distance G. In other words, the nozzle row distance DL is DL=αG=αR=2αRh. Here, the value α is a natural number of 1 or more. In FIGS. 18 to 20, it is assumed that the value α is 1. Accordingly, in FIGS. 18 to 20, the nozzle row distance DL is DL=2Rh.

Further, in FIGS. 18 to 20, the nozzle row distance D1[mz1][mz1+1] is set to a natural number multiple of the distance G. For example, in FIGS. 18 to 20, the nozzle row distance D1[1][2] and D1[3][4] are set to twice the distance G, that is, 4Rh.

Further, in FIGS. 18 to 20, the nozzle row distance D1[1][3] is set to a distance different from the natural number multiple of the distance G. For example, in FIGS. 18 to 20, the nozzle row distance D1[1][3] is set to 9Rh.

In FIGS. 18 to 20, the position of the nozzle N1[1]{j} in the X-axis direction at time T=Tc+1t is AX=0. Accordingly, the nozzle N1[1]{j} can form the dots Dt for AX=0, 2, 4, 6, . . . , 2×k1. Here, the variable k1 is an integer of 0 or more.

In FIGS. 18 to 20, the position of the nozzle N2[1]{j} in the X-axis direction at time T=Tc+1t is AX=2. Accordingly, the nozzle N2[1]{j} can form the dots Dt for AX=2, 4, 6, 8, . . . , 2×k2, . . . . Here, the variable k2 is an integer of 1 or more.

In FIGS. 18 to 20, the position of the nozzle N1[2]{j} in the X-axis direction at time T=Tc+1t is AX=4. Accordingly, the nozzle N1[2]{j} can form the dots Dt for AX=4, 6, 8, 10, . . . , 2×k3. Here, the variable k3 is an integer of 2 or more.

In FIGS. 18 to 20, the position of the nozzle N2[2]{j} in the X-axis direction at time T=Tc+1t is AX=6. Accordingly, the nozzle N2[2]{j} can form the dots Dt for AX=6, 8, 10, 12, . . . , 2×k4. Here, the variable k4 is an integer of 3 or more.

In FIGS. 18 to 20, the position of the nozzle N1[3]{j} in the X-axis direction at time T=Tc+1t is AX=9. Accordingly, the nozzle N1[3]{j} can form the dots Dt for AX=9, 11, 13, 15, . . . , 2×k5+1. Here, the variable k5 is an integer of 4 or more.

In FIGS. 18 to 20, the position of the nozzle N2[3]{j} in the X-axis direction at time T=Tc+1t is AX=11. Accordingly, the nozzle N2[3]{j} can form the dots Dt for AX=11, 13, 15, 17, . . . , 2×k6+1. Here, the variable k6 is an integer of 5 or more.

In FIGS. 18 to 20, the position of the nozzle N1[4]{j} in the X-axis direction at time T=Tc+1t is AX=13. Accordingly, the nozzle N1[4]{j} can form the dots Dt for AX=13, 15, 17, 19, . . . , 2×k7+1. Here, the variable k7 is an integer of 6 or more.

In FIGS. 18 to 20, the position of the nozzle N2[4]{j} in the X-axis direction at time T=Tc+1t is AX=15. Accordingly, the nozzle N2[4]{j} can form the dots Dt for AX=15, 17, 19, 21, . . . , 2×k8+1. Here, the variable k8 is an integer of 7 or more.

As described above, in FIGS. 18 to 20, the nozzle N1[1]{j}, the nozzle N2[1]{j}, the nozzle N1[2]{j}, and the nozzle N2[2]{j} form the dots Dt at positions where the X-axis coordinate AX is an even multiple of the distance Rh, and nozzle N1[3]{j}, the nozzle N2[3]{j}, the nozzle N1[4]{j}, and the nozzle N2[4]{j} form the dots Dt at a position where the X-axis coordinate AX is an odd multiple of the distance Rh. Therefore, according to the present embodiment, the plurality of nozzles N provided in the head module 2B can form the plurality of dots Dt so as to have the distance Rh in the X-axis direction and the distance Rh in the Y-axis direction.

5. Modification Example

Each of the embodiments can be modified in various manners. Specific modifications will be described below. In addition, two or more aspects selected in any manner from the following examples can be appropriately combined with each other within a range not inconsistent with each other. In addition, in the modification examples illustrated below, elements having the same effects and functions as those of the above-described embodiments will be given the reference numerals used in the description above, and the detailed description thereof will be appropriately omitted.

5.1. Modification Example 1

In the above-described first embodiment, a case where the nozzle N1[m]{j} and the nozzle N2[m]{j} discharge ink of the same color was illustrated and described, but the present disclosure is not limited to such aspects.

For example, the nozzle N1[m]{j} and the nozzle N2[m]{j} may discharge inks of different colors.

The ink jet printer according to the present modification example includes the head module including the plurality of head chips, as in the head module 2 illustrated in FIG. 5. In addition, as illustrated in FIG. 5, the head chip included in the ink jet printer according to the present modification example includes the nozzle plate C[m] provided with the nozzle row L1[m] and the nozzle row L2[m]. In the ink jet printer according to the present modification example, the ink discharged from the nozzle N1[m]{j} belonging to the nozzle row L1[m] and the ink discharged from the nozzle N2[m]{J} belonging to the nozzle row L2[m] have different colors. Specifically, in the present modification example, yellow ink is discharged from the nozzle N1[m]{j} belonging to the nozzle row L1[m], and cyan ink is discharged from the nozzle N2[m]{j} belonging to the nozzle row L2[*m*].

Further, in the present modification example, the scanning speed of the head module is set such that the distance G is G=M×ΔX, as in the above-described first embodiment. Accordingly, in the ink jet printer according to the present modification example, the plurality of dots Dty can be formed with the basic resolution unit ΔX in the X-axis direction without overlapping with the M nozzles N1[1]{j} to N1[M]{j}. Similarly, the plurality of dots Dtc can be formed with the basic resolution unit ΔX in the X-axis direction without overlapping by the M nozzles N2[1]{j} to N2[M]{j}. Further, in the ink jet printer according to the present modification example, the plurality of dots Dty can be formed with the basic resolution unit ΔY in the Y-axis direction, and the plurality of dots Dtc can be formed with the basic resolution unit ΔY in the Y-axis direction. Here, the basic resolution unit ΔY of the present modification example corresponds to twice the basic resolution unit ΔX.

In the present modification example, the scanning speed of the head module may be a value obtained by multiplying the number of nozzle rows provided in the nozzle plate C[m]. In other words, the scanning speed of the head module may be 2×G. In other words, the distance G may be a value obtained by multiplying the number of nozzle rows provided in the nozzle plate C[m] by the value M and the distance R. Specifically, the scanning speed of the head module may be set such that the distance G is G=2M×R. In this case, the nozzle row distance DL is set to be doubled as in the distance G. In other words, the nozzle row distance DL=2×α×M×R. Further, in this case, the nozzle row distance D1[1][ma] is doubled as in the distance G. In other words, the nozzle row distance D1[1][ma]=2×(M×β[ma]+γ[ma])×R. In this case, the basic resolution unit ΔX is twice the distance R, and the basic resolution unit ΔY is twice the distance R. In other words, the distance G is G=M×ΔX, the nozzle row distance DL is DL=α×M×ΔX, and the nozzle row distance D1[1][ma] is D1[1][ma]=(M×β[ma]+γ[ma])×ΔX. In this case, in the ink jet printer according to the present modification example, the plurality of dots Dty can be formed with the basic resolution unit ΔX, that is, with the distance twice the distance R, in the X-axis direction without overlapping with the M nozzles N1[1]{j} to N1[M]{j}. Similarly, the plurality of dots Dtc can be formed with the basic resolution unit ΔX in the X-axis direction without overlapping by the M nozzles N2[1]{j} to N2[M]{j}. Further, in this case, the ink jet printer according to the present modification example can form the plurality of dots Dty in the Y-axis direction with the distance of the basic resolution unit ΔY, that is, twice the distance R. Similarly, the ink jet printer according to the present modification example can form the plurality of dots Dtc in the Y-axis direction with the distance of the basic resolution unit ΔY.

5.2. Modification Example 2

In the above-described second embodiment, as illustrated in FIG. 9, a case where yellow ink is discharged from the nozzle NQ provided in the nozzle plate CQ and cyan ink is discharged from the nozzle NS provided in the nozzle plate CS is illustrated, but the present disclosure is not limited to such aspects.

For example, in the present modification example, in FIG. 9, the nozzle NQ1 belonging to the nozzle row LQ1 provided in the nozzle plate CQ and the nozzle NS2 belonging to the nozzle row LS2 provided in the nozzle plate CS may discharge inks of the same color, and the nozzle NQ2 belonging to the nozzle row LQ2 provided in the nozzle plate CQ and the nozzle NS1 belonging to the nozzle row LS1 provided in the nozzle plate CS may discharge inks of the same color. Specifically, in the present modification example, in FIG. 9, the nozzle NQ1 belonging to the nozzle row LQ1 provided in the nozzle plate CQ and the nozzle NS2 belonging to the nozzle row LS2 provided in the nozzle plate CS may discharge yellow ink, and the nozzle NQ2 belonging to the nozzle row LQ2 provided in the nozzle plate CQ and the nozzle NS1 belonging to the nozzle row LS1 provided in the nozzle plate CS may discharge cyan ink.

In the present modification example, it is assumed that the distance G is M times the distance R and the value M is M=2, as in the second embodiment. Therefore, the ink jet printer according to the present modification example can form the dots Dty and the dots Dtc with the distance R in the X-axis direction and the Y-axis direction. In other words, the ink jet printer according to the present modification example can form the dot Dtg with the distance R in the X-axis direction and the Y-axis direction.

5.3. Modification Example 3

In the above-described embodiments and modification examples, a case where the plate opening distance U[m1][m2] is equal to the nozzle row distance D1[m1][m2] and the nozzle row distance D2[m1][m2] was illustrated, but the present disclosure is not limited to such aspects. For example, the plate opening distance U[m1][m2] may be a distance different from the nozzle row distance D1[m1][m2] and the nozzle row distance D2[m1][m2].

Figure 21:
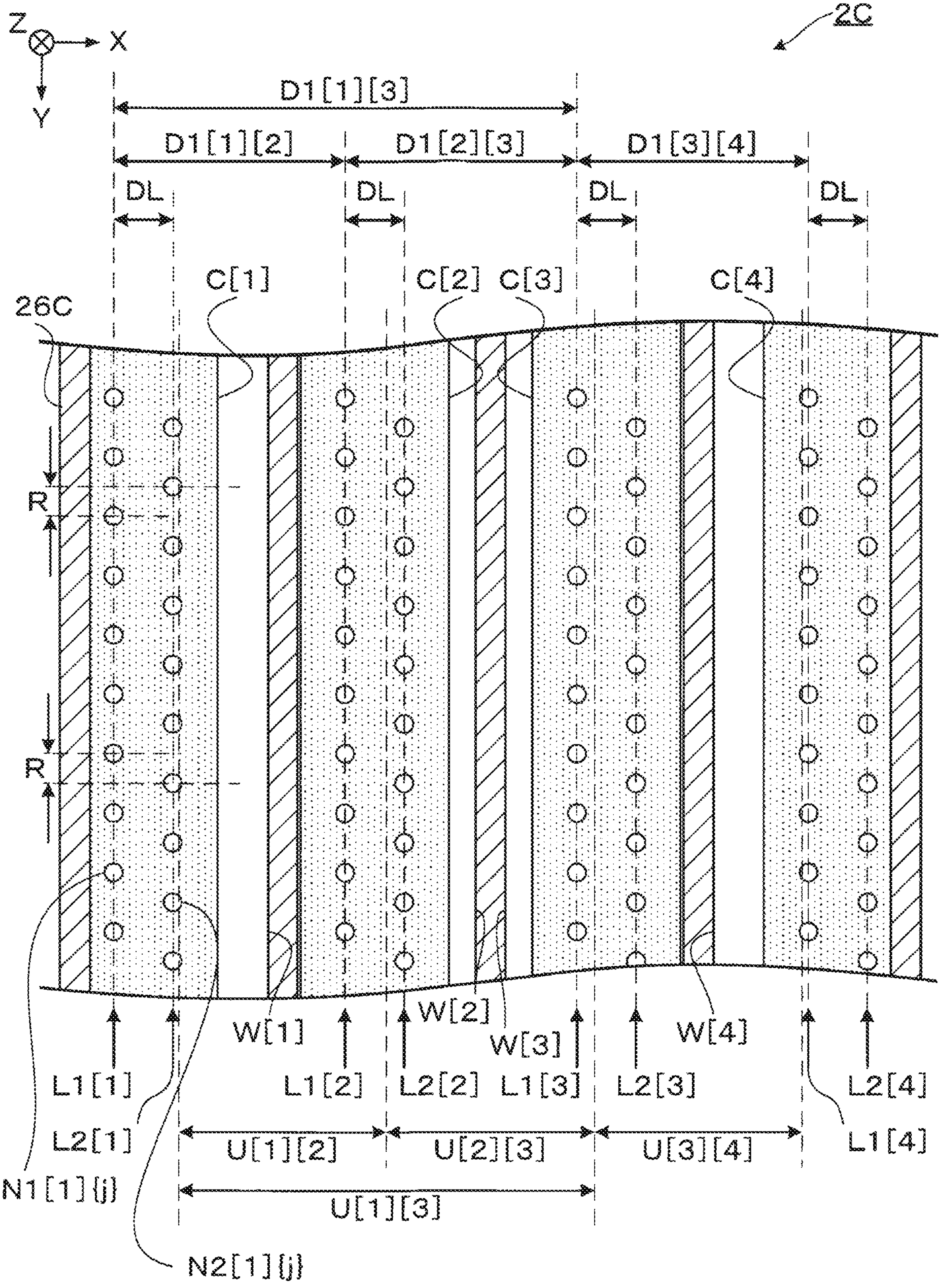
FIG. 21 is an explanatory view illustrating a positional relationship between a nozzle plate according to Modification example 3 and the fixing plate.

FIG. 21 is an explanatory view illustrating a positional relationship between M nozzle plate C included in a head module 2C according to the present modification example, and a fixing plate 26C. In addition, FIG. 21 illustrates various positional relationships when the head module 2C is viewed through from the −Z direction to the +Z direction. Further, in FIG. 21, a case where M=4 will be illustrated and described. The difference between the present modification example and the first embodiment is that the head module 2C of the present modification example includes the fixing plate 26C instead of the fixing plate 26 included in the head module 2 of the first embodiment. The fixing plate 26C of the present modification example has the same structure as that of the fixing plate 26C that forms the head module 2V of the reference example illustrated in FIG. 22 mounted on the ink jet printer different from the ink jet printer 1 according to the first embodiment.

In the present modification example, as illustrated in FIG. 21, the plate opening distance U[m1][m2] is a distance different from the nozzle row distance D1[m1][m2] and the nozzle row distance D2[m1][m2]. It is assumed that the nozzle row distance D1[m1][m2] and the nozzle row distance D2[m1][m2] in the present modification example are the nozzle row distance D1[m1][m2] and the nozzle row distance D2[m1][m2] in the first embodiment.

For example, in the present modification example, the plate opening distance U[1][ma] is expressed as U[1][ma]=(M×ψ[ma])R. Here, the value ψ[ma] is a natural number larger than the value α. Further, in the present modification example, as in the first embodiment, it is assumed that the nozzle row distance D1[1][ma] is D1[1][ma]=(M×β[ma]+γ[ma])R.

In this case, in the present modification example, the plate opening distance U[1][ma] and the nozzle row distance D1[1][ma] satisfy the relationship of U[1][ma]D1[1][ma]=M×ψ[ma]:M×β[ma]+γ[ma].

Here, for example, when the value M is 2, the value ma is 2 and the value γ[2] is 1, and the relationship of U[1][2]:D1[1][2]=EK1:O1 is satisfied. Here, the value EK1 is a positive even number, and the value O1 is a positive odd number satisfying O1>EK1. The value EK1 may be an even number satisfying EK1>O1.

As described above, in the head module 2C according to the modification example 3, the plate opening W includes the plate opening W[1] and the (M−1) specific openings corresponding to the (M−1) specific nozzle plates, the plate opening W[1] exposes at least the nozzle row L1[1] and the nozzle row L2[1] in the nozzle plate C[1], the plate opening W[ma] among the (M−1) specific openings exposes at least the nozzle row L1[ma] in the nozzle plate C[ma], the plate opening distance U[1][ma] between the center of the plate opening W[1] and the center of the plate opening W[ma] in the X-axis direction can be expressed as U[1][ma]:D1[1][ma]=M×ψ:M×β[ma]+γ[ma] by the value M, the value ψ which is a natural number of 1 or more, the value β[ma], and the value γ[ma]. In other words, in the present modification example, since the plate opening distance does not depend on the nozzle row distance as in the first embodiment, the fixing plate 26C used in the reference example and the fixing plate 26C used in the present modification example can be commonly used, and it is possible to achieve the reduction in manufacturing costs by reducing the types of components.

In the modification example 3, the plate opening W is an example of the "opening portion", the plate opening W[1] is an example of the "first opening", the plate opening W[ma] is an example of the "m-th specific opening", the nozzle plate C[ma] is an example of the "m-th specific nozzle plate", the nozzle row L1[ma] is an example of the "m-th specific nozzle row", the plate opening distance U[1][ma] is an example of the "distance PKT[m]", the nozzle row distance D1[1][ma] is an example of the "distance PT[m]", the nozzle plate C[1] is an example of the "first nozzle plate", the nozzle row L1[1] is an example of the "first nozzle row", the nozzle row L2[1] is an example of the "second nozzle row", the value β[ma] is an example of the "value PT[m]", and the value γ[ma] is an example of the "value γT[m]".

Further, in the present modification example, when M=2, the plate opening W includes the plate opening W[1] and the plate opening W[2], the plate opening W[1] exposes at least the nozzle row L1[1] and the nozzle row L2[1] in the nozzle plate C[1], the plate opening W[2] exposes at least the nozzle row L1[2] in the nozzle plate C[2], and the plate opening distance U[1][2] between the center of the plate opening W[1] and the center of the plate opening W[2] in the X-axis direction can be expressed as PK1:P2=EK1:O1 where the value EK1 is a positive even number and the value O1 is a positive odd number.

In the present modification example when M=2, the plate opening W is an example of the "opening portion", the plate opening W[1] is an example of the "first opening", the plate opening W[2] is an example of the "second opening", the nozzle plate C[2] is an example of the "second nozzle plate", the nozzle row L1[2] is an example of the "third nozzle row", the plate opening distance U[1][2] is an example of the "distance PK1", the nozzle row distance D1[1][2] is an example of the "distance P2", the nozzle plate C[1] is an example of the "first nozzle plate", the nozzle row L1[1] is an example of the "first nozzle row", and the nozzle row L2[1] is an example of the "second nozzle row".

5.4. Modification Example 4

In the above-described first embodiment, as illustrated in FIG. 2, the configuration in which the distribution flow path 221 is provided in the ink introduction member 22 is illustrated, but the distribution flow path 221 may be provided in the intermediate flow path member 23, and may be provided in the holder 25. Further, the intermediate flow path member 23 may be a part of the holder 25.

5.5. Modification Example 5

In the above-described first embodiment, the serial printer in which the main scanning direction is the X-axis direction, the sub-scanning direction is the Y-axis direction, and the recording paper sheet PE and the head module 2 move relative to each other in the main scanning direction as the carriage 761 reciprocates in the X-axis direction which is the main scanning direction is illustrated, but the present disclosure is not limited to such an aspect. A line printer may be exemplified in which the main scanning direction is the Y-axis direction, the sub-scanning direction is the X-axis direction, and the width in the sub-scanning direction is equal to or larger than the paper width. In this case, a configuration is employed in which the head module 2 which is a line head does not move and the recording paper sheet PE is transported in the Y-axis direction such that the recording paper sheet PE and the head module 2 move relative to each other in the main scanning direction, and by using the head module 2 according to the present disclosure, the same effect can be obtained by increasing the transport speed of the recording paper sheet PE instead of the scanning speed of the carriage 761. The head module 2 is installed such that the nozzle rows intersect in the main scanning direction, as in the above-described first embodiment. In the present modification example, the nozzle rows intersect the Y-axis direction. Therefore, the head module 2 of the present modification example is used, for example, in a state where the head module 2 of the first embodiment is rotated 90 degrees with the Z-axis as the rotation axis.

5.6. Modification Example 6

In the above-described second embodiment, as illustrated in FIG. 9, a case where the nozzle plates are arranged in order of the nozzle plates CQ[1], CQ[2], CS[1], and CS[2] from the −X direction to the +X direction is illustrated, but the present disclosure is not limited to such an aspect. The nozzle plates for discharging two different colors of ink may be arranged in any order.

In other words, when the nozzle row distance DL, the nozzle row distances DQ1[1][ma] and DS1[1][ma], and the distance DQS are set to satisfy DL:DQ1[1][ma] (=DS1[1][ma]):DQS=E1:O1:E2, for example, in the present modification example, the nozzle plates may be arranged in order of the nozzle plates CQ[1], CQ[2], CS[1], and CS[2] from the −X direction to the +X direction, that is, the nozzle plates C for discharging inks of different colors may be arranged alternately. In this case, the value O1 satisfies O1>E2.

What is claimed is:

1. A head module in which a first direction is a main scanning direction, comprising:
a first nozzle row including a first nozzle configured to discharge a liquid;
a second nozzle row including a second nozzle configured to discharge a liquid; and
a third nozzle row including a third nozzle configured to discharge a liquid, wherein
a distance P1 between the first nozzle row and the second nozzle row in the first direction and a distance P2 between the first nozzle row and the third nozzle row in the first direction are expressed as P1:P2=E1:O1 where a value E1 is a positive even number and a value O1 is a positive odd number satisfying O1>E1.

2. The head module according to claim 1, wherein
the first nozzle and the third nozzle are arranged at an identical position in a second direction orthogonal to the first direction.

3. The head module according to claim 2, wherein
the first nozzle row includes nozzles configured to discharge a liquid,
the second nozzle row includes nozzles configured to discharge a liquid, and
in the second direction, one of the nozzles included in the second nozzle row is disposed between two nozzles adjacent to each other among the nozzles included in the first nozzle row.

4. The head module according to claim 1, further comprising:
a first head chip having the first nozzle row and the second nozzle row; and
a second head chip having the third nozzle row.

5. The head module according to claim 4, wherein
the first head chip and the second head chip have a common structure.

6. The head module according to claim 4, wherein
the first head chip includes a first nozzle plate in which the first nozzle row and the second nozzle row are provided, and
the second head chip includes a second nozzle plate in which the third nozzle row is provided.

7. The head module according to claim 6, further comprising
a fixing plate to which the first head chip and the second head chip are fixed and which has an opening portion for exposing at least the first nozzle row and the second nozzle row in the first nozzle plate and at least the third nozzle row in the second nozzle plate, wherein
the first head chip and the second head chip are fixed to the fixing plate such that a distance between a center of the first head chip and a center of the second head chip in the first direction is the distance P2 when the fixing plate is viewed in plan view.

8. The head module according to claim 7, wherein
the opening portion includes a first opening for exposing at least the first nozzle row and the second nozzle row in the first nozzle plate and a second opening for exposing at least the third nozzle row in the second nozzle plate, and
a distance PK1 between a center of the first opening and a center of the second opening in the first direction is expressed as PK1:P2=EK1:O1 where a value EK1 is a positive even number.

9. The head module according to claim 4, further comprising a holder that has a supply flow path for supplying a liquid to the first head chip and the second head chip and holds the first head chip and the second head chip such that a distance in the first direction between a center of the first head chip and a center of the second head chip in the first direction is the distance P2.

10. The head module according to claim 1, further comprising:

an inlet for introducing a liquid; and a distribution flow path that communicates with the first nozzle and the third nozzle and distributes the liquid introduced from the inlet to the first nozzle and the third nozzle.

11. A liquid discharge apparatus comprising:

the head module according to claim 1; and a transport mechanism for transporting a medium.

12. A liquid discharge apparatus comprising:

the head module according to claim 1; and a carriage that reciprocates the head module in the first direction and in a direction opposite to the first direction.

13. The liquid discharge apparatus according to claim 12, wherein a minimum distance between two dots formed by the first nozzle in the first direction is twice a distance P0 obtained by dividing the distance P1 by the value E1 and obtained by dividing the distance P2 by the value O1.

14. The liquid discharge apparatus according to claim 13, wherein the first nozzle, the second nozzle, and the third nozzle are configured to discharge a liquid at an identical timing.

15. The liquid discharge apparatus according to claim 12, wherein the head module includes a first driving element corresponding to the first nozzle, a second driving element corresponding to the second nozzle, and a third driving element corresponding to the third nozzle, and a common driving signal is supplied to the first driving element, the second driving element, and the third driving element.

16. The liquid discharge apparatus according to claim 12, wherein the first nozzle, the second nozzle, and the third nozzle are configured to discharge an identical type of liquid.

17. The liquid discharge apparatus according to claim 13, wherein the first nozzle, the second nozzle, and the third nozzle discharge an identical type of liquid, in a second direction orthogonal to the first direction, a distance between two nozzles adjacent to each other among nozzles included in the first nozzle row is twice the distance P0, and in the second direction orthogonal to the first direction, a minimum distance between the first nozzle and the second nozzle is the distance P0.

18. A head module in which a first direction is a main scanning direction, comprising:

a first nozzle row including a first nozzle configured to discharge a liquid;

a second nozzle row including a second nozzle configured to discharge a liquid; and a third nozzle row including a third nozzle configured to discharge a liquid, wherein a distance P1 between the first nozzle row and the second nozzle row in the first direction and a distance P2 between the first nozzle row and the third nozzle row in the first direction are expressed as $P1:P2=M\times\alpha:M\times\beta+1$ where a value M is a natural number of 3 or more, a value $\alpha$ is a natural number of 1 or more, and a value $\beta$ is a natural number satisfying $\beta>\alpha$.

19. A head module in which a first direction is a main scanning direction, comprising:

a first nozzle row including a nozzle configured to discharge a liquid;

a second nozzle row including a nozzle configured to discharge a liquid; and $(M-1)$ specific nozzle rows including a nozzle configured to discharge a liquid, wherein when a value m is a natural number satisfying $1\leq m\leq M-1$, a distance P1 between the first nozzle row and the second nozzle row in the first direction and a distance PT[m] between the first nozzle row and an m-th specific nozzle row among the $(M-1)$ specific nozzle rows in the first direction are expressed as $P1:PT[m]=M\times\alpha:M\times\beta[m]+\gamma T[m]$ where the value M is a natural number of 3 or more, a value $\alpha$ is a natural number of 1 or more, a value $\beta T[m]$ is a natural number satisfying $\beta T[m]>\alpha$, and a value $\gamma T[m]$ is a natural number satisfying $0<\gamma T[m]\leq M-1$ and satisfying $\gamma T[m1]\neq\gamma T[m2]$ when a value m1 is a natural number satisfying $1\leq m1\leq M-1$ and a value m2 is a natural number satisfying $1\leq m2\leq M-1$ and satisfying $m1\neq m2$.

* * * * *